(12) United States Patent
Abbott

(10) Patent No.: US 11,084,105 B2
(45) Date of Patent: Aug. 10, 2021

(54) CHUCK ASSEMBLY FOR A ROTARY POWER TOOL

(71) Applicant: MILWAUKEE ELECTRIC TOOL CORPORATION, Brookfield, WI (US)

(72) Inventor: Jonathan E. Abbott, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/162,790

(22) Filed: Oct. 17, 2018

(65) Prior Publication Data

US 2019/0111555 A1    Apr. 18, 2019

Related U.S. Application Data

(60) Provisional application No. 62/632,000, filed on Feb. 19, 2018, provisional application No. 62/573,849, filed on Oct. 18, 2017.

(51) Int. Cl.
| | | |
|---|---|---|
| *B23B 31/12* | (2006.01) | |
| *B25D 17/08* | (2006.01) | |
| *B23B 31/00* | (2006.01) | |

(52) U.S. Cl.
CPC ........ *B23B 31/1253* (2013.01); *B23B 31/005* (2013.01); *B23B 31/123* (2013.01);
(Continued)

(58) Field of Classification Search
CPC ..... Y10T 279/17615; Y10T 279/17649; Y10T 279/17658; Y10S 279/902; B23B 31/123;
(Continued)

(56) References Cited

U.S. PATENT DOCUMENTS 171,383 A * 12/1875 Hoppe ................ B23B 31/1253
                                                            279/64
3,210,088 A    10/1965 Williamson et al.
(Continued)

FOREIGN PATENT DOCUMENTS

CN          2635260 Y      8/2004
CN        200957461 Y     10/2007
(Continued)

OTHER PUBLICATIONS

Machine Translation, WO 2006119685 A1, Zhao, Q., et al., Nov. 16, 2006. (Year: 2006).*
(Continued)

*Primary Examiner* — Eric A. Gates
*Assistant Examiner* — Chwen-Wei Su
(74) *Attorney, Agent, or Firm* — Michael Best & Friedrich LLP

(57) ABSTRACT

A chuck assembly for a rotary power tool includes a chuck body rotatable about a central axis. The chuck body has a plurality of slots, each oriented at an oblique angle relative to the central axis. The chuck assembly also includes a plurality of jaws, each movable along a respective one of the slots. The chuck assembly also includes a collar coupled to the plurality of jaws. The collar is selectively engageable with the chuck body such that, when engaged, the plurality of jaws are movable along the plurality of slots in response to rotation of the collar.

13 Claims, 45 Drawing Sheets

(52) U.S. Cl.
CPC ........ *B23B 31/1215* (2013.01); *B25D 17/084* (2013.01); *B23B 31/1238* (2013.01); *B23B 2231/0224* (2013.01); *B23B 2231/2029* (2013.01); *B23B 2231/2081* (2013.01); *B23B 2231/34* (2013.01); *B23B 2231/38* (2013.01)

(58) Field of Classification Search
CPC ............ B23B 2231/38; B23B 31/1207; B23B 31/1215; B23B 31/1253; B23B 31/1238; B23B 31/005; B23B 2231/2081; B23B 2231/34; B23B 2231/0224; B23B 2231/2029; B25D 17/084
See application file for complete search history.

(56) References Cited

U.S. PATENT DOCUMENTS

| | | | |
|---|---|---|---|
| 3,229,554 A | 1/1966 | Haddad | |
| 3,244,428 A | 4/1966 | Röhm | |
| 3,439,532 A | 4/1969 | Grumbach et al. | |
| 3,599,999 A | 8/1971 | Schnizler et al. | |
| 3,647,231 A | 3/1972 | Schafer | |
| 3,861,693 A | 1/1975 | Huber | |
| 3,970,323 A | 7/1976 | Schnizler, Jr. | |
| 4,103,914 A | 8/1978 | Röhm | |
| 4,266,789 A | 5/1981 | Wahl et al. | |
| 4,277,074 A | 7/1981 | Kilberis | |
| 4,317,578 A | 3/1982 | Welch | |
| 4,381,116 A | 4/1983 | Futter | |
| 4,456,270 A | 6/1984 | Zettl, Jr. et al. | |
| 4,463,960 A | 8/1984 | Walton | |
| 4,498,682 A | 2/1985 | Glore | |
| 4,527,809 A | 7/1985 | Umbert | |
| 4,575,108 A | 3/1986 | Whitehead | |
| 4,648,608 A | 3/1987 | Smith | |
| 4,695,065 A | 9/1987 | Komatsu et al. | |
| 4,701,083 A | 10/1987 | Deutschenbaur et al. | |
| 4,848,779 A | 7/1989 | Wheeler et al. | |
| 4,880,246 A | 11/1989 | Röhm | |
| 4,902,025 A | 2/1990 | Zimdars | |
| 4,991,859 A | 2/1991 | Röhm | |
| 5,046,900 A | 9/1991 | Heiter et al. | |
| 5,174,588 A | 12/1992 | Reibetanz et al. | |
| 5,183,274 A | 2/1993 | Sakamaki | |
| 5,195,760 A | 3/1993 | Wheeler et al. | |
| 5,340,128 A | 8/1994 | Weiss et al. | |
| 5,407,215 A | 4/1995 | Yang | |
| 5,435,578 A | 7/1995 | Röhm | |
| 5,443,275 A | 8/1995 | Knobl et al. | |
| 5,476,273 A | 12/1995 | Shadeck et al. | |
| 5,624,125 A | 4/1997 | Röhm | |
| 5,685,549 A | 11/1997 | Yang | |
| 5,732,956 A | 3/1998 | Huff et al. | |
| 5,820,134 A | 10/1998 | Subils Valls | |
| 5,988,653 A | 11/1999 | Kuo | |
| 6,068,266 A | 5/2000 | Barton et al. | |
| 6,241,260 B1 | 6/2001 | Judge et al. | |
| 6,505,840 B2 | 1/2003 | Huggins et al. | |
| 6,533,291 B2 | 3/2003 | Huggins et al. | |
| 6,536,782 B2 | 3/2003 | Röhm | |
| 6,540,236 B2 | 4/2003 | Aultman et al. | |
| 6,637,756 B2 | 10/2003 | McCurry | |
| 6,648,342 B2 | 11/2003 | Aultman et al. | |
| 6,669,207 B2 | 12/2003 | Huff et al. | |
| 6,722,668 B2 | 4/2004 | Huggins et al. | |
| 7,258,351 B2 * | 8/2007 | Hoffmann ............. | B23B 31/123 279/140 |
| 7,328,924 B2 | 2/2008 | Moilanen et al. | |
| 7,360,770 B2 | 4/2008 | Luckenbaugh et al. | |
| 7,699,566 B2 | 4/2010 | Nickels, Jr. et al. | |
| 7,832,965 B2 | 11/2010 | Mack | |
| 8,387,719 B2 | 3/2013 | Scrimshaw et al. | |
| 8,777,232 B2 | 7/2014 | Yaksich | |
| 9,050,660 B2 | 6/2015 | Mack | |
| 9,174,281 B2 | 11/2015 | Schenk | |
| 9,283,625 B2 | 3/2016 | Thorson et al. | |
| 2004/0227309 A1 | 11/2004 | Rohm | |
| 2006/0055126 A1 | 3/2006 | Nachev | |
| 2006/0097462 A1 | 5/2006 | Moilanen et al. | |
| 2006/0186609 A1 | 8/2006 | Baumann et al. | |
| 2008/0143062 A1 | 6/2008 | Mack | |
| 2013/0180745 A1 | 7/2013 | Scrimshaw et al. | |
| 2015/0306675 A1 | 10/2015 | Dedrickson | |

FOREIGN PATENT DOCUMENTS

| | | | |
|---|---|---|---|
| CN | 201020552 Y | 2/2008 | |
| CN | 201201060 Y | 3/2009 | |
| DE | 3114503 A1 | 11/1982 | |
| DE | 3434112 C2 | 11/1987 | |
| DE | 531920 C | 1/1988 | |
| DE | 3713457 C1 | 9/1988 | |
| DE | 4218835 A1 | 10/1992 | |
| DE | 3610671 C2 | 2/1993 | |
| DE | 3424679 C2 | 8/1993 | |
| DE | 4326652 A1 | 1/1994 | |
| DE | 3604927 C2 | 9/1994 | |
| DE | 4114884 C2 | 5/1997 | |
| DE | 19549206 A1 | 7/1997 | |
| EP | 178434 B1 | 4/1986 | |
| EP | 0302992 A1 | 2/1989 | |
| EP | 235607 B1 | 8/1989 | |
| EP | 2865471 A1 | 4/2015 | |
| FR | 959540 A | 3/1950 | |
| GB | 217341 A | 6/1924 | |
| GB | 556523 A | 10/1943 | |
| GB | 1263397 A | 2/1972 | |
| GB | 2065001 A | 6/1981 | |
| WO | 9604090 A1 | 2/1996 | |
| WO | WO-2006119685 A1 * | 11/2006 | ........... B23B 31/123 |

OTHER PUBLICATIONS

Boll, "Klein 2-in-1 Hex Head Slide Driver Review" Aug. 7, 2017 <https://www.protoolreviews.com/tools/hand/drivers-wrenches/klein-2-in-1-hex-head-slide-driver/32014/> 8 pages.

* cited by examiner

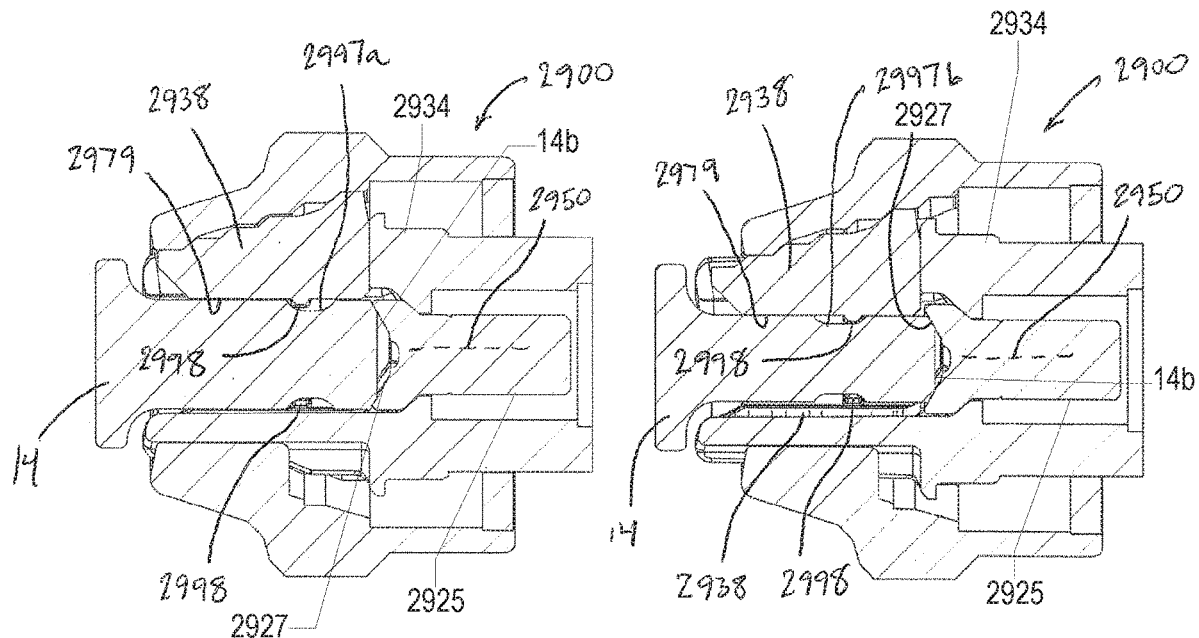
FIG. 40A   FIG. 40B
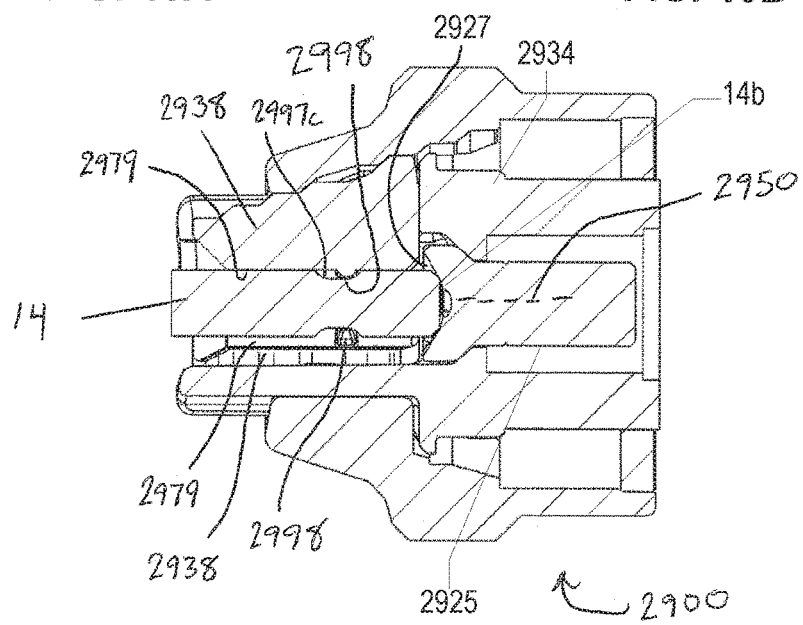
FIG. 40C

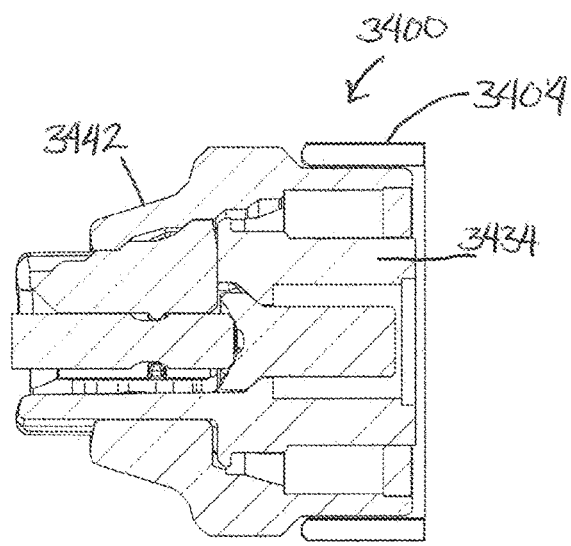
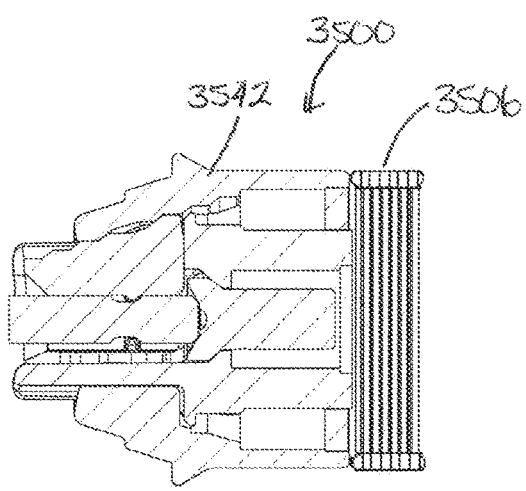
FIG. 47     FIG. 48
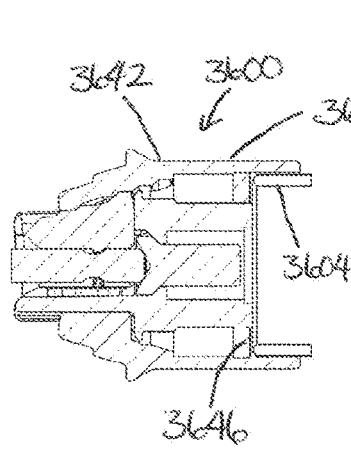
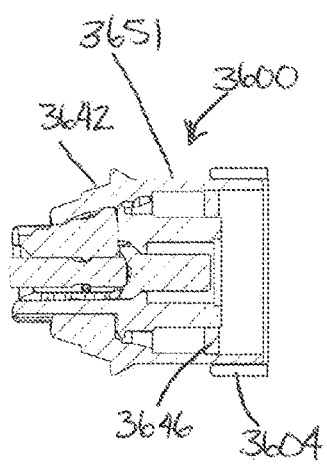
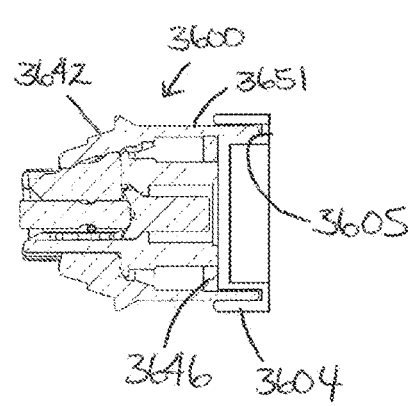
FIG. 49     FIG. 50     FIG. 51

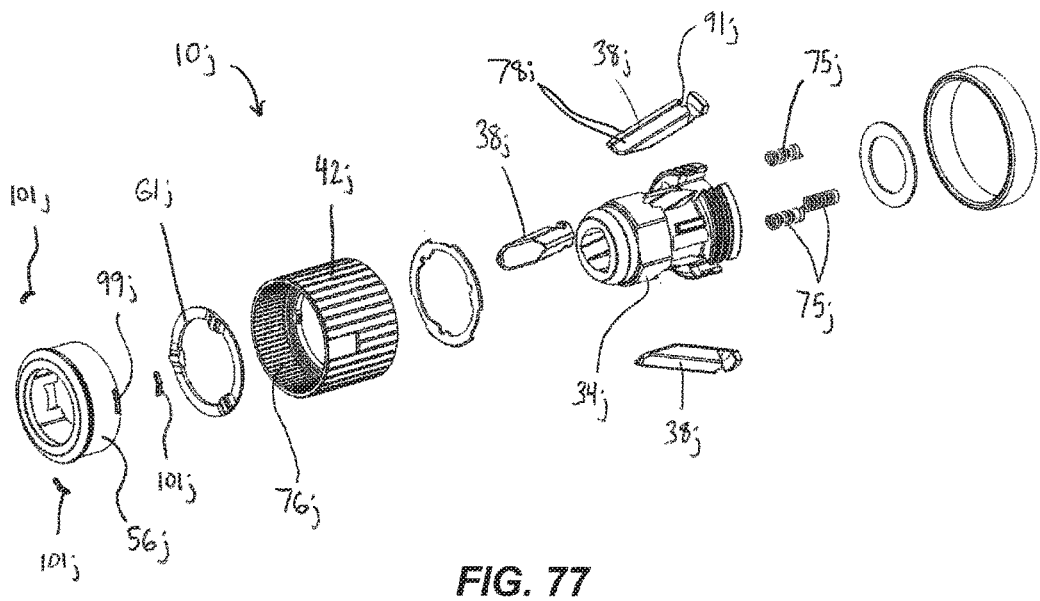
FIG. 77
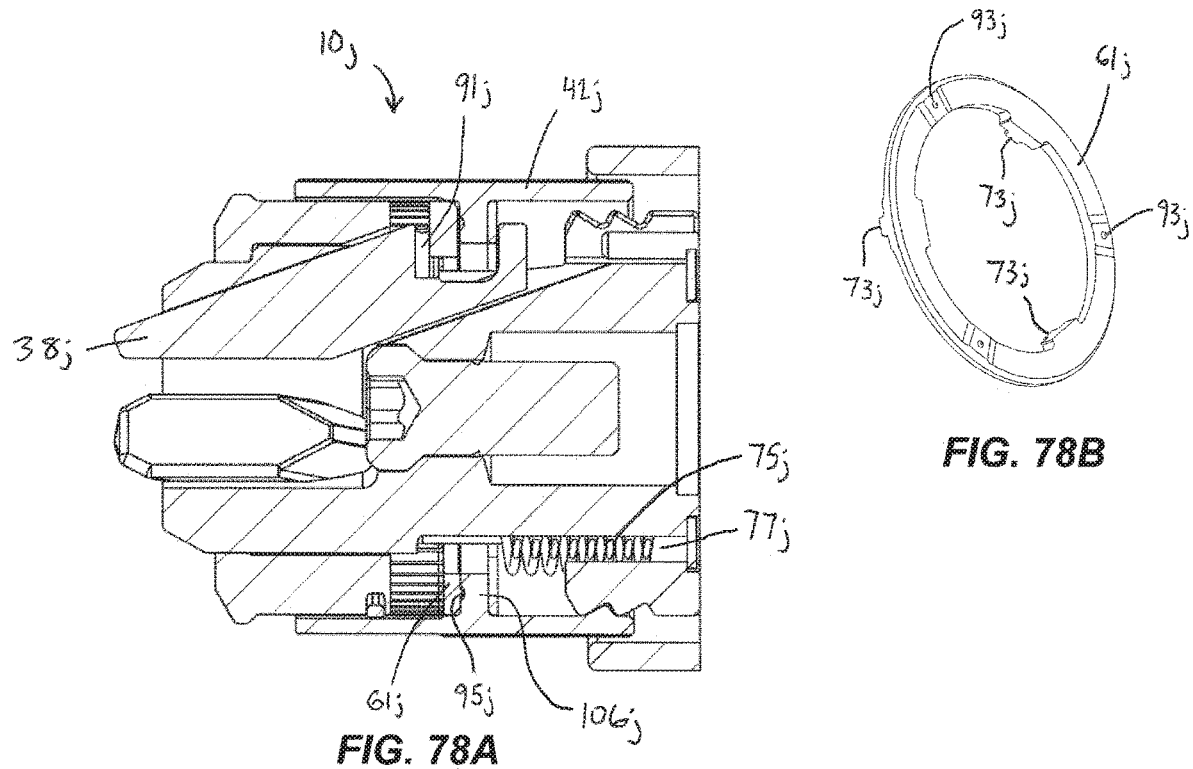
FIG. 78A
FIG. 78B

CHUCK ASSEMBLY FOR A ROTARY POWER TOOL

CROSS-REFERENCE TO RELATED APPLICATIONS

This application claims priority to U.S. Provisional Application No. 62/632,000, filed Feb. 19, 2018, and to U.S. Provisional Application No. 62/573,849, filed Oct. 18, 2017, the entire contents of each of which is incorporated herein by reference.

FIELD OF THE INVENTION

The present invention relates to power tools, and more particularly to chuck assemblies for rotary power tools.

BACKGROUND OF THE INVENTION

Power tools having a rotational output (i.e. rotary power tools) typically include chuck assemblies with a plurality of jaws that are adjustable to grip and secure a tool bit (e.g., a drill bit). Some chuck assemblies are configured to accept a continuous range of bit sizes (referred to herein as "continuously variable chucks"). Other chuck assemblies are configured to accept one standard size of hex-shanked bits. By taking advantage of a standard shank geometry, such chuck assemblies can be optimized to reduce weight, size, manufacturing cost, and time required to change bits as compared to continuously variable chucks. However, multiple standard nominal sizes exist for hex-shanked bits. For example, ¼-inch hex bits are commonly used for fastener driver, drill, and accessory bits, ⅜-inch hex bits are commonly used for hole saw bits, and 7/16-inch hex bits may be used for higher torque applications. The actual outer width dimension of such hex bits may be slightly different than the nominal size. For example, nominal ⅜-inch hex bits may have an actual out width dimension of 1 1/32-inch.

SUMMARY OF THE INVENTION

A need exists for a chuck able to accept multiple standard sized bit shanks without suffering the disadvantages of continuously variable chucks.

The invention provides, in one aspect, a chuck assembly for a rotary power tool. The chuck assembly includes a chuck body rotatable about a central axis. The chuck body has a plurality of slots, each oriented at an oblique angle relative to the central axis. The chuck assembly also includes a plurality of jaws, each movable along a respective one of the slots. The chuck assembly also includes a collar coupled to the plurality of jaws. The collar is selectively engageable with the chuck body such that, when engaged, the plurality of jaws are movable along the plurality of slots in response to rotation of the collar.

The invention provides, in another aspect, a chuck assembly for coupling a bit shank to a rotary power tool. The chuck assembly includes a chuck body rotatable about a central axis, and having a plurality of slots. The chuck assembly also includes a plurality of jaws, each of the jaws movable along a respective one of the slots to secure a bit shank between the jaws, and a collar at least partially surrounding the chuck body and the jaws. A first plurality of threads is formed on the chuck body or the plurality of jaws, and a second plurality of threads is formed on the collar. The collar is rotatable about the central axis to a first orientation to engage the second plurality of threads with the first plurality of threads and to a second orientation to disengage the second plurality of threads from the first plurality of threads. The collar is axially movable along the chuck body without rotating the collar when the collar is in the second orientation.

The invention provides, in another aspect, a method of securing a bit shank with a chuck assembly. The method includes retracting a plurality of jaws by sliding a collar along a chuck body in a first direction, inserting the bit shank between the jaws, engaging the jaws against first bit shank by sliding the collar along the chuck body in a second direction opposite the first direction, rotating the collar relative to the chuck body, and by rotating the collar, applying a clamping force to the first bit shank with the jaws.

The invention provides, in another aspect, a chuck assembly for a rotary power tool. The chuck assembly includes a chuck body rotatable about a central axis and having a plurality of slots oriented perpendicular to the central axis. The chuck assembly also includes a plurality of jaws, each movable along a respective one of the slots, and each having a stepped outer side. The chuck assembly also includes a collar coupled for sliding movement along the chuck body. The collar has a plurality of steps engageable with the stepped outer side of each of the jaws. In a first position of the collar in which a first plurality of the steps is engageable with the stepped outer side of each of the jaws, the chuck assembly is configured to secure a bit shank of a first nominal size, and in a second position of the collar in which a second plurality of the steps is engageable with the stepped outer side of each of the jaws, the chuck assembly is configured to secure a bit shank of a second nominal size different than the first nominal size.

The invention provides, in another aspect, a chuck assembly for a rotary power tool. The chuck assembly includes a chuck body rotatable about a central axis, the chuck body including a plurality of slots, and a plurality of jaws. Each of the jaws is movable along a respective one of the slots to axially and radially secure bit shanks of only a plurality of discrete nominal sizes between the jaws.

Other features and aspects of the invention will become apparent by consideration of the following detailed description and accompanying drawings.

BRIEF DESCRIPTION OF THE DRAWINGS

FIG. 40A is a cross-sectional view of a chuck assembly according to another embodiment of the invention, securing a shank of a first nominal size.

FIG. 40B is a cross-sectional view of the chuck assembly of FIG. 40A, securing a shank of a second nominal size.

FIG. 40C is a cross-sectional view of the chuck assembly of FIG. 40A, securing a shank of a third nominal size.

FIG. 47 is a cross-sectional view of a chuck assembly according to another embodiment of the invention.

FIG. 48 is a cross-sectional view of a chuck assembly according to another embodiment of the invention.

FIG. 49 is a cross-sectional view of a chuck assembly according to another embodiment of the invention.

FIG. 50 is a cross-sectional view of a chuck assembly according to another embodiment of the invention.

FIG. 51 is a cross-sectional view of a chuck assembly according to another embodiment of the invention.

FIG. 77 is an exploded perspective view of a chuck assembly according to another embodiment of the invention.

FIG. 78A is a cross-sectional view of the chuck assembly of FIG. 77.

FIG. 78B is a perspective view of a wave spring of the chuck assembly of FIG. 77.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
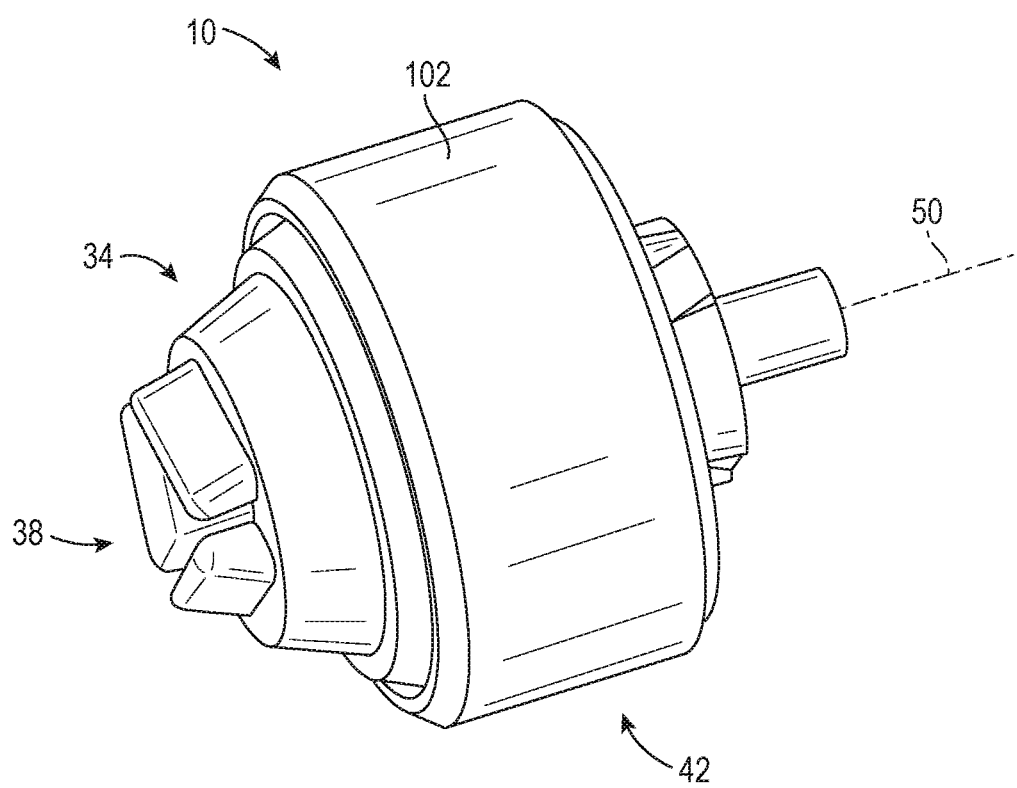
FIG. 1 is a perspective view of a chuck assembly according to an embodiment of the invention.
Figure 2:
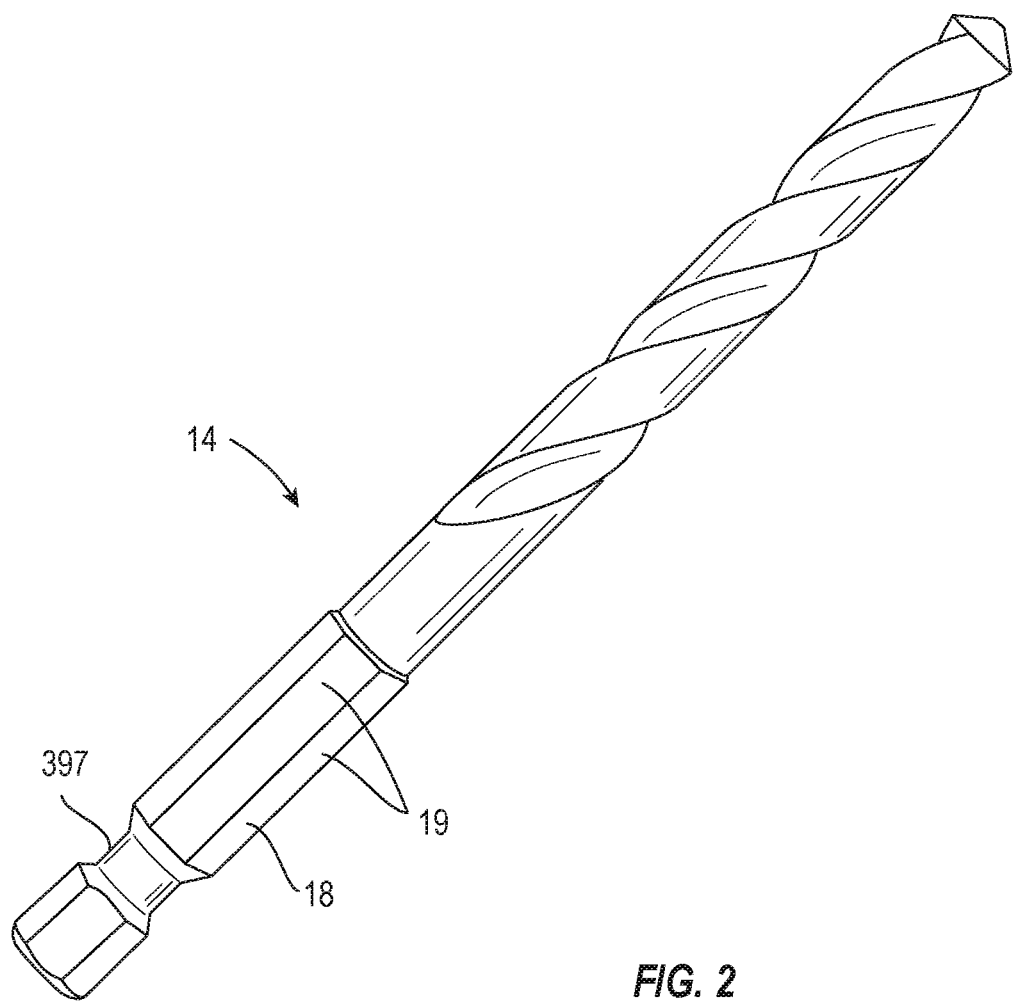
FIG. 2 is a perspective view of an exemplary tool bit that can be retained by the chuck assembly of FIG. 1.
Figure 3:
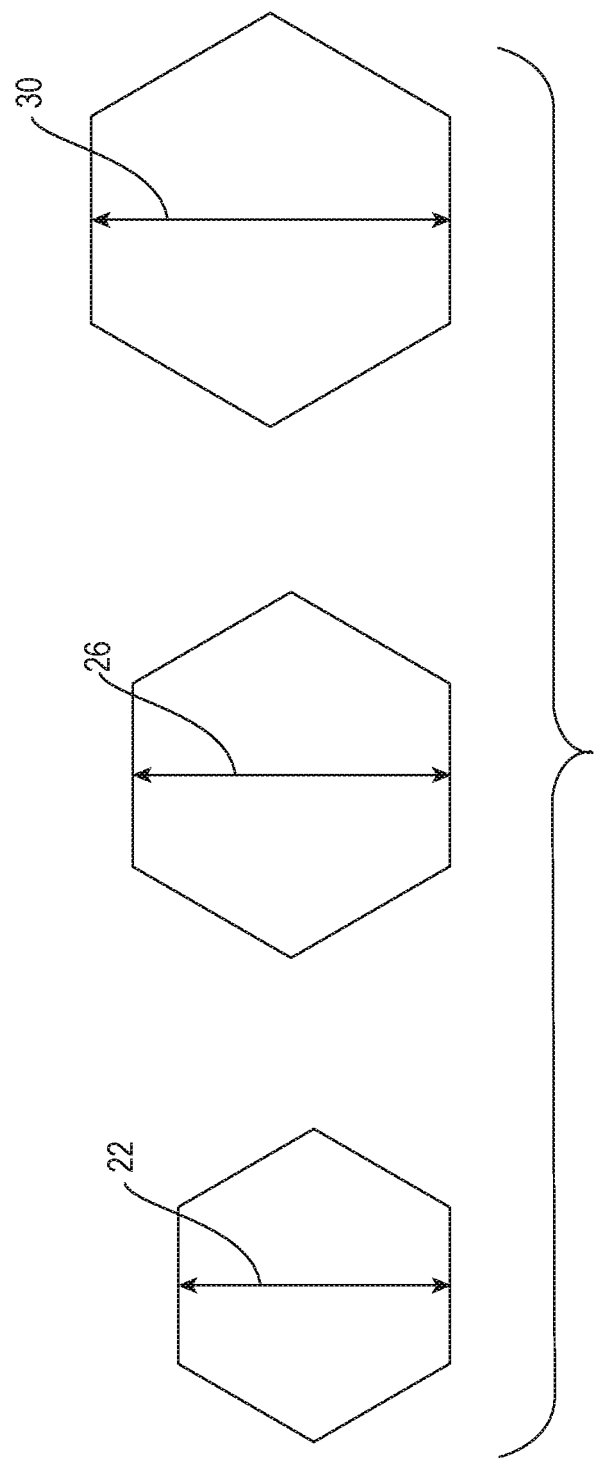
FIG. 3 is a diagram illustrating three different nominal sizes of shanks that may be used on the tool bit of FIG. 2.

FIG. 1 illustrates a chuck assembly 10 for connection to an output member (e.g., a spindle; not shown) of a rotary power tool (e.g., a drill, impact driver, etc.; not shown). The chuck assembly 10 is configured to quickly receive and secure tool bits with standardized shanks of at least two different predetermined, nominal sizes. For example, the illustrated chuck assembly 10 is configured to receive a tool bit 14 with a hexagonal shank 18 that can be any one of a first nominal size 22, a second nominal size 26, and a third nominal size 30 (FIGS. 2 and 3). The first, second, and third nominal sizes 22, 26, 30 are preferably standard or commonly-used hexagonal shank sizes, such as ¼-inch, ⅜-inch, and ⁷⁄₁₆-inch. The chuck assembly 10 may be configured to receive tool bits with other types of shanks (e.g., square, three-flat, round, etc.). In addition, the chuck assembly 10 may be configured to receive tool bits of four or more different nominal shank sizes.

Figure 4:
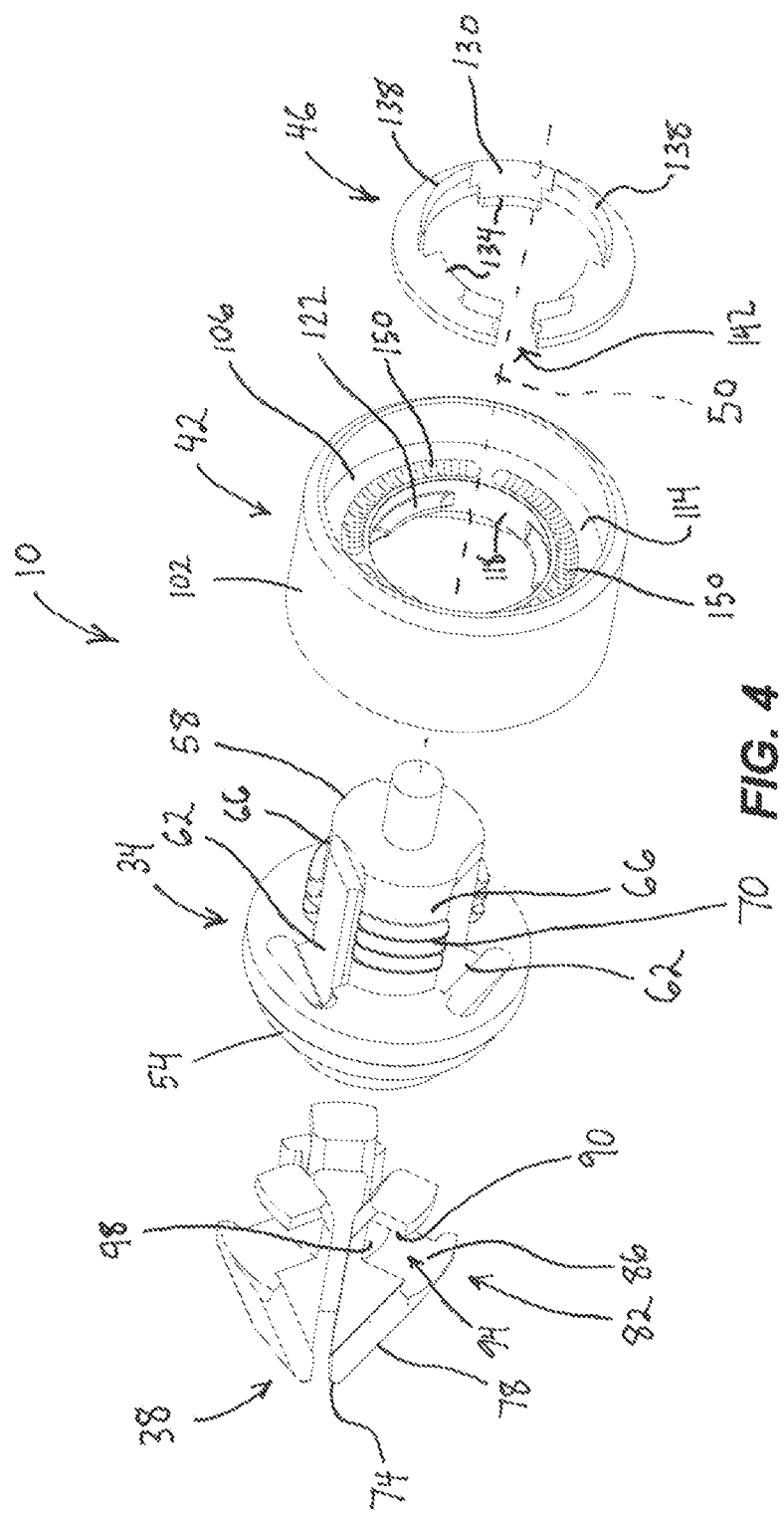
FIG. 4 is an exploded view of the chuck assembly of FIG. 1.
Figure 5:
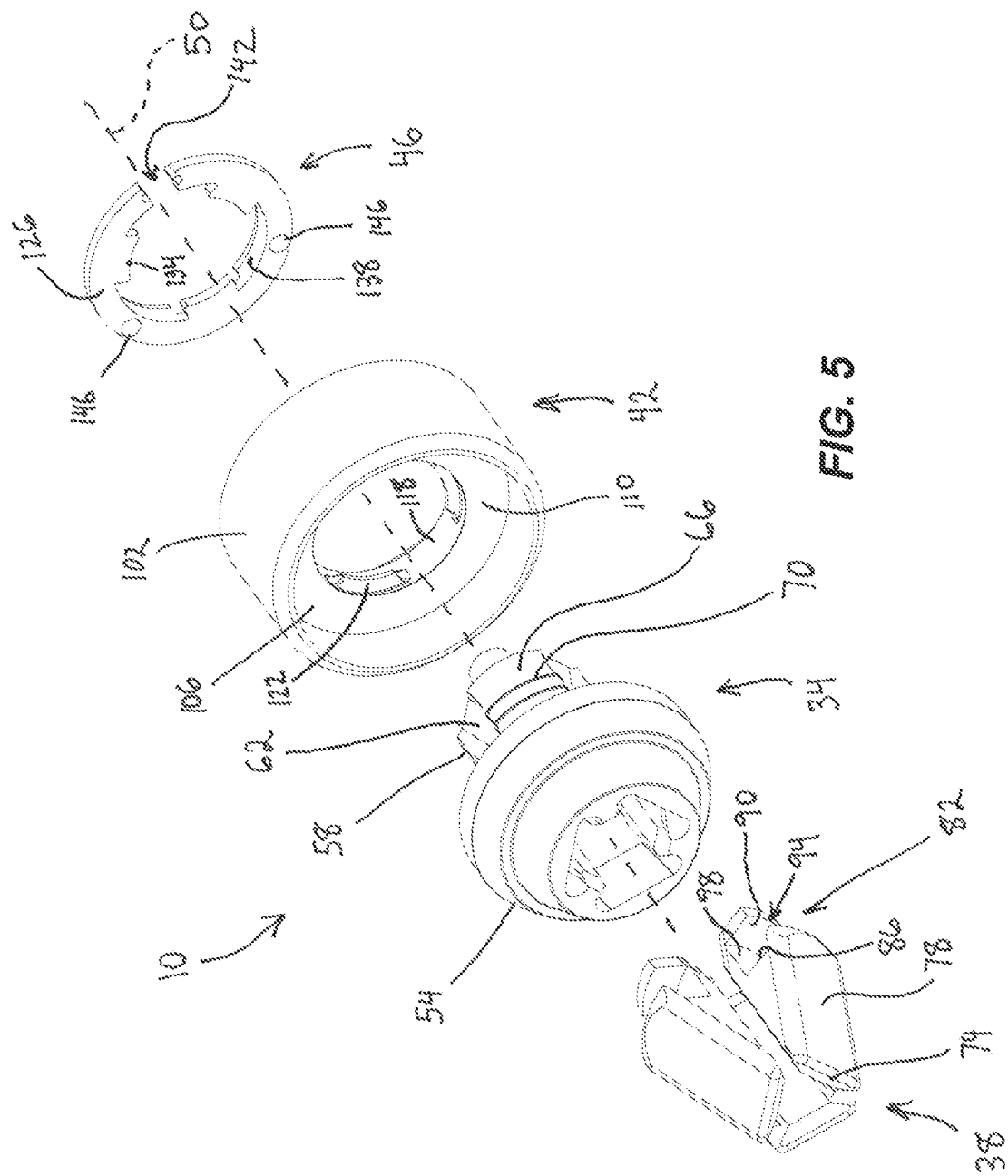
FIG. 5 is another exploded view of the chuck assembly of FIG. 1.
Figure 8A:
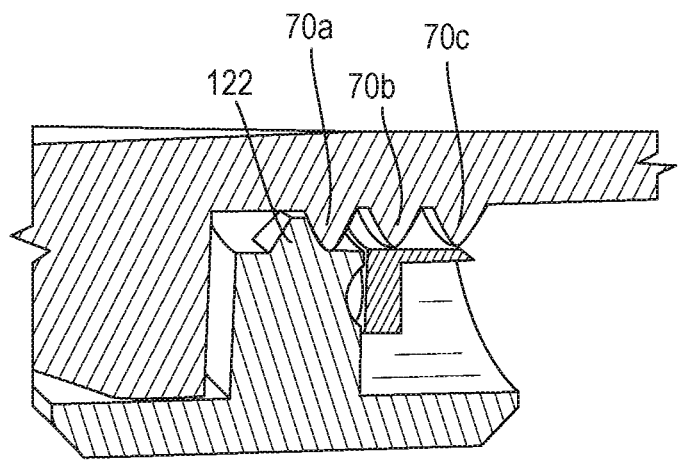
FIG. 8A illustrates the chuck assembly of FIG. 1 configured to clamp a shank of a first nominal size.
Figure 8B:
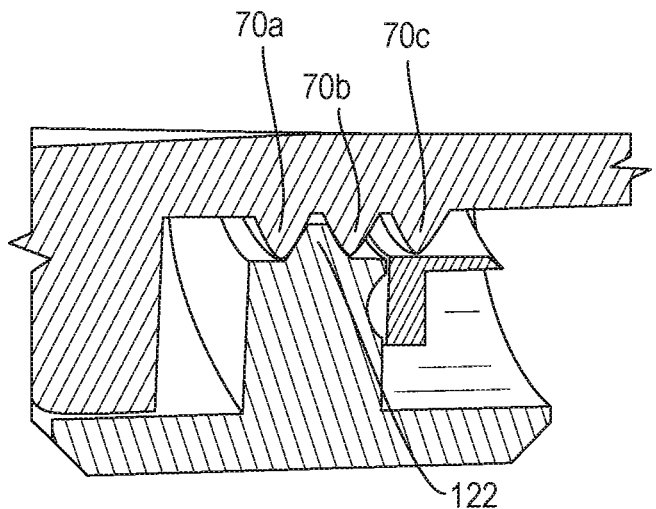
FIG. 8B illustrates the chuck assembly of FIG. 1 configured to clamp a shank of a second nominal size.
Figure 8C:
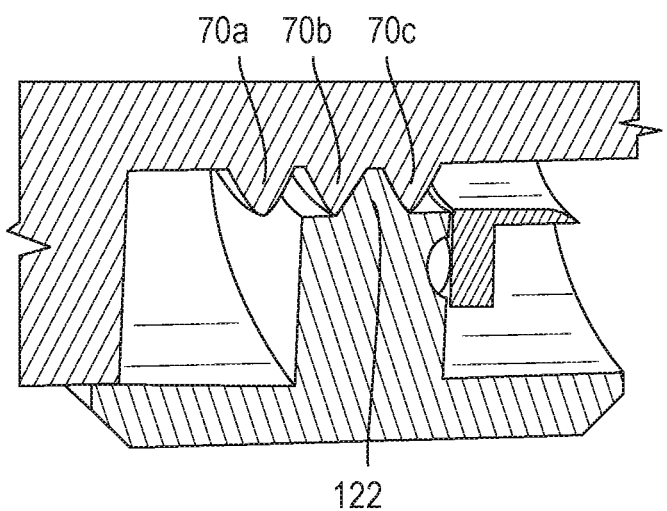
FIG. 8C illustrates the chuck assembly of FIG. 1 configured to clamp a shank of a third nominal size.
Figure 9:
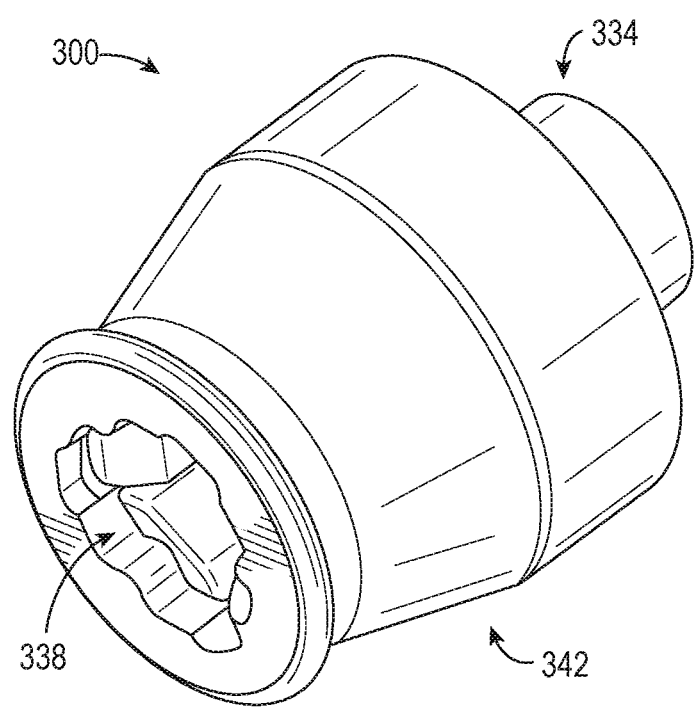
FIG. 9 is a perspective view of a chuck assembly according to another embodiment of the invention.

With reference to FIGS. 4 and 5, the chuck assembly 10 includes a chuck body 34, a plurality of jaws 38, a collar 42, and a split ring 46. The chuck body 34 is coupled for co-rotation with the output member of the power tool about a central axis 50. The chuck body 34 includes a head portion 54, a shaft portion 58, and a plurality of slots 62 in which the respective jaws 38 are slidably received. Each of the slots 62 is oriented at an oblique angle relative to the central axis 50. The shaft portion 58 includes a plurality of externally-threaded sections 66 disposed circumferentially about the shaft portion 58 between the slots 62 (FIG. 5). Each threaded section 66 includes a plurality of helical thread segments 70 situated adjacent one another along the axis 50. The illustrated thread segments 70 project outwardly from the shaft portion 58; however, in other embodiments, the thread segments 70 may be defined by slots cut into the shaft portion 58. As described in greater detail below, the number of thread segments 70 is at least equal to the predetermined number of tool bit shank sizes that the chuck assembly 10 is adapted to receive. Accordingly, in the illustrated embodiment, each threaded section 66 includes three thread segments 70: a first thread segment 70a, a second thread segment 70b, and a third thread segment 70c (FIGS. 8A-8C). In other embodiments, additional thread segments 70 may be provided. In addition, the relative axial position of each of the thread segments 70a, 70b, 70c corresponds with each particular shank size able to be accommodated by the chuck assembly 10.

With continued reference to FIGS. 4 and 5, the illustrated chuck assembly 10 includes three jaws 38; however, the chuck assembly 10 may include any number of jaws 38. Each of the jaws 38 has a front portion or tip 74 and an oblique outer surface 78 extending rearward from the tip 74. Each of the jaws 38 may include a generally U-shaped engagement portion 82 at the rear end of the jaw 38 opposite the tip 74. The engagement portion 82 includes opposing first and second engagement surfaces 86, 90 that define a groove 94 therebetween. A base surface 98 extending between the first and second engagement surfaces 86, 90 forms the bottom of the groove 94. In the illustrated embodiment, the first and second engagement surfaces 86, 90 extend perpendicular to the central axis 50, and the base surface 98 extends parallel to the central axis 50.

Figure 6:
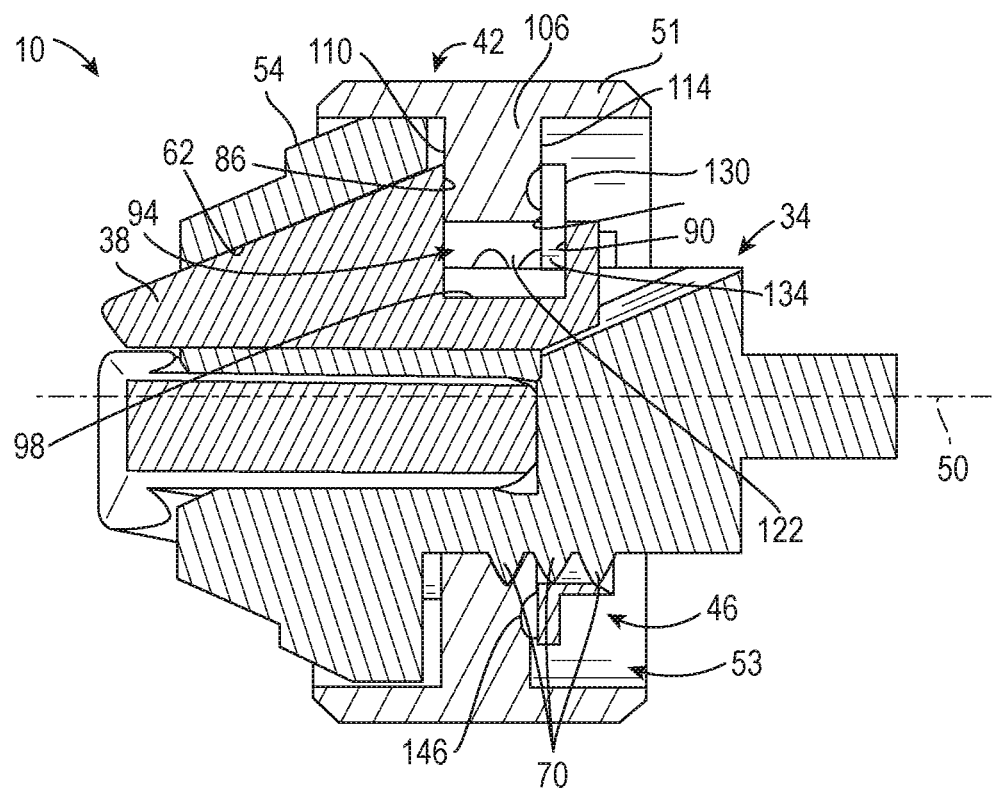
FIG. 6 is a cross-sectional view of the chuck assembly of FIG. 1.
Figure 7:
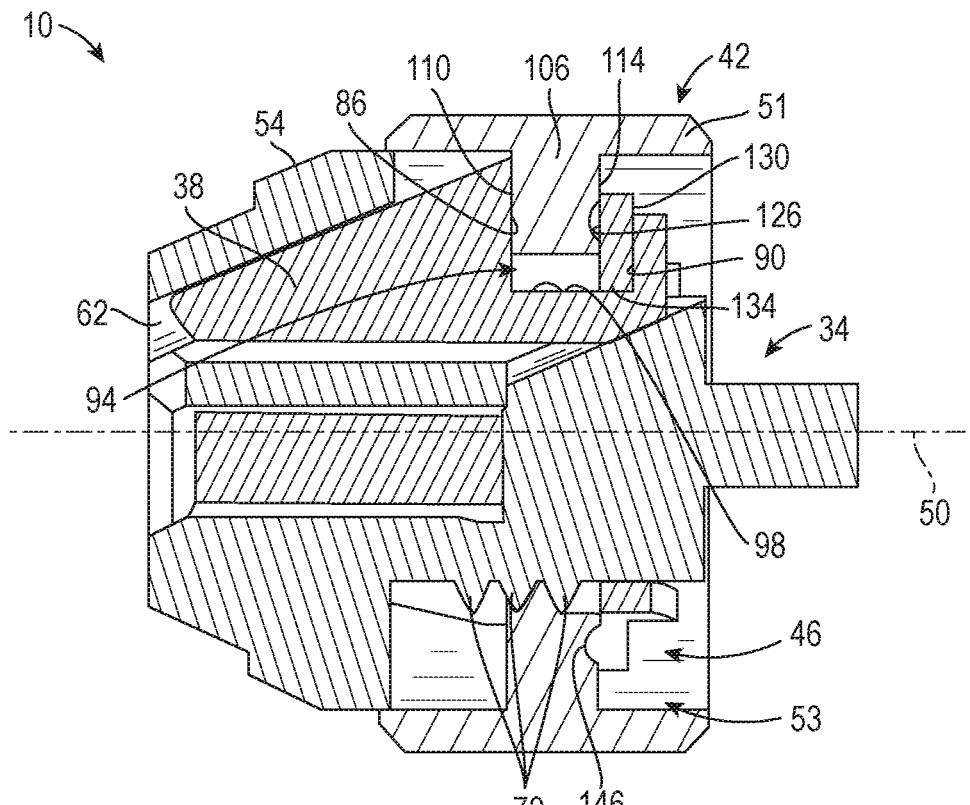
FIG. 7 is a cross-sectional view of the chuck assembly of FIG. 1 with a collar of the chuck assembly in a rearmost position.

The collar 42 is received on the shaft portion 58 of the chuck body 34 and is rotatable and axially movable relative to the chuck body 34. The illustrated collar 42 includes a user-manipulable outer surface 102 and an inner annular wall 106. The annular wall 106 includes a front side 110 (FIG. 5), a back side 114 (FIG. 4), and an interior side 118 that extends between the front side 110 and the back side 114. The illustrated collar 42 includes a skirt portion 51 extending rearward from the annular wall 106 (FIGS. 6 and 7). The interior of the skirt portion 51 defines a recess 53 that may receive an annular projecting portion (not shown) formed, for example, as a part of the chuck body 34 or as a part of a front end assembly of a power tool.

Best illustrated in FIGS. 6 and 7, the annular wall 106 extends into the groove 94 of each jaw 38 such that the front side 110 of the annular wall 106 opposes the first engagement surface 86. Accordingly, when the collar 42 is moved forward (i.e. to the left in FIGS. 6 and 7) relative to the chuck body 34, the front side 110 of the annular wall 106 bears against the first engagement surface 86 to move the jaws 38 forward. As the jaws 38 move forward, they also move radially inward due to the oblique orientation of the slots 62. Forward movement of the collar 42 is limited by engagement between the front side 110 of the annular wall 106 and the head portion 54 of the chuck body 34 (FIG. 6). The collar 42 further includes a plurality of inwardly-projecting helical thread segments 122 provided on the interior side 118 of the annular wall 106. In the illustrated embodiment, the thread segments 112 project from the interior side 118; however, in other embodiments, the thread segments 112 may be defined by slots cut into the interior side 118. As described in greater detail below, the thread segments 122 on the collar 42 are selectively engageable with the thread segments 70 on the chuck body 34, and the collar 42 is rotatable relative to the chuck body 34 to clamp the shank 18 of the tool bit 14 between the jaws 38.

Referring to FIGS. 4 and 5, the split ring 46 is received on the shaft portion 58 of the chuck body 34 adjacent the back side 114 of the collar's annular wall 106. The split ring 46 is axially movable with the collar 42 relative to the chuck body 34. The split ring 46 includes a front side 126, a back side 130, a plurality of inwardly-projecting, circumferentially spaced retaining tabs 134 and a plurality of guide tabs 138 that extend from the back side 130. The split ring 46 further includes a gap 142 that allows for resilient expansion of the split ring 46 (e.g., during assembly of the chuck assembly 10). Best illustrated in FIGS. 6 and 7, the front side 126 of the split ring 46 opposes the back side 114 of the collar's annular wall 106. Accordingly, when the collar 42 is moved rearward (i.e. to the right in FIGS. 6 and 7) relative to the chuck body 34, the back side 114 of the annular wall 106 bears against the front side 126 of the split ring 46 to move the split ring 46 rearward with the collar 42. The retaining tab 134 bears against the second engagement surface 90 to also move the jaws 38 rearward. As the jaws 38 move rearward, they move radially-outward due to the oblique orientation of the slots 62. Rearward movement of the collar 42 and the split ring 46 is limited by engagement of the base surface 98 with the retaining tabs 134 (FIG. 7). Rearward movement of the collar 42 and the split ring 46 may also be limited by engagement between the collar 42 and a portion of the power tool (e.g., the power tool housing; not shown). The guide tabs 138 are configured to overlie and engage the threaded sections 66 of the chuck body 34 to maintain the split ring 46 in alignment with the central axis 50.

The front side 126 of the split ring 46 optionally includes a pair of axially-extending nubs or detents 146 (FIG. 5). The detents 146 are received in respective arcuate grooves 150 formed in the back side 114 of the annular wall 106 (FIG. 4). Accordingly, relative rotation between the collar 42 and the split ring 46 is limited by one or both of the detents 146 engaging an end of the corresponding arcuate groove 150. In the illustrated embodiment, the arcuate grooves 150 are provided with a ridged or knurled texture, which may provide tactile and/or audible feedback when the collar 42 is rotated relative to the split ring 46. The texture may also increase friction between the detents 146 and the grooves 150 to provide the collar 42 with a desired level of rotational resistance. In other embodiments, the grooves 150 may be generally smooth.

In operation, to clamp a tool bit 14 of the first nominal shank size 22, a user rotates the collar 42 (e.g., by about 60 degrees in the illustrated embodiment) to disengage the thread segments 122 on the collar 42 from the thread segments 70 on the chuck body 34. This occurs when the thread segments 122 are aligned with the slots 62, rather than with the thread segments 70. With the thread segments 122, 70 disengaged, the collar 42, split ring 46, and jaws 38 are freely axially movable along the chuck body 34. Next, the user pushes the collar 42 back toward its rearmost position (FIG. 7), corresponding with the open-most position of the jaws 38. The user positions the shank 18 of the tool bit 14 between the jaws 38, and then moves the collar 42 forward until the jaws 38 come into contact with the shank 18. In some embodiments, the collar 42 may be biased forward by a spring (not shown; the spring may act, for example, on the back side 130 of the split ring 46). Next, the user begins to rotate the collar 42 in a tightening direction. Because the axial position of the first thread segments 70*a* corresponds with the first nominal shank size 22, the collar thread segments 122 engage the front of the first thread segments 70*a* (FIG. 8A). The engagement of the thread segments 122, 70*a* advances the collar 42 forward, which in turn pushes the jaws 38 forward and inward to exert a clamping force on the shank 18, thereby securing the tool bit 14 in the chuck assembly 10.

To replace the tool bit 14 with a tool bit 14 of the second nominal shank size 26, the user rotates the collar 42 in a loosening direction opposite the tightening direction to disengage the thread segments 122 on the collar 42 from the thread segments 70 on the chuck body 34. Rotating the collar 42 in the loosening direction also releases the clamping force and permits removal of the existing tool bit 14. With the thread segments 122, 70 disengaged, the collar 42, split ring 46, and jaws 38 are freely axially movable along the chuck body 34. The user pushes the collar 42 back toward its rearmost position (FIG. 7), corresponding with the open-most position of the jaws 38. The user positions the shank 18 of the second nominal size 26 between the jaws 38, and then moves the collar 42 forward until the jaws 38 come into contact with the shank 18. Next, the user begins to rotate the collar 42 in the tightening direction. Because the axial position of the second thread segments 70*b* corresponds with the second nominal shank size 26, the collar thread segments 122 engage the front of the second thread segments 70*b* (FIG. 8B). The engagement of the thread segments 122, 70*b* advances the collar 42 forward, which in turn pushes the jaws 38 forward and inward to exert a clamping force on the shank 18, thereby securing the tool bit 14 in the chuck assembly 10.

Likewise, to replace the tool bit 14 with a tool bit 14 of the third nominal shank size 30, the user rotates the collar 42 in the loosening direction opposite to disengage the thread segments 122 on the collar 42 from the thread segments 70 on the chuck body 34. Rotating the collar 42 in the loosening direction also releases the clamping force and permits removal of the existing tool bit 14. With the thread segments 122, 70 disengaged, the collar 42, split ring 46, and jaws 38 are freely axially movable along the chuck body 34. The user pushes the collar 42 back toward its rearmost position (FIG. 7), corresponding with the open-most position of the jaws 38. The user positions the shank 18 of the third nominal size 30 between the jaws 38, and then moves the collar 42 forward until the jaws 38 come into contact with the shank 18. Next, the user begins to rotate the collar 42 in the tightening direction. Because the axial position of the third thread segments 70c corresponds with the third nominal shank size 30, the collar thread segments 122 engage the front of the third thread segments 70c (FIG. 8C). The engagement of the thread segments 122, 70c advances the collar 42 forward, which in turn pushes the jaws 38 forward and inward to exert a clamping force on the shank 18, thereby securing the tool bit 14 in the chuck assembly 10.

FIGS. 9-13C illustrate a chuck assembly 300 according to another embodiment. Like the chuck assembly 10, the chuck assembly 300 is configured for connection to an output member of a rotary power tool and is able to quickly receive and secure tool bits with standardized shanks of at least two different predetermined, nominal sizes. The illustrated chuck assembly 300 is configured to receive a tool bit 14 with a hexagonal shank 18 of the first nominal size 22, the second nominal size 26, and the third nominal size 30 (FIGS. 2 and 3). The chuck assembly 300 may be configured to receive tool bits with other types of shanks (e.g., square, three-flat, round, etc.). In addition, the chuck assembly 300 may be configured to receive tool bits of four or more different nominal shank sizes.

Figure 10:
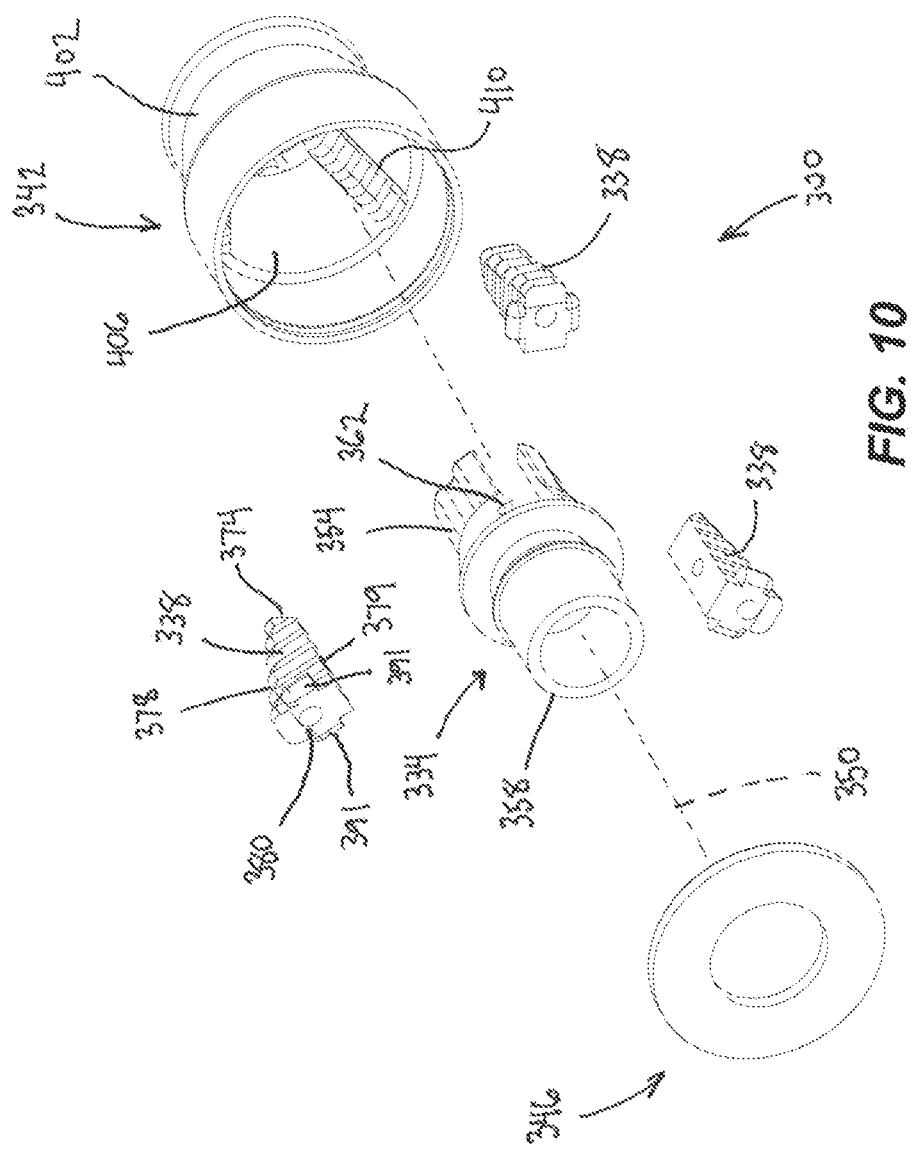
FIG. 10 is an exploded view of the chuck assembly of FIG. 9.
Figure 11:
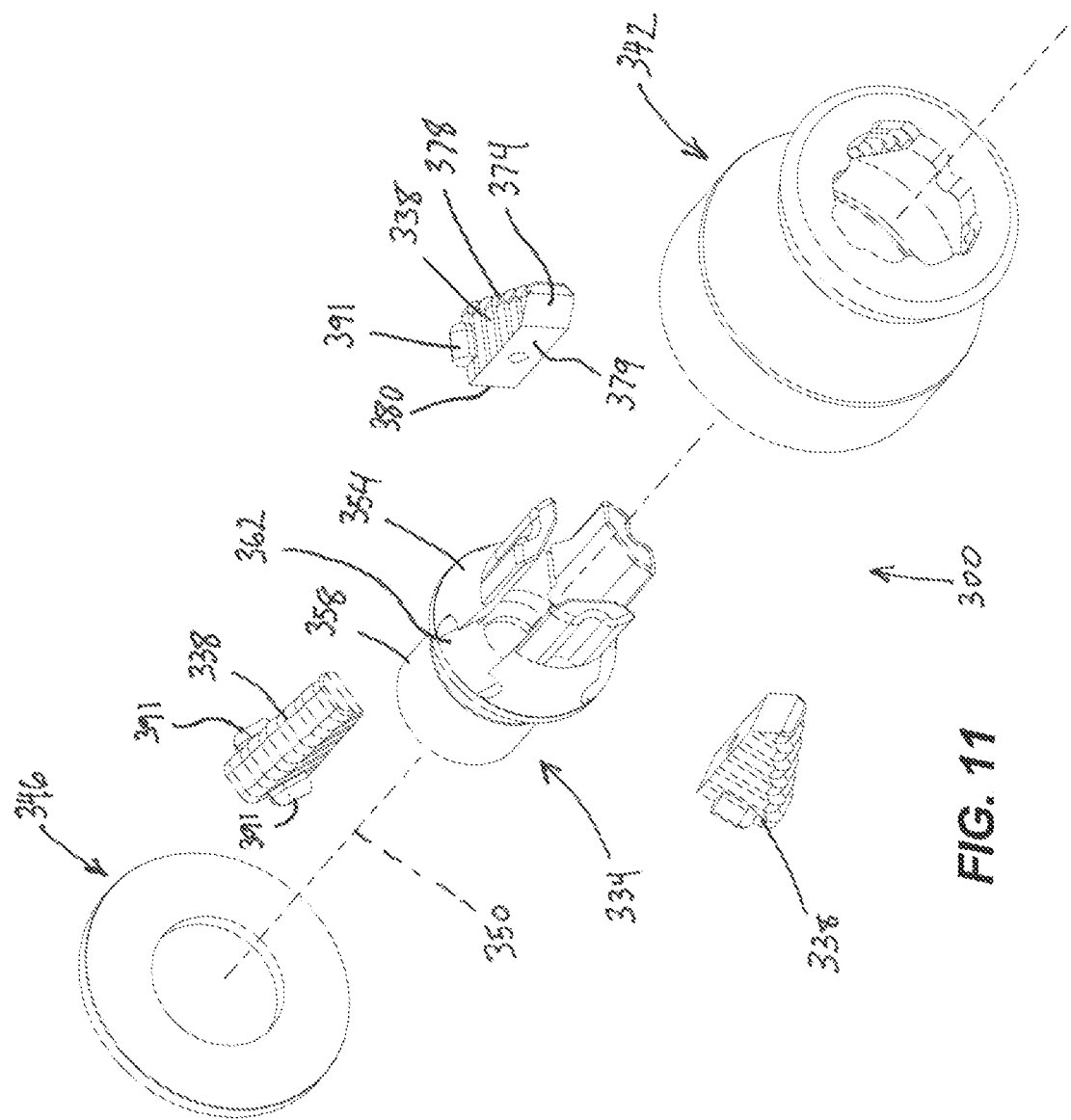
FIG. 11 is another exploded view of the chuck assembly of FIG. 9.

With reference to FIGS. 10 and 11, the chuck assembly 300 includes a chuck body 334, a plurality of jaws 338, a collar 342, and a retaining ring 346. The chuck body 334 is coupled for co-rotation with the output member of the power tool about a central axis 350. The chuck body 334 includes a head portion 354, a shaft portion 358, and a plurality of slots 362 in which the respective jaws 338 are slidably received. Each of the slots 362 is preferably oriented perpendicular to the central axis 350 such that the jaws 338 are movable along the slots 362 toward and away from the central axis 350.

Figure 12:
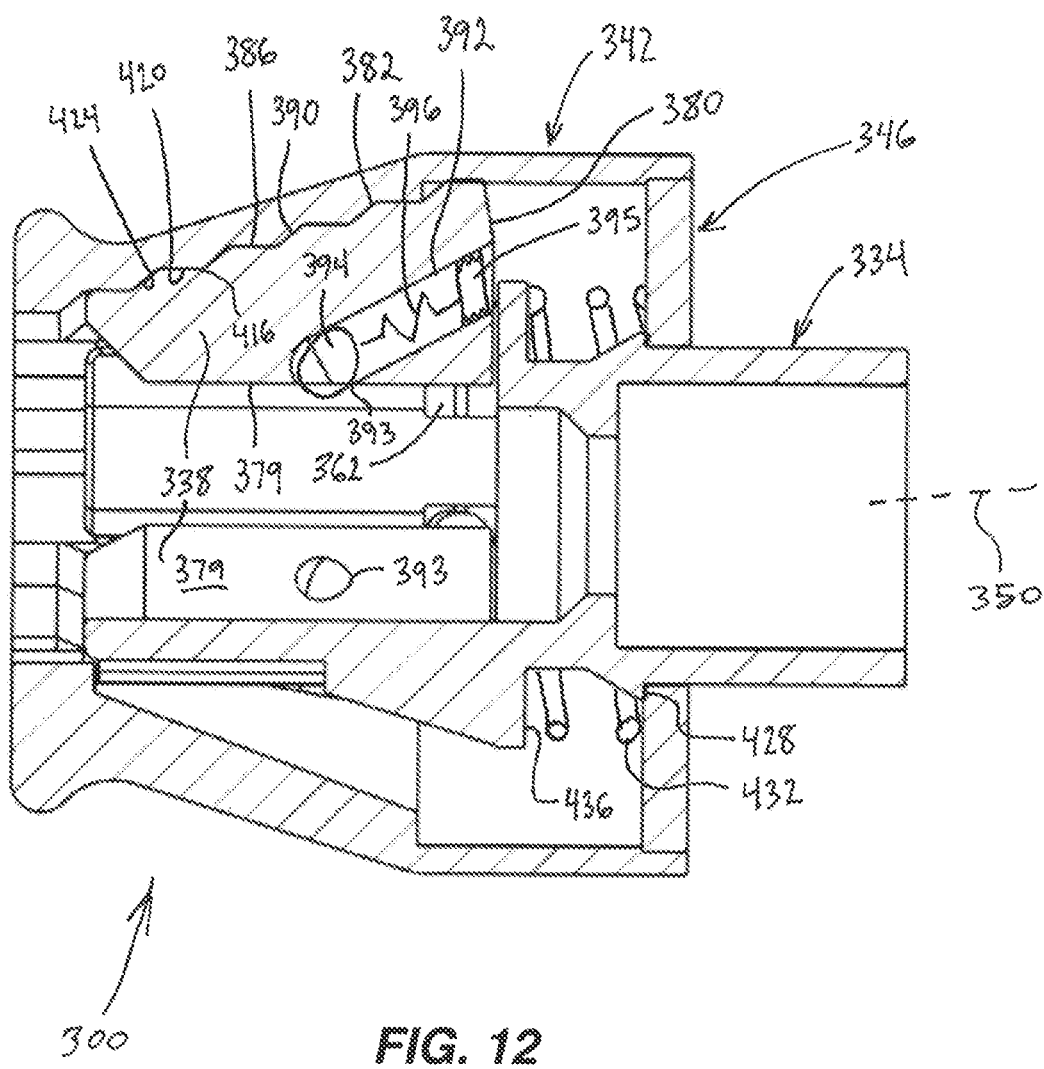
FIG. 12 is a cross-sectional view of the chuck assembly of FIG. 9 with a collar of the chuck assembly in a forwardmost position.
Figure 13A:
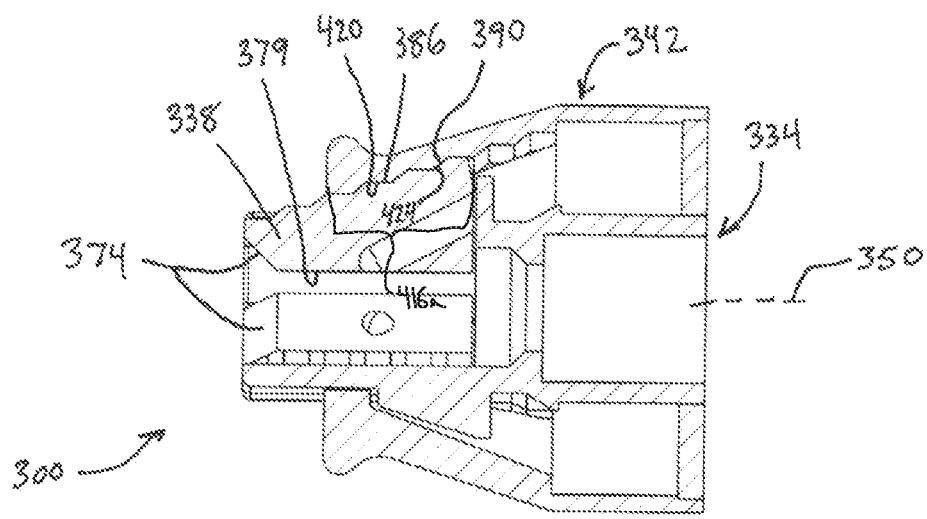
FIG. 13A illustrates the chuck assembly of FIG. 9 configured to secure a shank of a first nominal size.
Figure 13B:
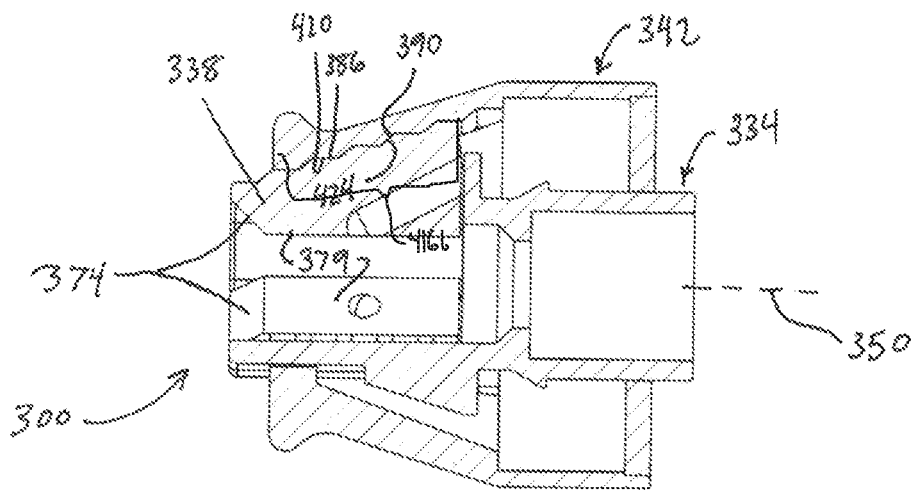
FIG. 13B illustrates the chuck assembly of FIG. 9 configured to secure a shank of a second nominal size.
Figure 13C:
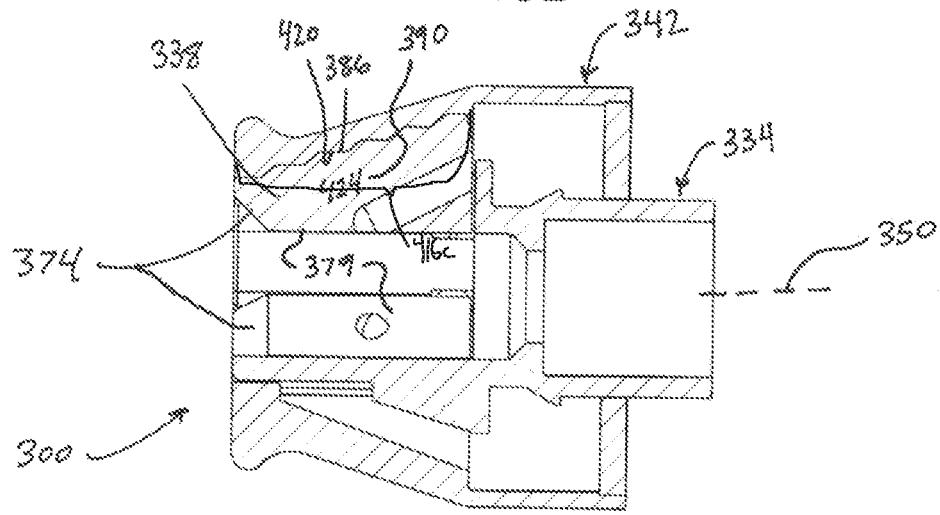
FIG. 13C illustrates the chuck assembly of FIG. 9 configured to secure a shank of a third nominal size.

The illustrated chuck assembly 300 includes three jaws 338; however, the chuck assembly 300 may include any number of jaws 338. Each of the jaws 338 has an angled front portion or tip 374, an oblique outer side 378 extending rearward from the tip 374, a tool-engaging side 379 extending rearward from the tip 374, and a rear side 380 extending between the oblique outer side 378 and the tool-engaging side 379. The tool-engaging side 379 is configured to engage the shank 18 of the tool bit 14 when the bit 14 is received between the jaws 338. The oblique outer side 378 of each jaw 338 is formed with a plurality of steps 382, each defined by a discrete flat surface 386 (or tread) oriented generally parallel to the central axis 350 and an adjacent inclined surface 390 (or riser) oriented at an oblique angle relative to the central axis 350 (FIG. 12). In some embodiments, the flat surfaces 386 may be formed with a draft angle such that the flat surfaces 386 do not extend parallel to the central axis 350 but rather define an angle with the central axis 350 that is smaller than the oblique angle of the inclined surfaces 390. The illustrated jaws 338 also include laterally-extending ears 391 that are received in the slots 362 to guide the jaws 338 along the slots 362 (FIG. 11).

In the illustrated embodiment, each of the jaws 338 further includes a bore 392 extending through the rear side 380 (FIG. 12). The bore 392 intersects the tool-engaging side 379 to define an aperture 393 in the tool-engaging side 379. A detent 394 (e.g., a ball bearing) is disposed within the bore 392 and projects through the aperture 393. The aperture 393 has a diameter at least slightly smaller than a diameter of the detent 394 such that the detent 394 cannot pass through the aperture 393. A plug 395 is provided in the bore 392 at the rear side 380, and a spring 396 is disposed between the plug 395 and the detent 394 to bias the detent 394 toward the aperture 393. The detent 394 of each jaw 338 is engageable with a groove 397 formed in the shank 18 of the tool bit 14 (FIG. 2) to axially retain the tool bit 14 in the chuck assembly 300.

Figure 14:
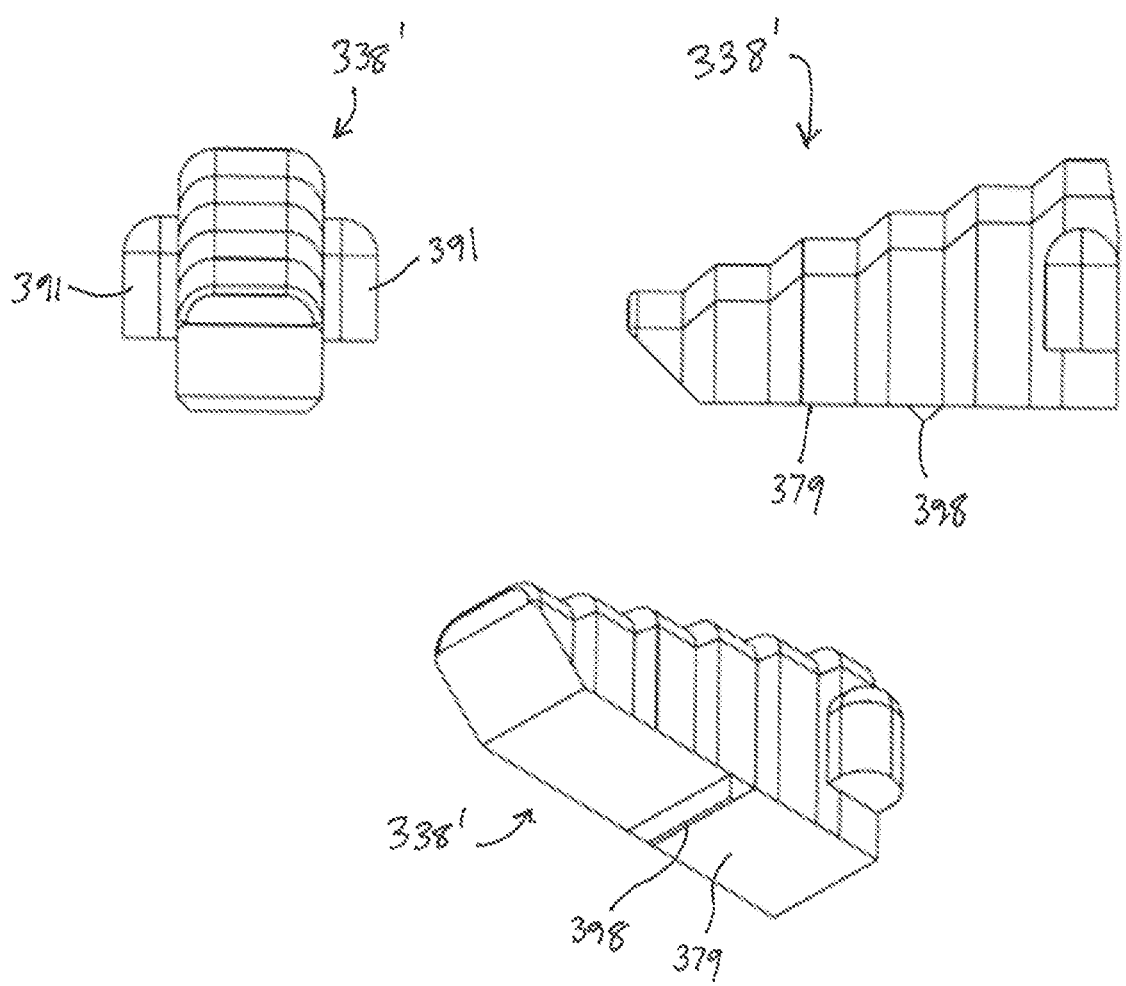
FIG. 14 illustrates a jaw according to another embodiment for use with the chuck assembly of FIG. 9.

In some embodiments, one or more of the jaws 338 may omit the bore 392 and detent components 394, 395, 396. For example, one or more of the jaws 338 may be substituted with an alternative jaw 338' illustrated in FIG. 14. The alternative jaw 338' includes a projecting rib 398 extending laterally along the tool-engaging side 379. Like the detent 394, the projecting rib 398 is engageable with the groove 397 in the shank 18 (FIG. 2) to axially retain the tool bit 14 in the chuck assembly 300.

With reference to FIGS. 10 and 12, the collar 342 is received on the shaft portion 358 of the chuck body 334 and is coupled for co-rotation with the chuck body 334. The illustrated collar 342 includes a user-manipulable outer surface 402 and an angled inner surface 406 that is provided with a plurality of stepped regions 410. The stepped regions 410 each include a plurality of steps 416, each defined by a discrete flat surface 420 (or tread) oriented generally parallel to the central axis 350 and an adjacent inclined surface 424 (or riser) oriented at an oblique angle relative to the central axis 350 (FIG. 12). In some embodiments, the flat surfaces 420 may be formed with a draft angle such that the flat surfaces 420 do not extend parallel to the central axis 350 but rather define an angle with the central axis 350 that is smaller than the oblique angle of the inclined surfaces 424. As described in greater detail below, the collar 342 is axially movable relative to the chuck body 334 such that the steps 416 on the collar 342 are engageable with the steps 382 on the jaws 338 in a plurality of predetermined positions (FIGS. 13A-13C), each corresponding with a different nominal shank size.

Referring to FIG. 12, the retaining ring 346 is fixed to the rear of the collar 342 (e.g., via press-fitting) such that the retaining ring 346 is axially movable with the collar 342 along the chuck body 334. The retaining ring 346 is engageable with a shoulder 428 formed on the chuck body 334 to limit axial movement of the collar 342 to a forward-most position illustrated in FIG. 12. A biasing member 432, which is a coil spring in the illustrated embodiment, extends between a flange 436 on the chuck body 334 and the retaining ring 346 to bias the collar 342 rearward.

In operation, to secure a tool bit 14 of the first nominal shank size 22, a user pulls the collar 342 forward (i.e. to the left in FIGS. 12-13C) along the central axis 350, toward the forwardmost position illustrated in FIG. 12. Next, the user inserts the shank 18 of the bit 14 between the jaws 338. The rear end of the shank 18 engages the angled front portions 374 of the jaws 338 to spread the jaws radially outward to accommodate the shank 18. Once the shank 18 is inserted far enough, the detents 394 engage the groove 397 to axially retain the bit 14 (FIG. 12). The user can then release the collar 342, which moves rearward under the influence of the biasing member 432. With the tool-engaging sides 379 of the jaws 338 abutting the shank 18, the inclined surfaces 424 of the collar steps engage and slide along the inclined surfaces 390 of the steps 382 on the jaws 338 until the collar 342 reaches a first position (FIG. 13A) corresponding with the first nominal size 22. In the first position, a first plurality of steps 416a on the collar 342 engages the steps 382 on the jaws 338. The jaws 338 are prevented from moving radially outwardly by the engagement between the flat surfaces 386, 420. Accordingly, the tool bit 14 is radially and axially retained within the chuck assembly 300.

To replace the tool bit 14 with a tool bit 14 of the second nominal shank size 26, the user pulls the collar 342 forward along the central axis 350, toward the forward-most position illustrated in FIG. 12. This permits the jaws 338 to move radially outward, releasing the existing bit 14. Next, the user inserts the shank 18 of the replacement bit 14 between the jaws 338. The rear end of the shank 18 engages the angled front portions 374 of the jaws 338 to spread the jaws radially outward to accommodate the shank 18. Once the shank 18 is inserted far enough, the detents 394 engage the groove 397 to axially retain the bit 14. The user can then release the collar 342, which moves rearward under the influence of the biasing member 432. With the tool-engaging sides 379 of the jaws 338 abutting the shank 18, the inclined surfaces 424 of the collar steps engage and slide along the inclined surfaces 390 of the steps 382 on the jaws 338 until the collar 342 reaches a second position (FIG. 13B) corresponding with the second nominal size 26. In the second position, a second plurality of steps 416b on the collar 342 engages the steps 382 on the jaws 338. In the illustrated embodiment, the second plurality of steps 416b includes a greater number of steps 416 than the first plurality of steps 416a. The jaws 338 are prevented from moving radially outwardly by the engagement between the flat surfaces 386, 420. Accordingly, the tool bit 14 is radially and axially retained within the chuck assembly 300.

Likewise, to replace the tool bit 14 with a tool bit 14 of the third nominal shank size 30, the user pulls the collar 342 forward along the central axis 350, toward the forwardmost position illustrated in FIG. 12. This permits the jaws 338 to move radially outward, releasing the existing bit 14. Next, the user inserts the shank 18 of the replacement bit 14 between the jaws 338. The rear end of the shank 18 engages the angled front portions 374 of the jaws 338 to spread the jaws radially outward to accommodate the shank 18. Once the shank 18 is inserted far enough, the detents 394 engage the groove 397 to axially retain the bit 14. The user can then release the collar 342, which moves rearward under the influence of the biasing member 432. With the tool-engaging sides 379 of the jaws 338 abutting the shank 18, the inclined surfaces 424 of the collar steps engage and slide along the inclined surfaces 390 of the steps 382 on the jaws 338 until the collar 342 reaches a third position (FIG. 13C) corresponding with the third nominal size 30. In the third position, a third plurality of steps 416c on the collar 342 engages the steps 382 on the jaws 338. In the illustrated embodiment, the third plurality of steps 416c includes a greater number of steps 416 than both the first plurality of steps 416a and the second plurality of steps 416b. The jaws 338 are prevented from moving radially outwardly by the engagement between the flat surfaces 386, 420. Accordingly, the tool bit 14 is radially and axially retained within the chuck assembly 300.

Figure 15:
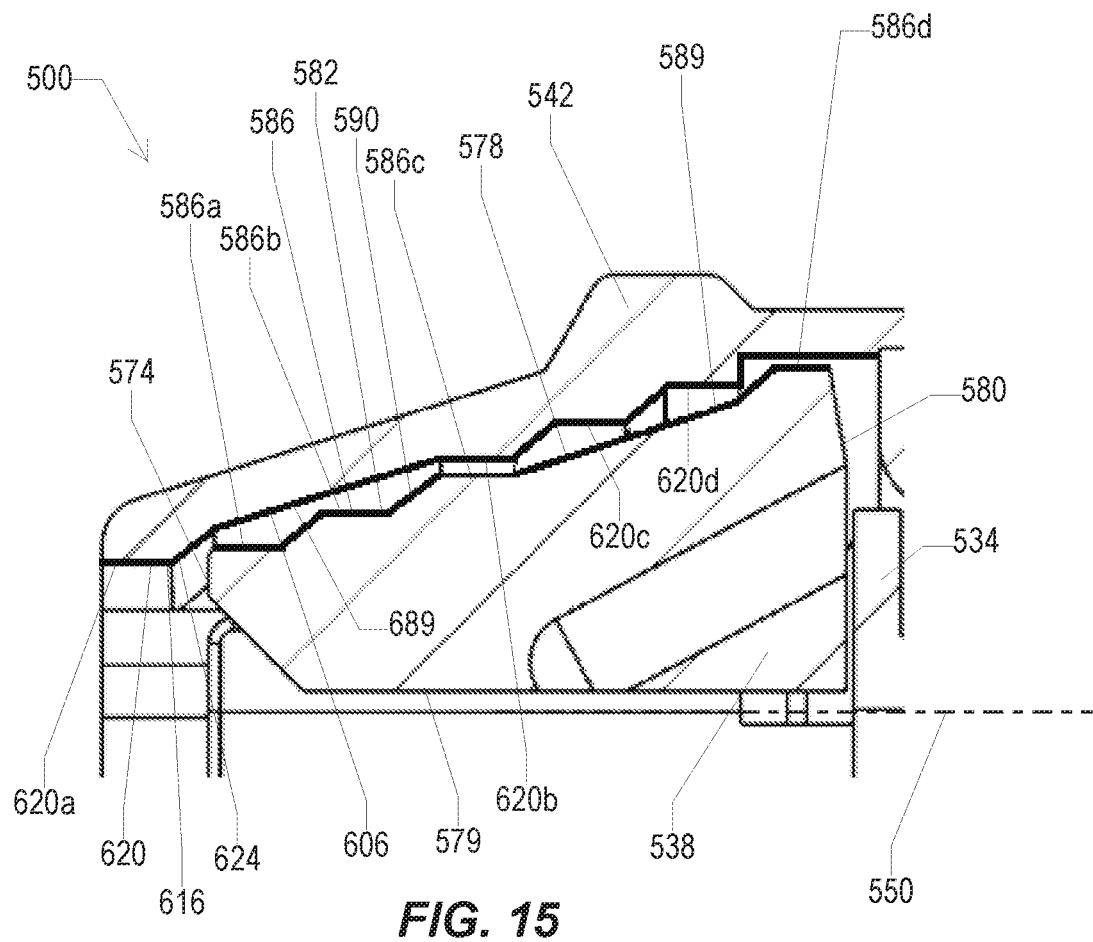
FIG. 15 is a cross-sectional view of a portion of a chuck assembly according to another embodiment of the invention.

FIG. 15 illustrates a portion of a chuck assembly 500 according to another embodiment. The chuck assembly 500 is similar to the chuck assembly 300 described above with reference to FIGS. 9-13C. Accordingly, the following description focuses primarily on differences between the chuck assembly 500 and the chuck assembly 300. In addition, features and elements of the chuck assembly 500 corresponding with features and elements of the chuck assembly 300 are given like reference numbers plus 200.

Referring to FIG. 15, each of the jaws 538 of the chuck assembly 500 has an oblique outer side 578 formed with a plurality of steps 582, each defined by a discrete flat surface 586 oriented generally parallel to the central axis 550 and an adjacent inclined surface 590 oriented at an oblique angle relative to the central axis 550. In some embodiments, the flat surfaces 586 may be formed with a draft angle such that the flat surfaces 586 do not extend parallel to the central axis 550 but rather define an angle with the central axis 550 that is smaller than the oblique angle of the inclined surfaces 590.

The illustrated steps 582 include a first flat surface 586a adjacent the tip 574 of the jaw 538, second and third flat surfaces 586b, 586c proximate the first flat surface 586a. A fourth flat surface 586d is located adjacent the rear side 580 of the jaw 538. The oblique outer side 578 of each jaw 538 also includes a gap or stairless region 589 between the third flat surface 586c and the fourth flat surface 586d. In other embodiments, the steps 582 may include any number of flat surfaces 586 arranged on either side of the gap 589.

The angled inner surface 606 of the collar 542 is provided with a plurality of steps 616, each defined by a discrete flat surface 620 oriented generally parallel to the central axis 550 and an adjacent inclined surface 624 oriented at an oblique angle relative to the central axis 350. In some embodiments, the flat surfaces 620 may be formed with a draft angle such that the flat surfaces 620 do not extend parallel to the central axis 550 but rather define an angle with the central axis 550 that is smaller than the oblique angle of the inclined surfaces 624.

The illustrated steps 616 include first, second, third, and fourth flat surfaces 620a, 620b, 620c, 620d. The first flat surface 620a is disposed adjacent a front end of the collar 542, and the fourth flat surface 520d is disposed proximate a rear end of the collar 542. The angled inner surface 606 of the collar 542 also includes a gap or stairless region 689 between the first flat surface 620a and the second flat surface 620b. In other embodiments, the steps 616 may include any number of flat surfaces 620 arranged on either side of the gap 689.

Figure 16A:
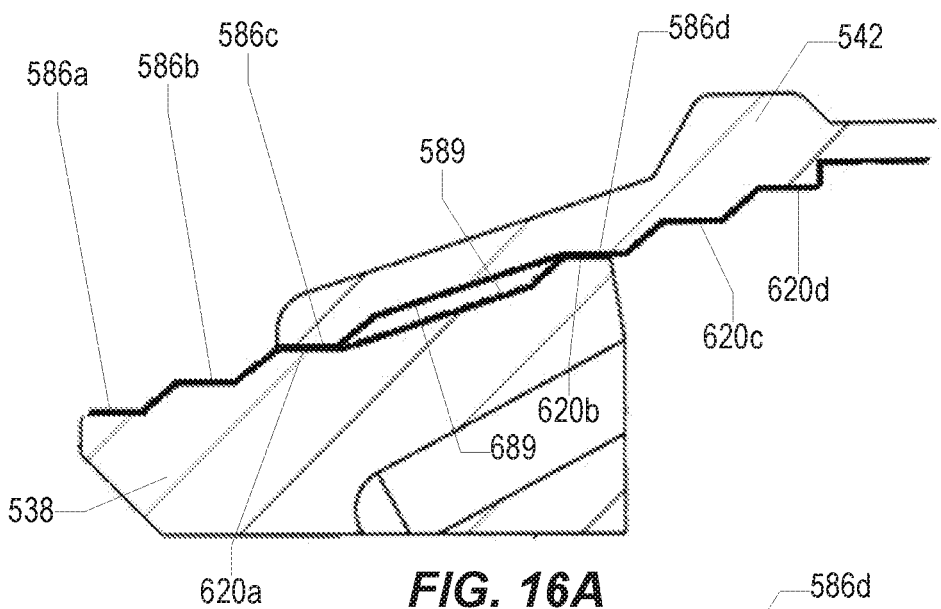
FIG. 16A illustrates the chuck assembly of FIG. 15 configured to secure a shank of the first nominal size.

In operation, when securing a tool bit 14 of the first nominal shank size 22 (FIG. 3), the third flat surface 586c of each jaw 538 engages the corresponding first flat surface 620a of the collar 542, and the fourth flat surface 586d of each jaw 538 engages the corresponding second flat surface 620b of the collar 542 (FIG. 16A). In this position, the gaps 589, 689, are generally aligned.

Figure 16B:
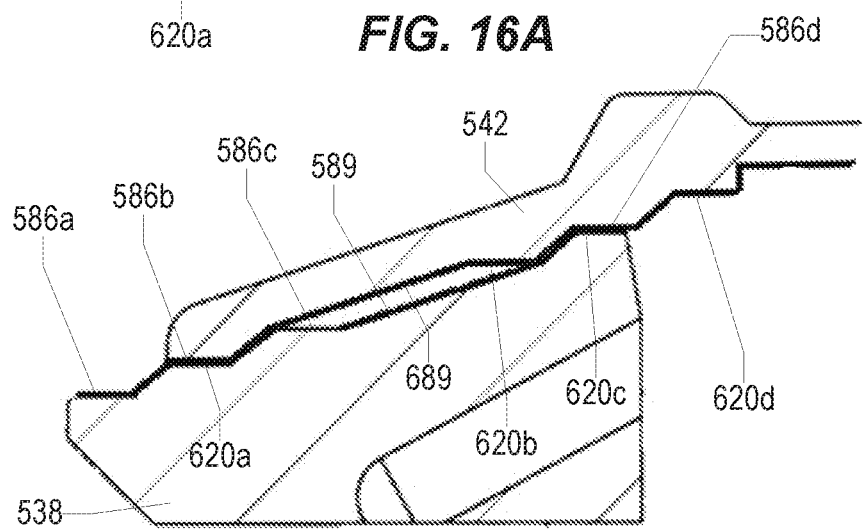
FIG. 16B illustrates the chuck assembly of FIG. 15 configured to secure a shank of the second nominal size.

When securing a tool bit 14 of the second nominal shank size 26 (FIG. 3), the second flat surface 586b of each jaw 538 engages the corresponding first flat surface 620a of the collar 542, and the fourth flat surface 586d of each jaw 538 engages the corresponding third flat surface 620c of the collar 542 (FIG. 16B). The first flat surface 586a of each jaw 538 extends beyond the front of the collar 542, and the third flat surface 586c of each jaw 538 is positioned in the gap 689.

Figure 16C:
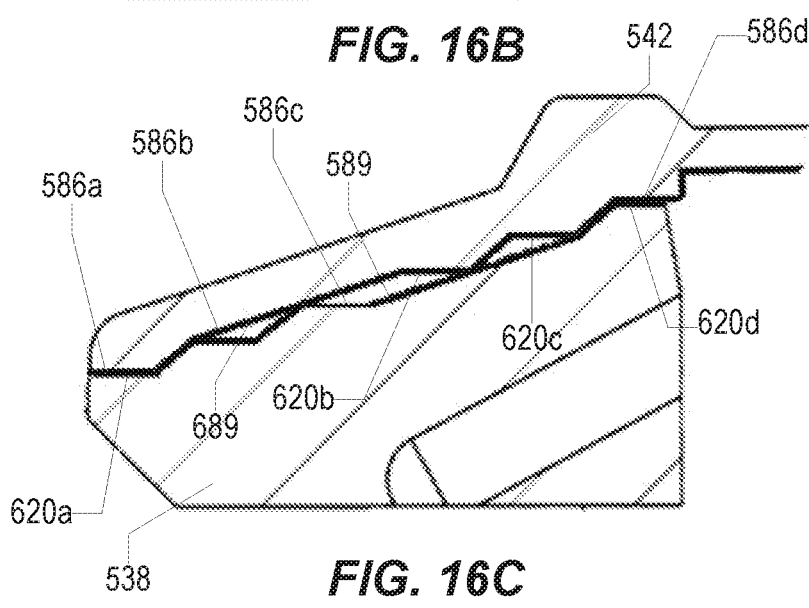
FIG. 16C illustrates the chuck assembly of FIG. 15 configured to secure a shank of the third nominal size.

When securing a tool bit 14 of the third nominal shank size 30 (FIG. 3), the first flat surface 586a of each jaw 538 engages the corresponding first flat surface 620a of the collar 542, and the fourth flat surface 586d of each jaw 538 engages the corresponding fourth flat surface 620d of the collar 542 (FIG. 16C). The remaining flat surfaces 586b, 586c of the jaw 538 are positioned in the gap 689, and the remaining flat surfaces 620b, 620c of the collar 542 are positioned in the gap 589.

Accordingly, the collar 542 engages each of the jaws 538 in the radial direction at only two discrete contact areas for each predetermined nominal shank size 22, 26, 30. The chuck assembly 500 may therefore permit greater tolerance variations on the jaws 538 and/or the collar 542 compared to the chuck assembly 300, for example, and/or provide better fitment of the jaws 538 and collar 542.

Figure 17:
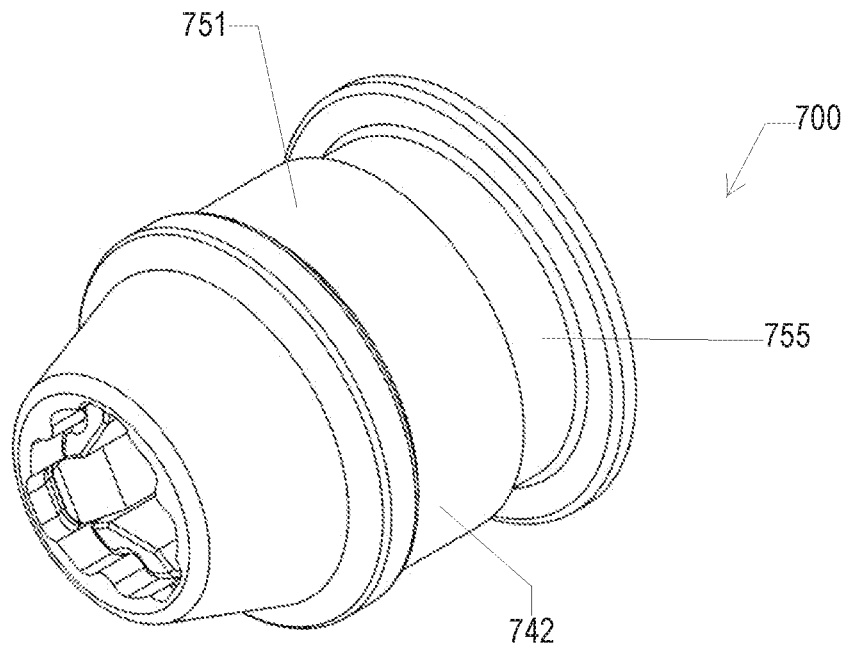
FIG. 17 is a perspective view of a chuck assembly according to another embodiment of the invention.
Figure 18:
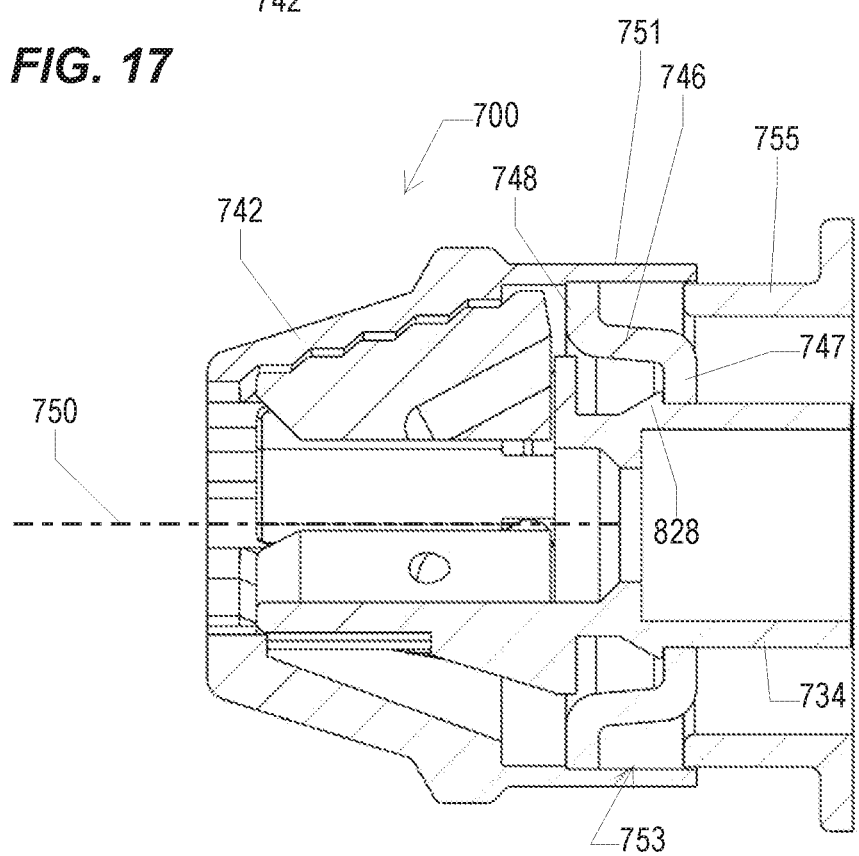
FIG. 18 is a cross-sectional view of the chuck assembly of FIG. 17.

FIGS. 17 and 18 illustrate a chuck assembly 700 according to another embodiment. The chuck assembly 700 is similar to the chuck assembly 300 described above with reference to FIGS. 9-13C. Accordingly, the following description focuses primarily on differences between the chuck assembly 700 and the chuck assembly 300. In addition, features and elements of the chuck assembly 700 corresponding with features and elements of the chuck assembly 300 are given like reference numbers plus 400.

The chuck assembly 700 includes a retaining ring 746 that has a cupped shape such that the retaining ring 746 defines an inner flange portion 747 and an outer flange portion 748 that is offset from the inner flange portion 747 along the central axis 750. The outer flange portion 748 is fixed within the collar 742 (e.g., via press-fitting) such that the retaining ring 746 is axially movable with the collar 742 along the chuck body 734. The retaining ring 746 is engageable with a shoulder 828 formed on the chuck body 734 to limit axial movement of the collar 742 to a forward-most position illustrated in FIG. 18.

With continued reference to FIG. 18, the illustrated collar 742 includes a skirt 751 extending rearward from the outer flange portion 748 of the retaining ring 746. An annular recess 753 is defined between the skirt 751 and the retaining ring 746. The annular recess 753 may receive an annular projecting portion 755 formed, for example, as a part of the chuck body 734 or as a part of a front end assembly of a power tool.

Figure 19:
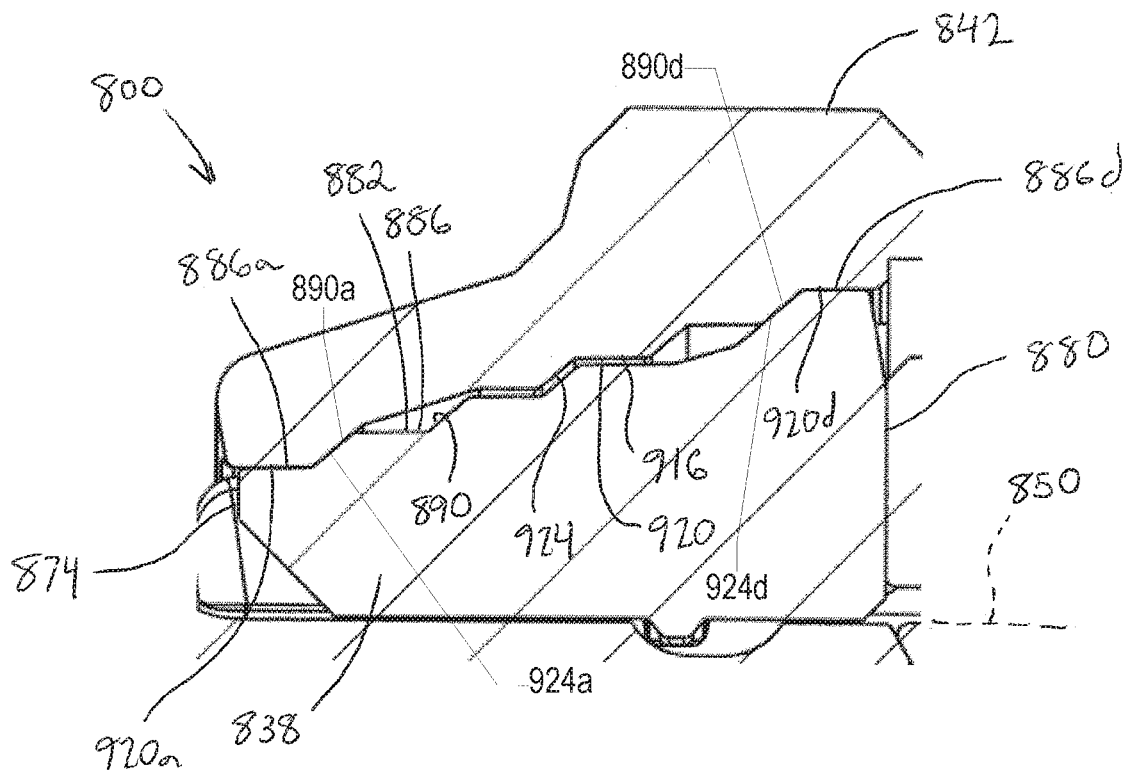
FIG. 19 is a cross-sectional view of a portion of a chuck assembly according to another embodiment of the invention.

FIG. 19 illustrates a portion of a chuck assembly 800 according to another embodiment. The chuck assembly 800 is similar to the chuck assembly 300 described above with reference to FIGS. 9-13C. Accordingly, the following description focuses primarily on differences between the chuck assembly 800 and the chuck assembly 300. In addition, features and elements of the chuck assembly 800 corresponding with features and elements of the chuck assembly 300 are given like reference numbers plus 500.

Each of the jaws 838 of the chuck assembly 800 has a plurality of steps 882. The steps 882 are each defined by a discrete flat surface 886 oriented generally parallel to the central axis 850 and an adjacent inclined surface 890 oriented at an oblique angle relative to the central axis 850. The illustrated steps 882 include a first flat surface 886a adjacent the tip 874 of the jaw 838 and a last flat surface 886d is located adjacent the rear side 880 of the jaw 838. A first inclined surface 890a extends from the first flat surface 886a, and a last inclined surface 890d extends from the last flat surface 886d. In some embodiments, the flat surfaces 886 may be formed with a draft angle such that the flat surfaces 886 do not extend parallel to the central axis 850 but rather define an angle with the central axis 850.

The inside of the collar 842 is provided with a plurality of steps 916. The steps 916 are each defined by a discrete flat surface 920 oriented generally parallel to the central axis 850 and an adjacent inclined surface 924 oriented at an oblique angle relative to the central axis 850. The illustrated steps 916 include a first flat surface 920a is disposed adjacent a front end of the collar 842, and a last flat surface 920d is disposed proximate a rear end of the collar 842. A first inclined surface 924a extends from the first flat surface 920a, and a last inclined surface 924d extends from the last flat surface 920d. In some embodiments, the flat surfaces 920 may be formed with a draft angle such that the flat surfaces 920 do not extend parallel to the central axis 850 but rather define an angle with the central axis 850.

The first flat surface 920a of the collar 842 and the last flat surface 886d of the jaws 838 are taller than the other flat surfaces 920 and 886, respectively. In other words, the inclined surface 924 adjacent the first flat surface 920a and the inclined surface 890 adjacent the last flat surface 886d are longer than the other inclined surfaces 924, 890 of the collar 842 and the jaws 838, respectively. As such, the collar 842 engages each of the jaws 838 in the radial direction at as few as two discrete contact areas for each predetermined nominal shank size 22, 26, 30. In the illustrated embodiment, the first inclined surfaces 890a, 924a are located behind the first flat surfaces 886a, 920a such that the inclined surfaces 890a, 924a and flat surfaces 886a, 920a intersect at an angle pointing generally radially inward. The last inclined surfaces 890d, 924d are located in front of the last flat surfaces 886d, 920d such that the inclined surfaces 890d, 924d and flat surfaces 886d, 920d intersect at an angle pointing generally radially outward. The steps 882, 916 can be configured in a variety of different ways such that adjacent surfaces 886, 890, 920, 924 may intersect at an angle pointing generally radially outward or inward.

Figure 20:
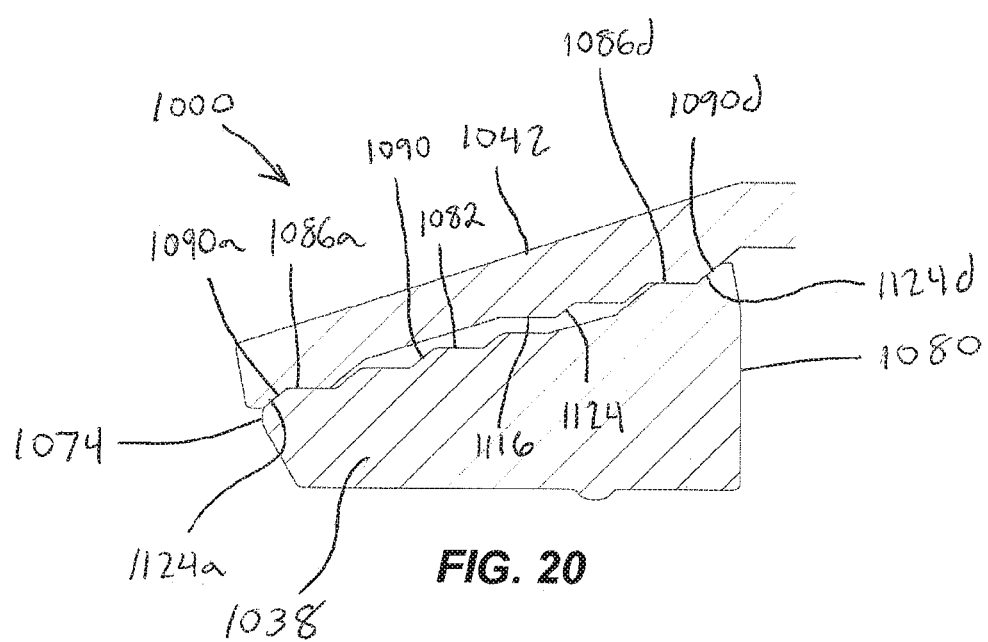
FIG. 20 is a cross-sectional view of a portion of a chuck assembly according to another embodiment of the invention.

FIG. 20 illustrates a portion of a chuck assembly 1000 according to another embodiment. The chuck assembly 1000 is similar to the chuck assembly 800 described above with reference FIG. 19. Accordingly, the following description focuses primarily on differences between the chuck assembly 1000 and the chuck assembly 800. In addition, features and elements of the chuck assembly 1000 corresponding with features and elements of the chuck assembly 800 are given like reference numbers plus 200.

Each of the jaws 1038 of the chuck assembly 1000 has a front inclined surface 1090a extending from the tip 1074 and disposed in front of the first flat surface 1086a. The front inclined surface 1090a and the first flat surface 1086a intersect at an angle pointing generally radially outward. Each of the jaws 1038 also includes a rear inclined surface 1090d extending from the last flat surface 1086d and proximate the rear side 1080. The rear inclined surface 1090d and the last flat surface 1086d intersect at an angle pointing generally radially inward. The steps 1082 can be configured in a variety of different ways such that adjacent surfaces 1086, 1090 may intersect at an angle pointing generally radially outward or inward.

Similarly, the collar 1042 includes a front inclined surface 1124a and a rear inclined surface 1124d. In the illustrated position of the collar 1042, the front inclined surface 1090a of each jaw 1038 engages the front inclined surface 1124a of the collar 1042, and the rear inclined surface 1090d of each jaw 1038 engages the rear inclined surface 1124d of the collar 1042. The inclined surfaces 1090a, 1090d, 1124a, 1124d are engageable with the other inclined surfaces 1090, 1124 that form the steps 1082, 1116 of the jaws 1038 and the collar 1042, respectively, in other positions of the collar 1042. The additional engagement provided by the inclined surfaces 1090a, 1090d, 1124a, 1124d may improve the alignment of the jaws 1038.

Figure 21:
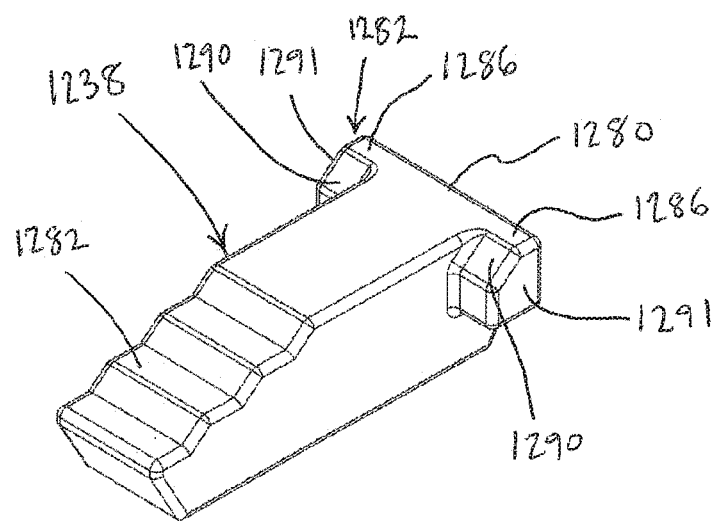
FIG. 21 is a perspective view of a jaw according to one embodiment, for use with a chuck assembly.

FIG. 21 illustrates an alternative jaw 1238 that may be used, for example, with any of the chuck assemblies described herein. The jaw 1238 includes laterally-extending ears 1291 or wings at the rear side 1280 of the jaw 1238. The ears 1291 may be received in slots (e.g., the slots 362 described above with reference to FIG. 11) to guide radial movement of the jaw 1238. Each of the ears 1291 includes a flat surface 1286 and an adjacent inclined surface 1290. The flat surface 1286 and the inclined surface 1290 act as the final step 1282, allowing the overall height of the jaw 1238

(and, therefore, the overall diameter of a corresponding chuck assembly) to be reduced.

Figure 22:
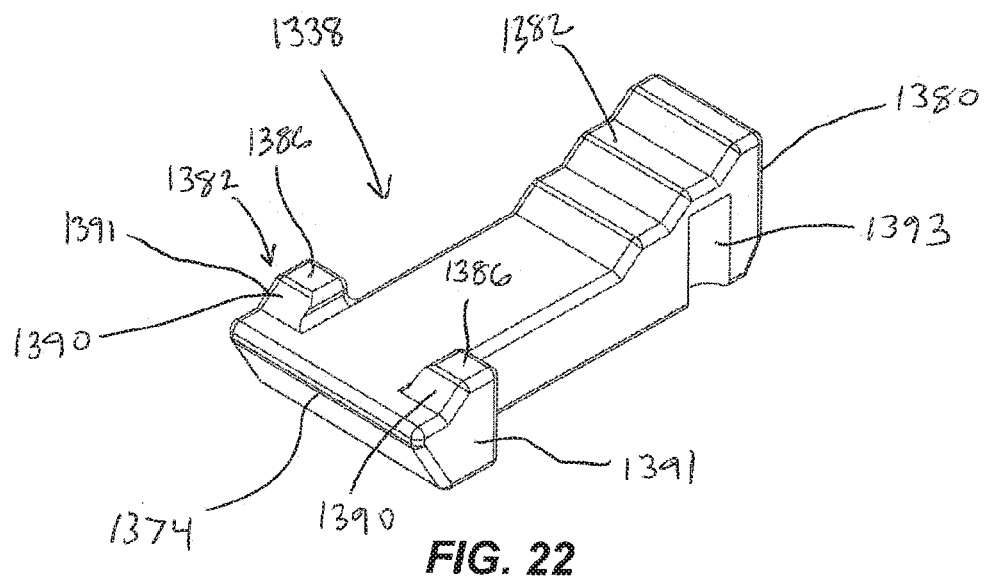
FIG. 22 is a perspective view of a jaw according to another embodiment, for use with a chuck assembly.

FIG. 22 illustrates an alternative jaw 1338 that may be used, for example, with any of the chuck assemblies described herein. The jaw 1338 includes laterally-extending ears 1391 or wings proximate the tip 1374. Placement of the ears 1391 proximate the tip 1374 may enhance the strength of the jaw 1338 and/or the corresponding chuck body. The illustrated jaw 1338 further includes lateral slots 1393 located proximate the rear side 1380 of the jaw 1338. The slots 1393 receive corresponding projections (not shown) to guide radial movement of the jaw 1338. Each of the ears 1391 includes a flat surface 1386 and an adjacent inclined surface 1390. The flat surface 1386 and the inclined surface 1390 act as one of the steps 1382, allowing the overall height of the jaw 1338 (and, therefore, the overall diameter of a corresponding chuck assembly) to be reduced.

Figure 23:
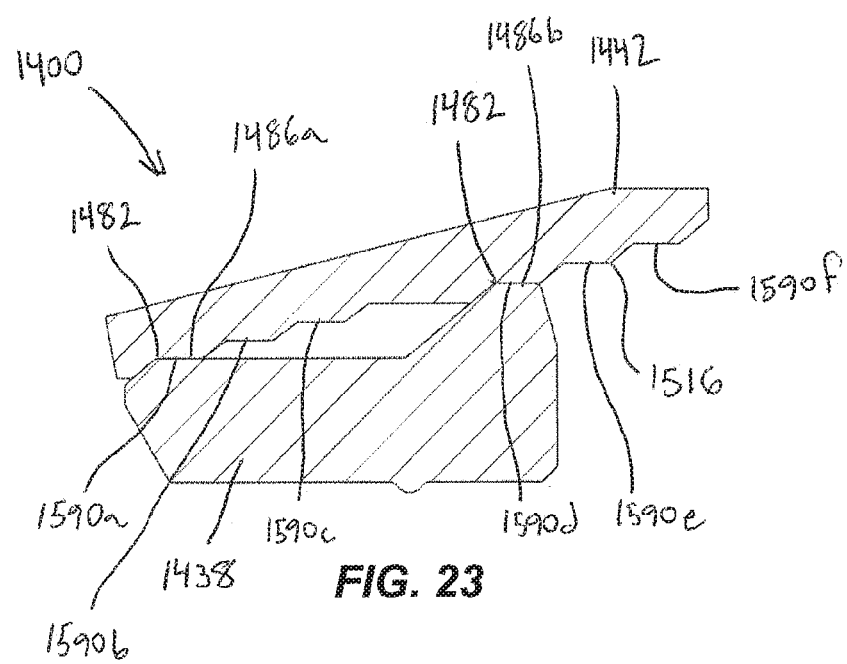
FIG. 23 is a cross-sectional view of a portion of a chuck assembly according to another embodiment of the invention.

FIG. 23 illustrates a portion of a chuck assembly 1400 according to another embodiment. The chuck assembly 1400 is similar to the chuck assembly 300 described above with reference to FIGS. 9-13C. Accordingly, the following description focuses primarily on differences between the chuck assembly 1400 and the chuck assembly 300. In addition, features and elements of the chuck assembly 1400 corresponding with features and elements of the chuck assembly 300 are given like reference numbers plus 1100.

Each of the jaws 1438 of the chuck assembly 1400 includes only two steps 1482, and the collar 1442 includes a greater number of steps 1516 than the jaws 1438. Each jaw has a first flat surface 1486*a* and a second flat surface 1486*b*. The first flat surface 1486*a* is engageable with first, second, or third flat surfaces 1590*a-c* of the collar 1442, and the second flat surface 1486*b* is engageable with fourth, fifth, or sixth flat surface 1590*d-f* of the collar 1442, depending on what size shank 18 (FIG. 2) is inserted between the jaws 1438.

Figure 24:
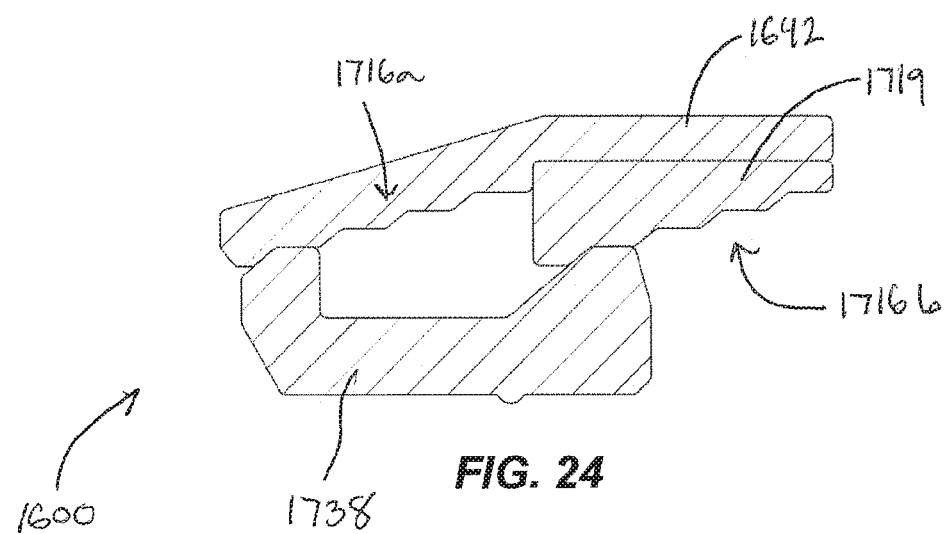
FIG. 24 is a cross-sectional view of a portion of a chuck assembly according to another embodiment of the invention.

FIG. 24 illustrates a portion of a chuck assembly 1600 according to another embodiment. The chuck assembly 1600 is similar to the chuck assembly 1400 described above with reference to FIG. 23. Accordingly, the following description focuses primarily on differences between the chuck assembly 1600 and the chuck assembly 1400. In addition, features and elements of the chuck assembly 1600 corresponding with features and elements of the chuck assembly 1400 are given like reference numbers plus 200.

The collar 1642 includes a first plurality of steps 1716*a* and a second plurality of steps 1716*b*. The second plurality of steps 1716*b* is provided on an insert 1719 disposed within the collar 1642. The insert 1719 may be secured within the collar 1642 in a variety of ways, such as by press-fitting.

Figure 25A:
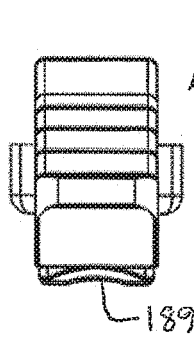
FIG. 25A is a front view of a jaw according to another embodiment, for use with a chuck assembly.
Figure 25B:
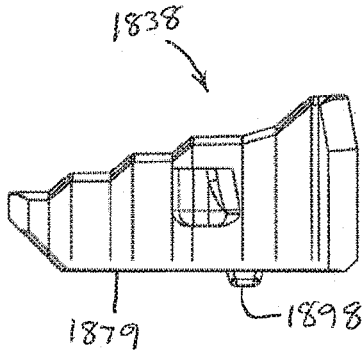
FIG. 25B is a side view of the jaw of FIG. 25A.
Figure 25C:
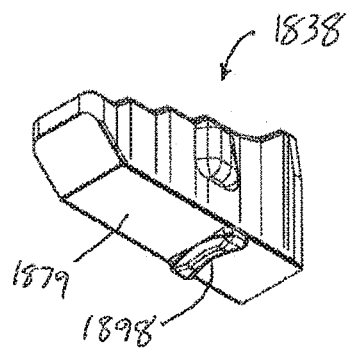
FIG. 25C is a perspective view of the jaw of FIG. 25A.

FIGS. 25A-C illustrate an alternative jaw 1838 that may be used, for example, with any of the chuck assemblies described herein. The jaw 1838 includes a projecting rib 1898 extending laterally along the tool-engaging side 1879. Like the detent 394 and the projecting rib 398 described above with reference to FIGS. 12 and 14, the rib 1898 is engageable with the groove 397 in the shank 18 (FIG. 2) to axially retain the tool bit 14 in the chuck assembly. In the illustrated embodiment, the rib 1898 has an arcuate shape that provides a greater contact area between the rib 1898 and the tool bit 14. This advantageously reduces stress on the rib 1898.

Figure 26A:
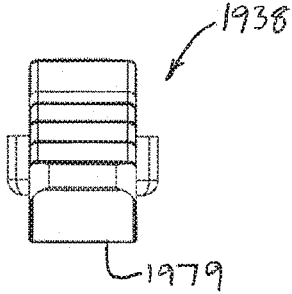
FIG. 26A is a front view of a jaw according to another embodiment, for use with a chuck assembly.
Figure 26B:
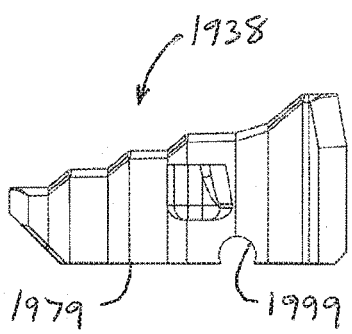
FIG. 26B is a side view of the jaw of FIG. 26A.
Figure 26C:
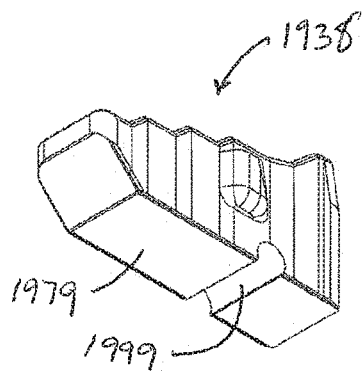
FIG. 26C is a perspective view of the jaw of FIG. 26A.

FIGS. 26A-C illustrate an alternative jaw 1938 that may be used, for example, with any of the chuck assemblies described herein. The jaw 1938 includes a retaining recess 1999 extending laterally across the tool-engaging side 1979. The retaining recess 1999 may receive a retaining element (not shown), such as a cylindrical pin. Like the detent 394 and the projecting rib 398 described above with reference to FIGS. 12 and 14, the retaining element is engageable with the groove 397 in the shank 18 (FIG. 2) to axially retain the tool bit 14 in the chuck assembly.

The retaining element may be held within the retaining recess 1999 by via any suitable means, such as by a press-fit, welding, or chemical bonding. Alternatively, the retaining element may be held within the recess 1999 by other components of a chuck assembly. In some embodiments, the retaining element may be removable and replaceable. In some embodiments, the retaining element may have different material properties from the remainder of the jaw 1938. For example, the retaining element may have a higher hardness, a lower coefficient of friction, and the like.

Figure 27A:
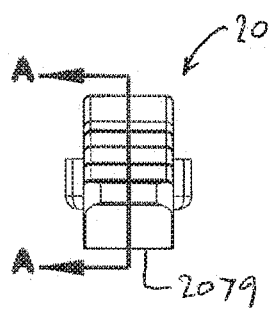
FIG. 27A is a front view of a jaw according to another embodiment, for use with a chuck assembly.
Figure 27B:
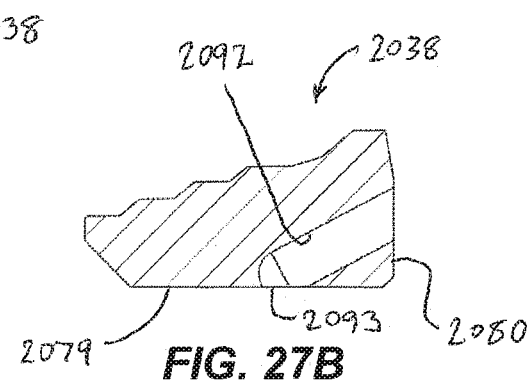
FIG. 27B is a cross-sectional view of the jaw of FIG. 27A.
Figure 27C:
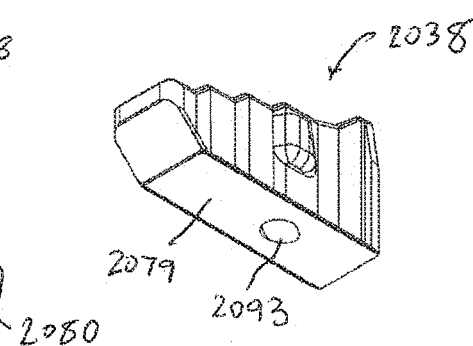
FIG. 27C is a perspective view of the jaw of FIG. 27A.

FIGS. 27A-C illustrate an alternative jaw 2038 that may be used, for example, with any of the chuck assemblies described herein. The jaw 2038 includes a bore 2092 extending through the rear side 2080 (FIG. 27B). The bore 2092 intersects the tool-engaging side 2079 to define an aperture 2093 in the tool-engaging side 2079. The bore 2092 can accommodate a variety of retaining elements.

Figure 28:
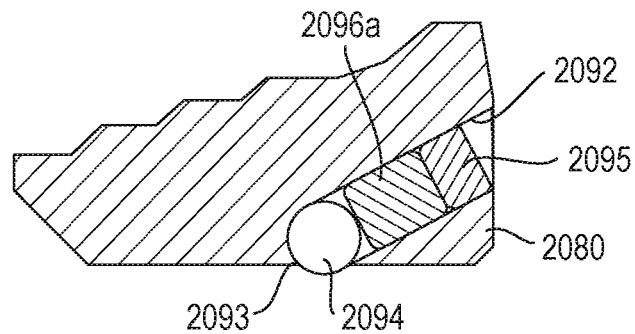
FIG. 28 is a cross-sectional view of a jaw according to another embodiment, for use with a chuck assembly.

For example, as illustrated in FIG. 28, a detent 2094 (e.g., a ball bearing) is disposed within the bore 2092 and projects through the aperture 2093. The aperture 2093 may be circular, or may have other, non-circular shapes. The aperture 2093 has a diameter (or maximum width dimension) at least slightly smaller than a diameter of the detent 2094 such that the detent 2094 cannot pass through the aperture 2093. A plug 2095 is provided in the bore 2092 at the rear side 2080, and a compressible element 2096*a* is disposed between the plug 2095 and the detent 2094 to bias the detent 2094 toward the aperture 2093. The plug 2095 may be a snap ring or a solid part pressed into the bore 2092. The detent 2094 is engageable with a groove 397 formed in the shank 18 of the tool bit 14 (FIG. 2) to axially retain the tool bit 14 in the chuck assembly.

Figure 29:
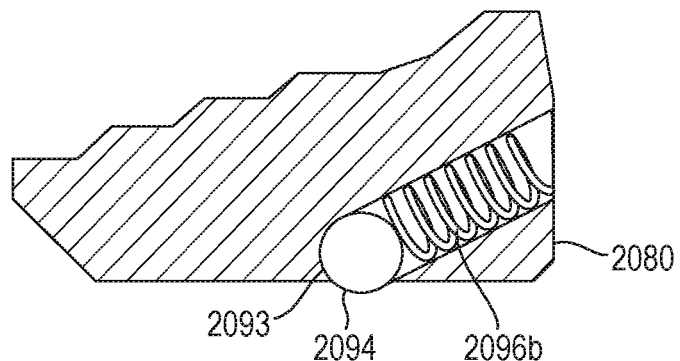
FIG. 29 is a cross-sectional view of a jaw according to another embodiment, for use with a chuck assembly.

In another embodiment, illustrated in FIG. 29, the compressible element 2096*a* is replaced by a coil spring 2096*b*, and the plug 2095 is omitted. The spring 2096*b* may be retained, for example, by a washer (not shown) held against the rear side 2080 or by any other suitable means (including the plug 2095).

Figure 30:
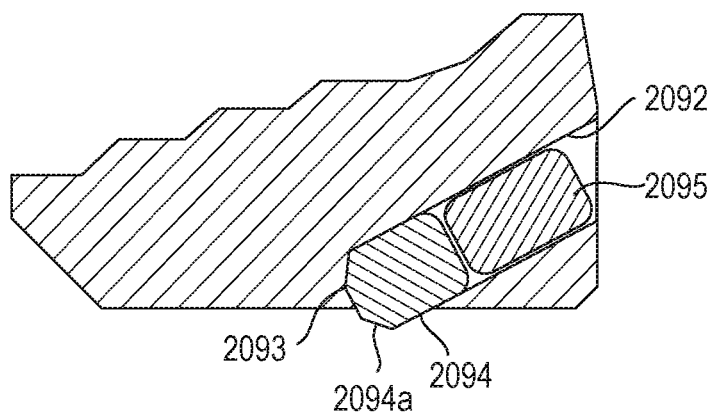
FIG. 30 is a cross-sectional view of a jaw according to another embodiment, for use with a chuck assembly.

In another embodiment, illustrated in FIG. 30, the detent 2094 is a pin with a chamfered end 2094*a*, and the plug 2095 is made of a compressible material such that the plug 2095 both retains the detent 2094 within the bore 2092 and biases the detent 2094 toward the aperture 2093.

Figure 31A:
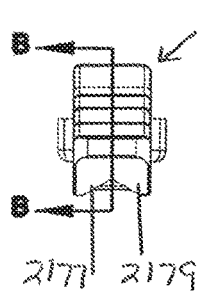
FIG. 31A is a front view of a jaw according to another embodiment, for use with a chuck assembly.
Figure 31B:
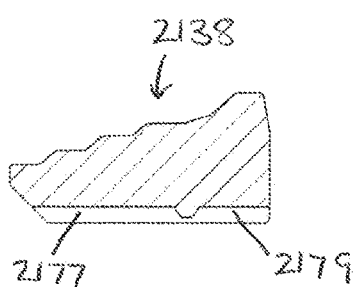
FIG. 31B is a cross-sectional view of the jaw of FIG. 31A.
Figure 31C:
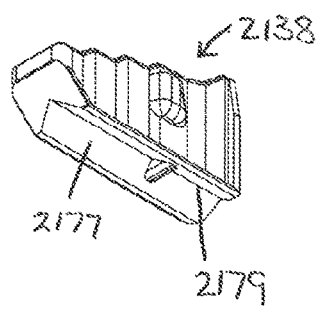
FIG. 31C is a perspective view of the jaw of FIG. 31A.

FIGS. 31A-C illustrate an alternative jaw 2138 that may be used, for example, with any of the chuck assemblies described herein. The jaw 2138 includes a V-shaped groove 2177 in the tool-engaging side 2179. The groove 2177 engages adjacent sides of the shank 18 (FIG. 2) and, in some embodiments, allows the tool bit 14 to be securely held with only two jaws 2138. In other embodiments, any number of jaws 2138 may be used in a chuck assembly.

Figure 32:
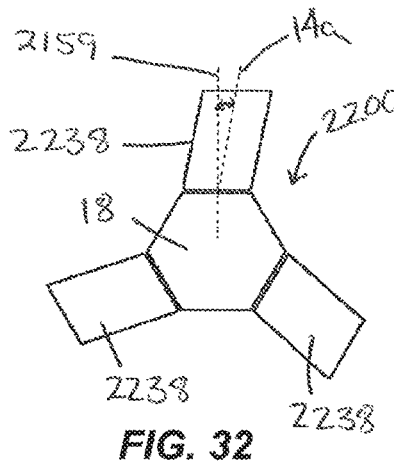
FIG. 32 is a cross-sectional view of a portion of a chuck assembly according to another embodiment of the invention.

FIG. 32 illustrates a chuck assembly 2200 according to another embodiment. The chuck assembly 2200 includes jaws 2238 that are each movable outward along an axis 2259 to accommodate differently sized shanks 18 (FIG. 2). The axis 2259 forms an acute included angle with a radial axis 14*a* of the bit 14 (FIG. 32).

Figure 33:
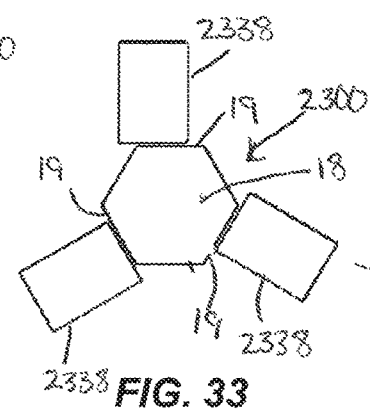
FIG. 33 is a cross-sectional view of a portion of a chuck assembly according to another embodiment of the invention.

FIG. 33 illustrates a chuck assembly 2300 according to another embodiment. The chuck assembly 2300 includes jaws 2338 that are each partially offset from the drive surfaces 19 of the hexagonal shank 18, in directions parallel to the respective drive surfaces 19. In other words, each of the jaws 2338 extends beyond an outer edge of the associated drive surface 19 in the radially outward direction. The direction of offset may be selected to reduce stresses on the jaws 2338 when the chuck assembly 2300 rotates in a particular direction.

Figure 34:
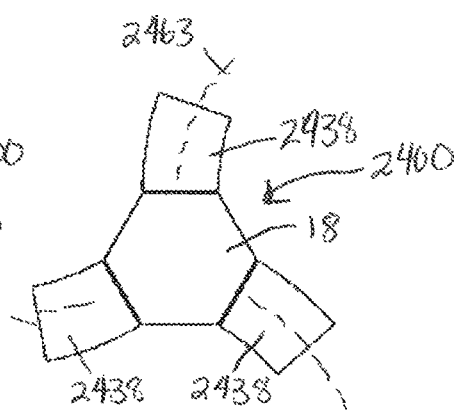
FIG. 34 is a cross-sectional view of a portion of a chuck assembly according to another embodiment of the invention.

FIG. 34 illustrates a chuck assembly 2400 according to another embodiment. The chuck assembly 2400 includes jaws 2438 that are each movable outward along an arcuate path 2463 to accommodate differently sized shanks 18 (FIG. 2).

Figure 35:
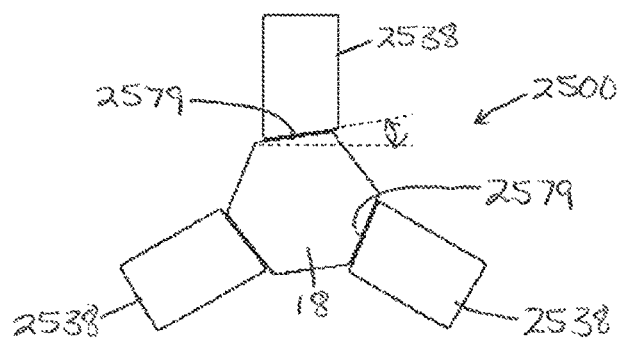
FIG. 35 is a cross-sectional view of a portion of a chuck assembly according to another embodiment of the invention.

FIG. 35 illustrates a chuck assembly 2500 according to another embodiment. The chuck assembly 2500 includes jaws 2538, each with a tool engaging side 2579 oriented at an oblique angle. The oblique orientation of the tool engaging sides 2579 may provide improved torque transfer to the tool bit 14 in a rotational direction 2581 (preferably the "forward" rotational direction of the tool bit 14).

Figure 36:
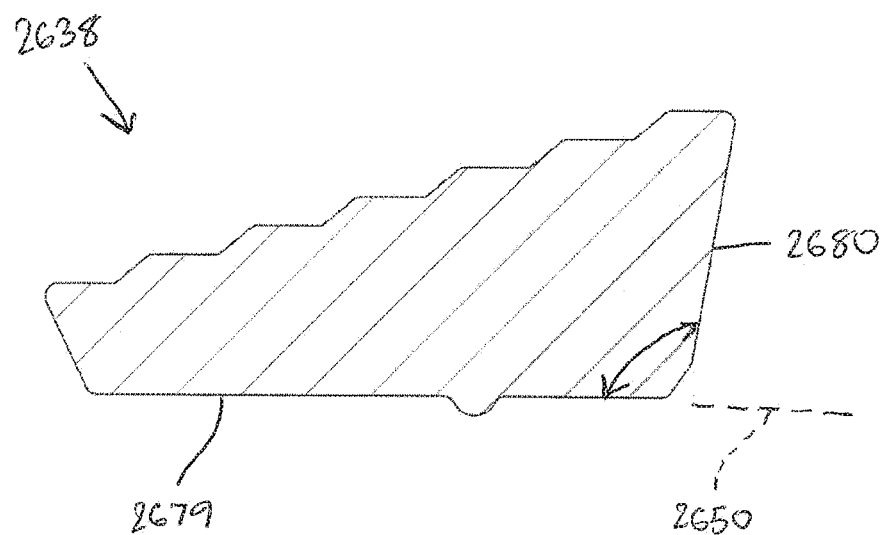
FIG. 36 is a cross-sectional view of a jaw according to another embodiment, for use with a chuck assembly.

FIG. 36 illustrates an alternative jaw 2638 that may be used, for example, with any of the chuck assemblies described herein. The jaw 2638 includes a tool engaging side 2679 and a rear side 2680 oriented at an oblique angle with respect to the tool engaging side 2679. In the illustrated embodiment, the rear side 2680 is angled rearward, such that engagement of the rear side 2680 with the chuck body (e.g., the chuck body 334; FIG. 12) causes the jaw 2638 to move radially outward and axially rearward (along the central axis 2650) in response to insertion or removal of the tool bit 14 (FIG. 2). Alternatively, the rear side 2680 may be angled forward. The oblique angle may be selected to facilitate insertion/removal of the tool bit 14, engagement and alignment with the groove 397, or to increase or decrease a contact area between the jaw 2638 and collar (e.g., the collar 342; FIG. 10).

Figure 37:
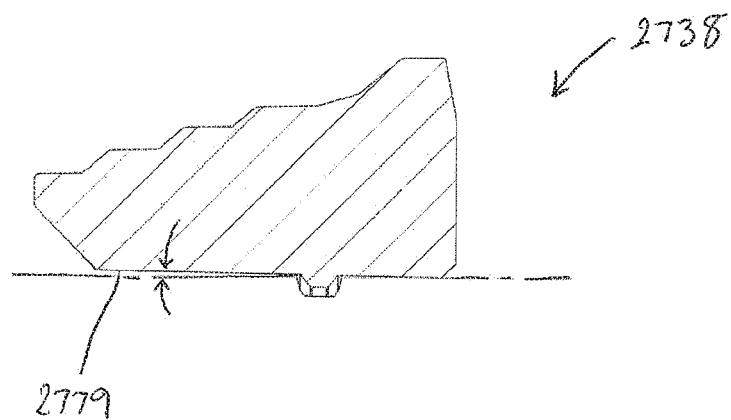
FIG. 37 is a cross-sectional view of a jaw according to another embodiment, for use with a chuck assembly.

FIG. 37 illustrates an alternative jaw 2738 that may be used, for example, with any of the chuck assemblies described herein. The jaw 2738 includes a tool engaging side 2779 that is pitched or inclined slightly relative to the central axis 2750 when the jaw 2738 is engaged with a collar (e.g., the collar 342; FIG. 12). The pitch angle of the tool engaging side 2779 may be positive or negative, which may shift radial loads exerted by the tool bit 14 on the jaw 2738 forward or rearward, respectively.

Figure 39:
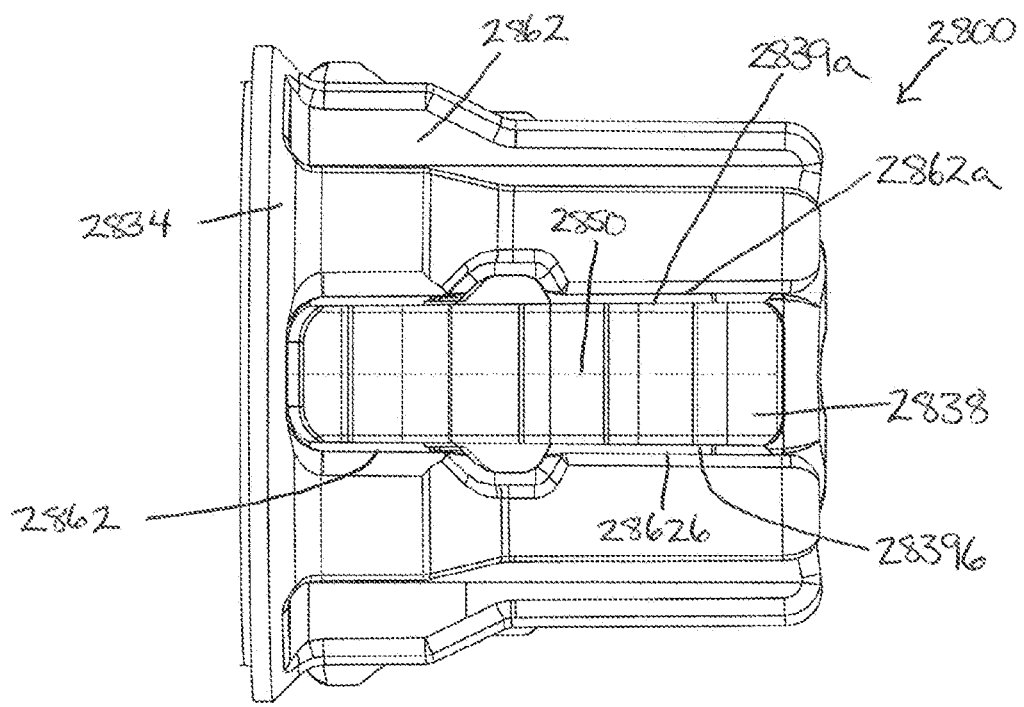
FIG. 39 is a top view of the jaw of FIG. 38 incorporated into the chuck assembly.

FIG. 39 illustrates a portion of a chuck assembly 2800 according to another embodiment. The chuck assembly 2800 includes a chuck body 2834 with slots 2862 that receive the jaws 2838. Each slot 2862 includes a first wall 2862a engageable with a first lateral side 2839a of the associated jaw 2838 and a second wall 2862b engageable with a second lateral side 2839b of the jaw 2838. The illustrated slots 2962 are formed with a draft angle 2863, such that each wall 2862a, 2862b forms an angle with the central axis 2850. In the illustrated embodiment, the draft angle 2863 is about 0.5 degrees. The lateral sides 2839a, 2839b of the jaw 2838 also are formed with a corresponding draft angle 2865 of about 0.5 degrees. In some embodiments, the walls 2862a, 2862b and lateral sides 2839a, 2839b may additionally or alternatively be formed with a draft angle in the radial direction.

Figure 38:
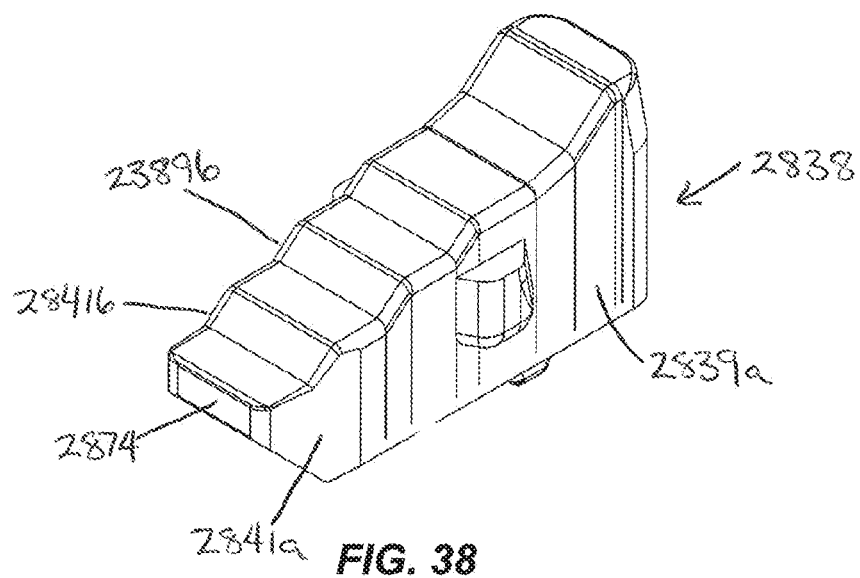
FIG. 38 is a perspective view of a jaw according to another embodiment, for use with a chuck assembly.

Referring to FIG. 38, the illustrated jaw 2838 further includes tapered portions 2841a, 2841b extending from the respective first and second lateral sides 2839a, 2839b to the tip 2874. The tapered portions 2841a, 2841b are angled inward toward a longitudinal center plane of the jaw 2838. The tapered portions 2841a, 2841b reduce the area of the lateral sides 2839a, 2839b that is in contact with the walls 2862a, 2862b of the slot 2862. This may reduce sliding friction between the jaws 2838 and the slot 2862 and direct stresses toward the rear, thicker side of the jaw 2838.

FIGS. 40A-C illustrate a chuck assembly 2900 according to another embodiment. The chuck assembly 2900 is similar to the chuck assembly 300 described above with reference to FIGS. 9-13C. Accordingly, the following description focuses primarily on differences between the chuck assembly 2900 and the chuck assembly 300. In addition, features and elements of the chuck assembly 2900 corresponding with features and elements of the chuck assembly 300 are given like reference numbers plus 2600.

Each of the jaws 2938 of the chuck assembly 2900 includes a projecting rib 2998 extending laterally along the tool-engaging side 2979. The ribs 2998 preferably have an arcuate shape and a rounded or tapered cross-section. The chuck assembly 2900 further includes a backstop or guide 2925 coupled to the chuck body 2934 behind the jaws 2938. The guide 2925 includes a tapered recess 2927 that engages a rear end 14b of the tool bit 14 when the tool bit 14 is fully inserted into the chuck assembly 2900. In the illustrated embodiment, the guide 2925 is a screw that extends along the axis 2950, and the tapered recess 2927 is defined by a head of the screw. In other embodiments, the guide 2925 may be integrally formed with the chuck body 2934. Due to the shape of the tapered recess 2927, bits 14 of different diameters will engage the recess 2927 at slightly different axial positions (e.g., as shown in FIGS. 40A-C). This may facilitate retaining tool bits 14 with shank grooves 2997a, 2997b, 2997c having a variety of different widths or placements.

Figure 41:
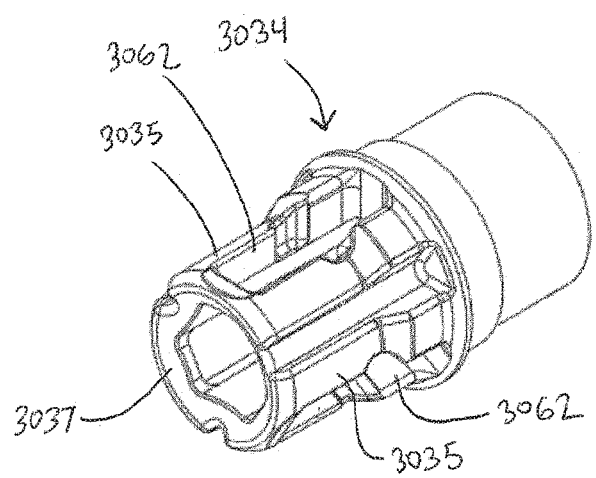
FIG. 41 is a perspective view of a chuck body according to one embodiment, for use with a chuck assembly.

FIG. 41 illustrates an alternative chuck body 3034 that may be used, for example, with any of the chuck assemblies described herein. The chuck body 3034 includes a plurality of prongs 3035 and jaw-receiving slots 3062 defined between adjacent prongs 3035. The prongs 3035 are interconnected at their front ends by a ring 3037. As such, the slots 3062 are closed at the front end of the chuck body 3034 by the ring 3037. The ring 3037 may act as a structural element to strengthen the chuck body 3034 and, in some embodiments, may limit forward movement of jaws, a collar, or other components (not shown) carried by the chuck body 3034. The ring 3037 may be integrally formed with the prongs 3035 and/or the remainder of the chuck body 3034, or the ring may be a separate component fixed to the prongs 3035.

Figure 42:
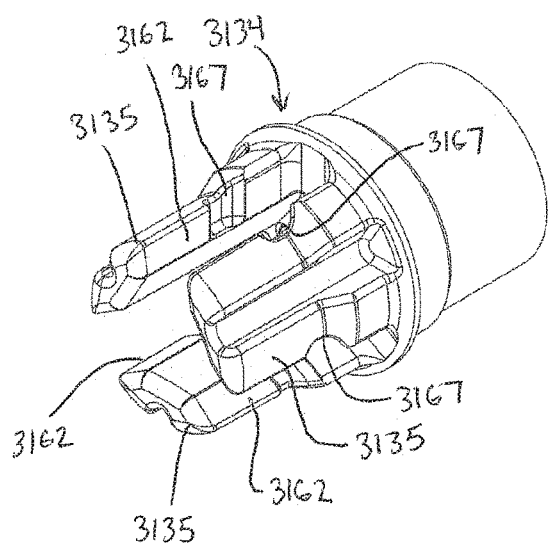
FIG. 42 is a perspective view of a chuck body according to another embodiment, for use with a chuck assembly.

FIG. 42 illustrates an alternative chuck body 3134 that may be used, for example, with any of the chuck assemblies described herein. The chuck body 3134 includes prongs 3135 and jaw-receiving slots 3162 defined between adjacent prongs 3135. Each of the slots 3162 includes opposing grooves 3167 configured to receive laterally-extending ears or wings of a jaw (not shown). The grooves 3167 are located proximate the center of the prongs 3135 in the illustrated embodiment; however, the grooves 3167 may alternatively be located elsewhere along the length of the prongs 3135.

Figure 43:
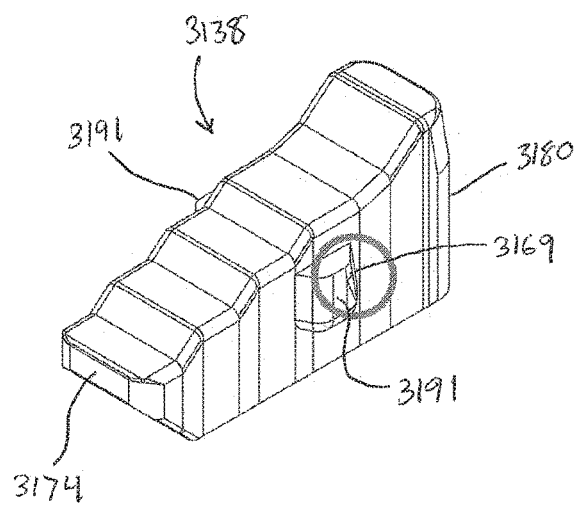
FIG. 43 is a perspective view of a jaw according to another embodiment, for use with a chuck assembly.

FIG. 43 illustrates an alternative jaw 3138 that may be used, for example, with any of the chuck assemblies described herein. The jaw 3138 includes laterally-extending ears 3191 between the rear side 3180 and the tip 3174 of the jaw 3138. In the illustrated embodiment, the ears 3191 are generally centered between the rear side 3180 and the tip 3174, but the position of the ears 3191 may vary. The ears 3191 may be received in grooves (e.g., the grooves 3167 of the chuck body 3134; FIG. 42) to guide radial movement of the jaw 3138. Each of the ears 3191 includes a relief 3169 that may facilitate radial movement of the jaw 3138 and prevent the ears 3191 from binding in the grooves 3167.

Figure 44:
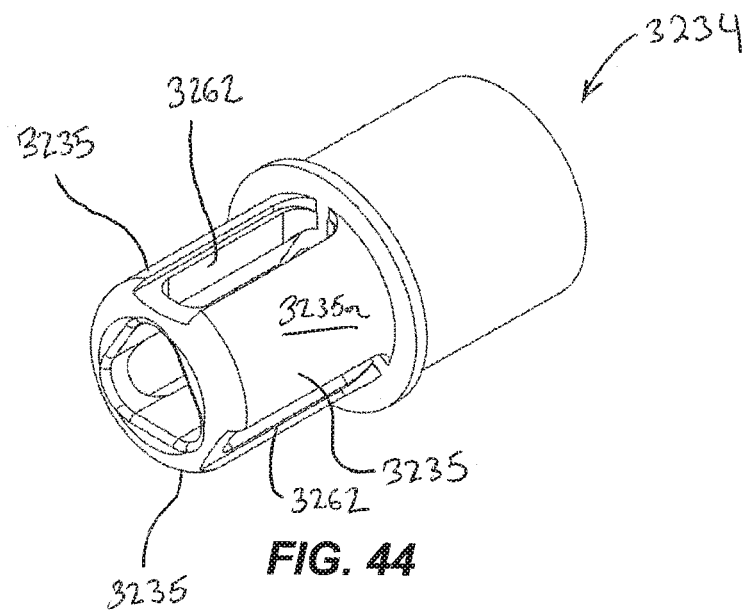
FIG. 44 is a perspective view of a chuck body according to another embodiment, for use with a chuck assembly.

FIG. 44 illustrates an alternative chuck body 3234 that may be used, for example, with any of the chuck assemblies described herein. The chuck body 3234 is similar to the chuck body 3034 described above with reference to FIG. 41, except the prongs 3235 have a smooth outer surface 3235a devoid of grooves or other features. In addition, the slots 3262 do not include opposing grooves. The jaws (not shown) used with the chuck body 3234 may include at least one laterally-extending flange engageable with the body 3234 at the periphery of the slots 3262 to limit movement of the jaws in a radially-inward direction. In some embodiments, the chuck body 3234 may include a variety of reliefs, slots, grooves, and the like to control stress concentrations on the chuck body 3234.

Figure 45:
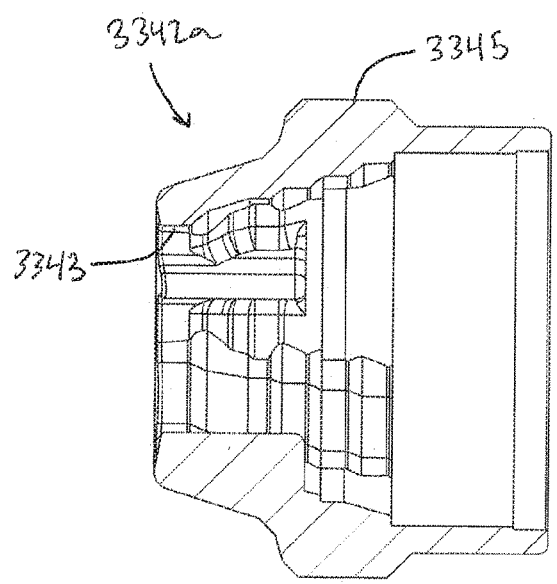
FIG. 45 is a cross-sectional view of a collar according to one embodiment, for use with a chuck assembly.
Figure 46:
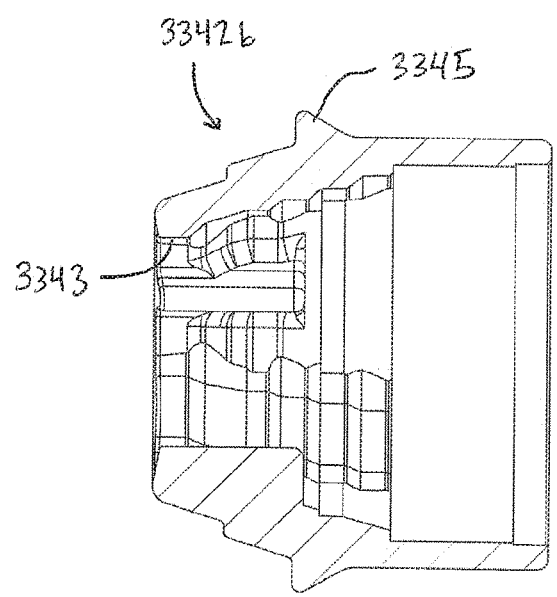
FIG. 46 is a cross-sectional view of a collar according to another embodiment, for use with a chuck assembly.

FIGS. 45 and 46 illustrate alternative collars 3342a, 3342b that may be used, for example, with any of the chuck assemblies described herein. Each collar 3342a, 3342b includes a first annular projection 3343 extending radially inward at the front end of the collar 3342a, 3342b. The first annular projection 3343 protects the interior of the collar 3342a, 3342b. The collar 3342a, 3342b also includes a second annular projection 3345 extending radially outward proximate the middle of the collar 3342a, 3342b. The second annular projection 3345 may be grasped by a user to facilitate moving the collar 3342a, 3342b. In addition, the second annular projection 3345 increases the thickness and strength of the middle of the collar 3342a, 3342b where stresses may be highest.

FIG. 47 illustrates a chuck assembly 3400 according to another embodiment. The chuck assembly 3400 is similar to the chuck assembly 300 described above with reference to FIGS. 9-13C. Accordingly, the following description focuses primarily on differences between the chuck assembly 3400 and the chuck assembly 300. In addition, features and elements of the chuck assembly 3400 corresponding with features and elements of the chuck assembly 300 are given like reference numbers plus 3100.

The chuck assembly 3400 includes a sleeve 3404 surrounding a rear portion of the collar 3442. The sleeve 3404 may be coupled for co-rotation with the chuck body 3434, or the chuck body 3434 may be rotatable independently of the sleeve 3404. The collar 3442 is axially movable relative to the sleeve 3404 in the forward direction, and the sleeve 3404 may thus at least partially cover any gap formed between a rear end of the collar 3442 and, for example, a front end of a power tool housing (not shown). The sleeve 3404 may also perform other functions on the power tool, such as clutch adjustment and/or mode selection.

FIG. 48 illustrates a chuck assembly 3500 according to another embodiment. The chuck assembly 3500 is similar to the chuck assembly 300 described above with reference to FIGS. 9-13C. Accordingly, the following description focuses primarily on differences between the chuck assembly 3500 and the chuck assembly 300. In addition, features and elements of the chuck assembly 3500 corresponding with features and elements of the chuck assembly 300 are given like reference numbers plus 3200.

The chuck assembly 3500 includes a shroud 3506 coupled to the rear end of the collar 3542 and to a front end of a power tool housing (not shown). The illustrated shroud 3506 is expandable to accommodate forward movement of the collar 3542. The shroud 3506 therefore seals any gap formed between the rear end of the collar 3542 and the front end of the power tool housing.

FIGS. 49-51 illustrate three variations of a chuck assembly 3600 according to another embodiment. The chuck assembly 3600 is similar to the chuck assembly 3400 described above with reference to FIG. 47. Accordingly, the following description focuses primarily on differences between the chuck assembly 3600 and the chuck assembly 3400. In addition, features and elements of the chuck assembly 3600 corresponding with features and elements of the chuck assembly 3400 are given like reference numbers plus 200.

The collar 3642 includes a skirt 3651 that extends rearward beyond the retaining ring 3646. The chuck assembly 3600 includes a sleeve 3604 that can be received inside the skirt 3651 (FIG. 49) or surround the outside of the skirt 3651 (FIG. 50). Alternatively, the sleeve 3604 may include an axial recess 3605 that receives and surrounds both the inside and the outside of the skirt 3651. (FIG. 51).

Figure 52:
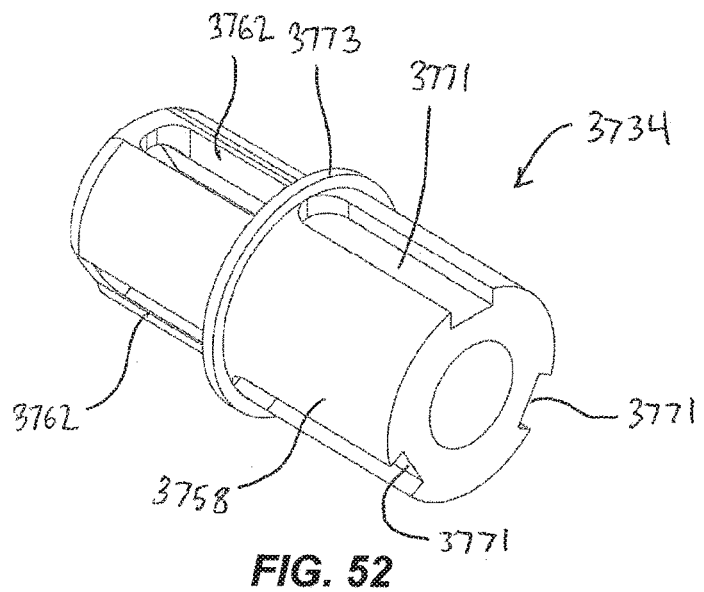
FIG. 52 is a perspective view of a chuck body according to another embodiment, for use with a chuck assembly.

FIG. 52 illustrates an alternative chuck body 3734 that may be used, for example, with any of the chuck assemblies described herein. The chuck body 3734 is similar to the chuck body 3234 described above with reference to FIG. 44, accordingly, the following description focuses primarily on differences between the chuck body 3734 and the chuck body 3234.

The shaft portion 3758 of the chuck body 3734 includes a second plurality of slots 3771 and a circumferential flange 3773 disposed between the slots 3762 and the slots 3771. The flange 3773 is engageable with a collar (not shown) to limit rearward movement of the collar, and the second slots 3771 are engageable with the collar to limit rotational movement of the collar. In other words, the collar is coupled for co-rotation with the chuck body 3734 via the slots 3771. The illustrated slots 3771 are open at the rear end of the chuck body 3734; however, the slots 3771 may alternatively be closed.

Figure 53:
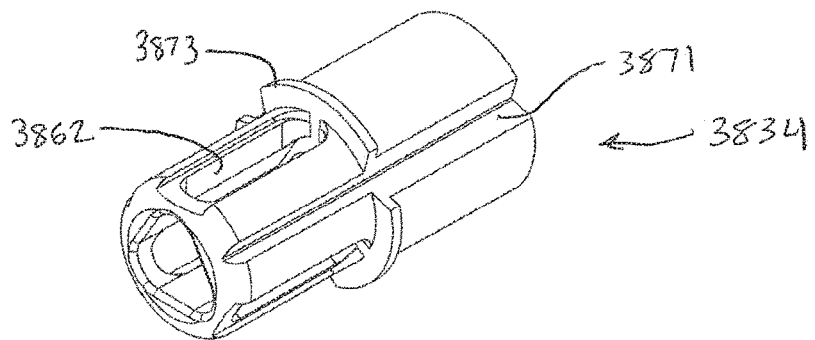
FIG. 53 is a perspective view of a chuck body according to another embodiment, for use with a chuck assembly.

FIG. 53 illustrates an alternative chuck body 3834 that may be used, for example, with any of the chuck assemblies described herein. The chuck body 3834 is similar to the chuck body 3734 described above with reference to FIG. 52. Accordingly, the following description focuses primarily on differences between the chuck body 3834 and the chuck body 3734.

The second plurality of slots 3871 extend along the entire length of the chuck body 3834 in the illustrated embodiment, including through the flange 3873. In addition, the slots 3871 have a V-shape, which may be more economical to manufacture. In some embodiments, the slots 3871 may extend along only a portion of the length of the chuck body 3834, and the slots 3871 may have other shapes. Alternatively, the slots 3871 may be protrusions receivable in corresponding slots in a collar to couple the collar for co-rotation with the chuck body 3834.

Figure 54:
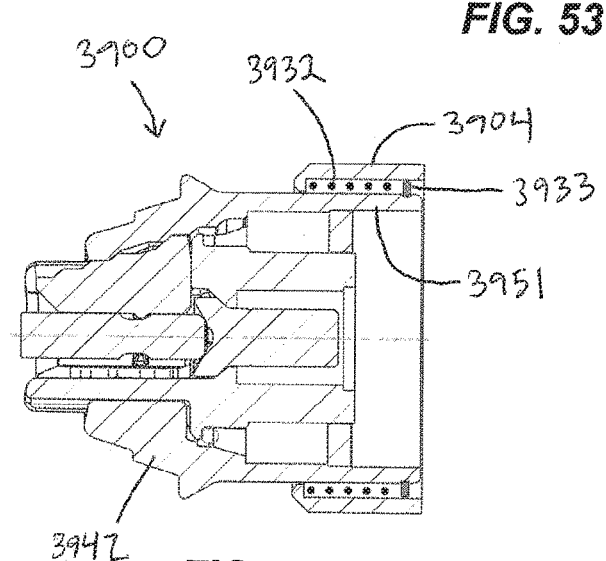
FIG. 54 is a cross-sectional view of a chuck assembly according to another embodiment of the invention.

FIG. 54 illustrates a chuck assembly 3900 according to another embodiment. The chuck assembly 3900 is similar to the chuck assembly 3600 described above with reference to FIG. 50. Accordingly, the following description focuses primarily on differences between the chuck assembly 3900 and the chuck assembly 3600. In addition, features and elements of the chuck assembly 3900 corresponding with features and elements of the chuck assembly 3600 are given like reference numbers plus 300.

The sleeve 3904 of the chuck assembly 3900 accommodates a biasing member 3932, which is a coil spring in the illustrated embodiment. In other embodiments, the biasing member 3932 may be a wave spring, tapered spring, and the like. A snap ring 3933 is coupled to the outside of the skirt 3951, proximate the rear end of the collar 3942. The biasing member 3932 engages the snap ring 3933 to bias the collar 3942 rearward.

Figure 55:
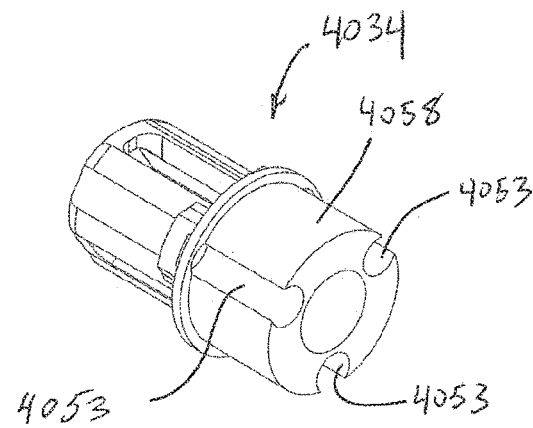
FIG. 55 is a perspective view of a portion of a chuck assembly according to another embodiment of the invention.

FIG. 55 illustrates an alternative chuck body 4034 that may be used, for example, with any of the chuck assemblies described herein. The chuck body 4034 includes a plurality of axially-extending accommodating bores 4053 in the shaft portion 4058. A biasing member (not shown), such as a coil spring, is disposed in each of the accommodating bores 4053. The biasing members act on a collar (not shown) coupled to the chuck body 4034 to bias the collar rearward. Providing the biasing members within the chuck body 4034 may advantageously reduce the overall size of a chuck assembly that incorporates the chuck body 4034.

Figure 56:
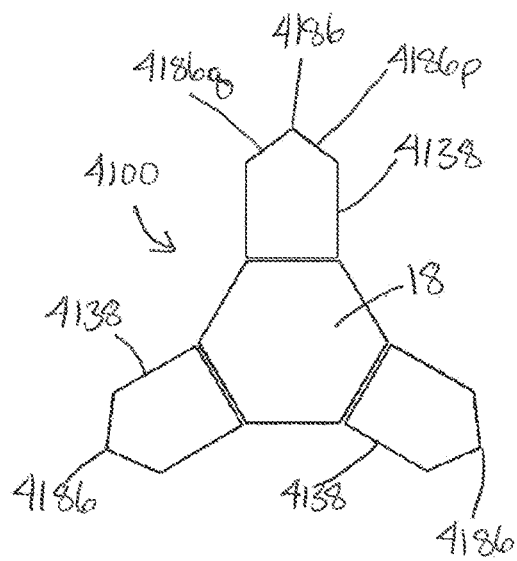
FIG. 56 is a cross-sectional view of a portion of a chuck assembly according to another embodiment of the invention.

FIG. 56 illustrates a chuck assembly 4100 according to another embodiment. The chuck assembly 4100 is similar to the chuck assembly 300 described above with reference to FIGS. 9-13C. Accordingly, the following description focuses primarily on differences between the chuck assembly 4100 and the chuck assembly 300. In addition, features and elements of the chuck assembly 4100 corresponding with features and elements of the chuck assembly 300 are given like reference numbers plus 3800.

Figure 57:
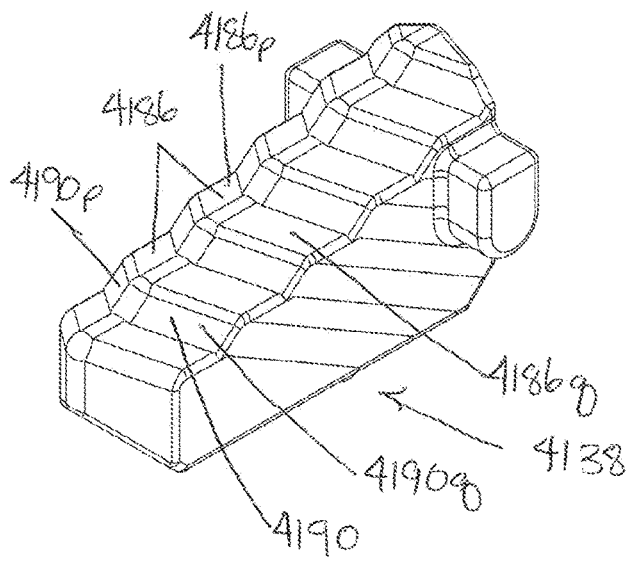
FIG. 57 is a perspective view of a jaw of the chuck assembly of FIG. 56.
Figure 58:
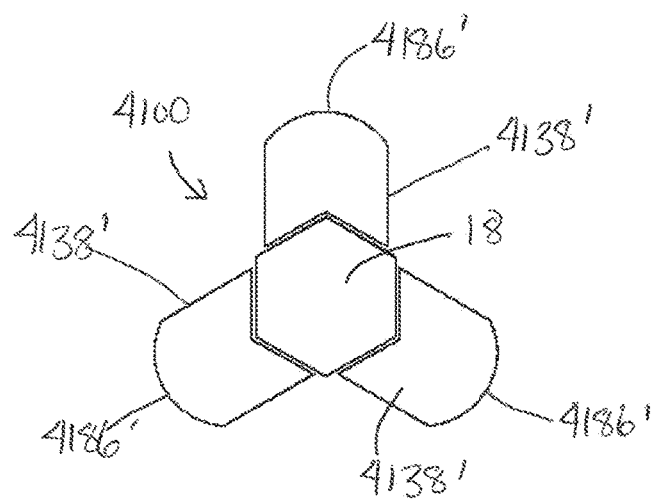
FIG. 58 is a cross-sectional view of the portion of the chuck assembly of FIG. 56, including a jaw according to another embodiment.

FIG. 57 illustrates one of the jaws 4138 of the chuck assembly 4100. The treads 4186 of the steps 4182 are not flat but rather include a plurality of discrete surfaces 4186q, 4186p that intersect along a longitudinal center plane of the jaw 4138. In the illustrated embodiment, each tread 4186 is defined by two discrete surfaces 4186q, 4186p; however, in other embodiments, the treads 4186 may include any other number and arrangement of discrete surfaces. Alternatively, as illustrated in FIG. 58, chuck assembly 4100 may include jaws 4138' with treads 4186' having a curved shape. In addition, the treads 4186, 4186' may be concave or convex.

With reference to FIG. 57, the risers 4190 of the jaw 4138 in the illustrated embodiment include a corresponding number and arrangement of discrete surfaces 4190q, 4190p; however the risers 4190 may alternatively differ from the treads 4186. A collar (not shown) of the chuck assembly 4100 includes steps that match the steps 4182 of the jaws 4138.

Figure 59:
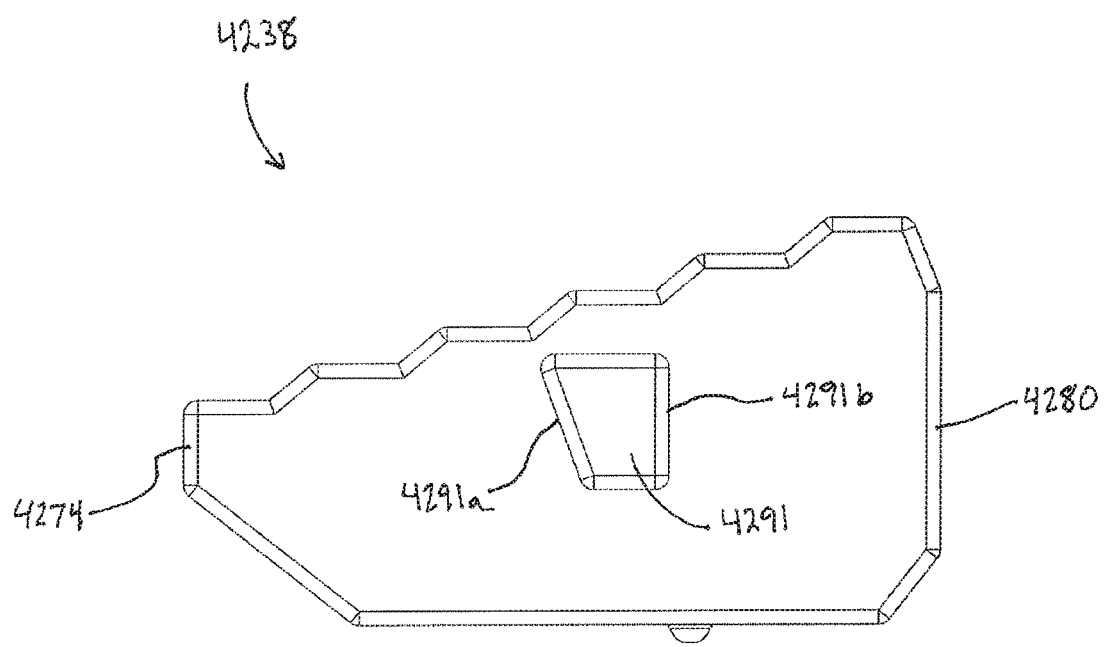
FIG. 59 is a side view of a jaw according to another embodiment, for use with a chuck assembly.

FIG. 59 illustrates an alternative jaw 4238 that may be used, for example, with any of the chuck assemblies described herein. The jaw 4238 includes laterally-extending ears 4291 (only one of which is illustrated in FIG. 59) between the rear side 4280 and the tip 4274 of the jaw 4238. In the illustrated embodiment, the ears 4291 are generally centered between the rear side 4280 and the tip 4274, but the position of the ears 4291 may vary. The ears 4291 may be received in grooves (e.g., the grooves 3167 of the chuck body 3134; FIG. 42) to guide radial movement of the jaw 4238. The illustrated ear 4291 includes an inclined front surface 4291a. The front surface 4291a is inclined in a forward direction to facilitate outward movement of the jaw 4238 (e.g., when the tool bit 14 is pulled forward to be removed). A rear surface 4291b of the ear 4291 may also or alternatively be inclined to facilitate outward movement of the jaw 4238 when the tool bit 14 is inserted. In some alternative embodiments, the ear 4291 may be configured as a slot, with the inclined front surface 4291a being provided on a wall of the slot.

Figure 60A:
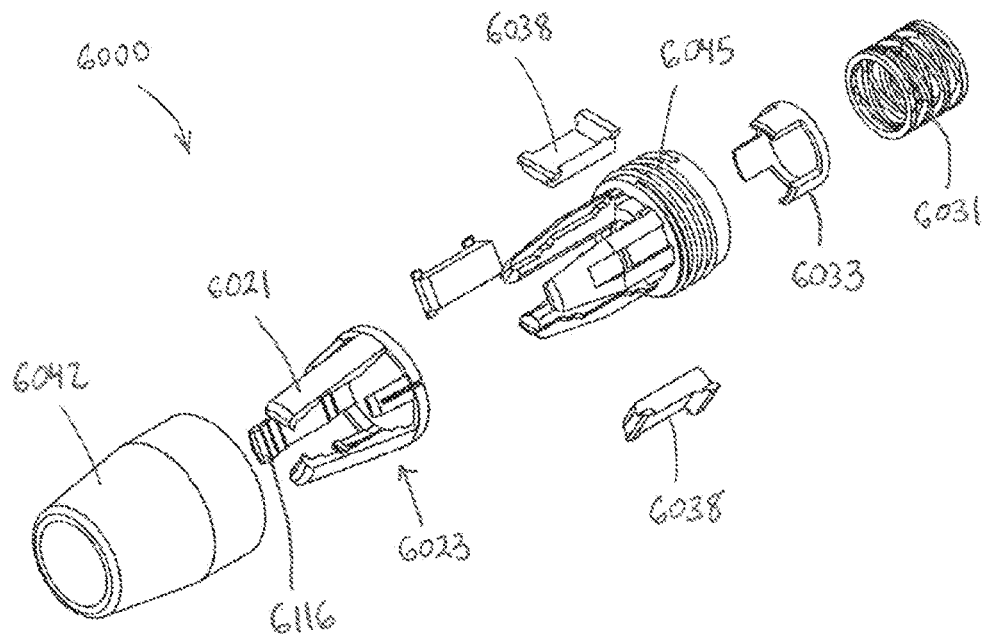
FIG. 60A is an exploded perspective view of a chuck assembly according to another embodiment of the invention.
Figure 60B:
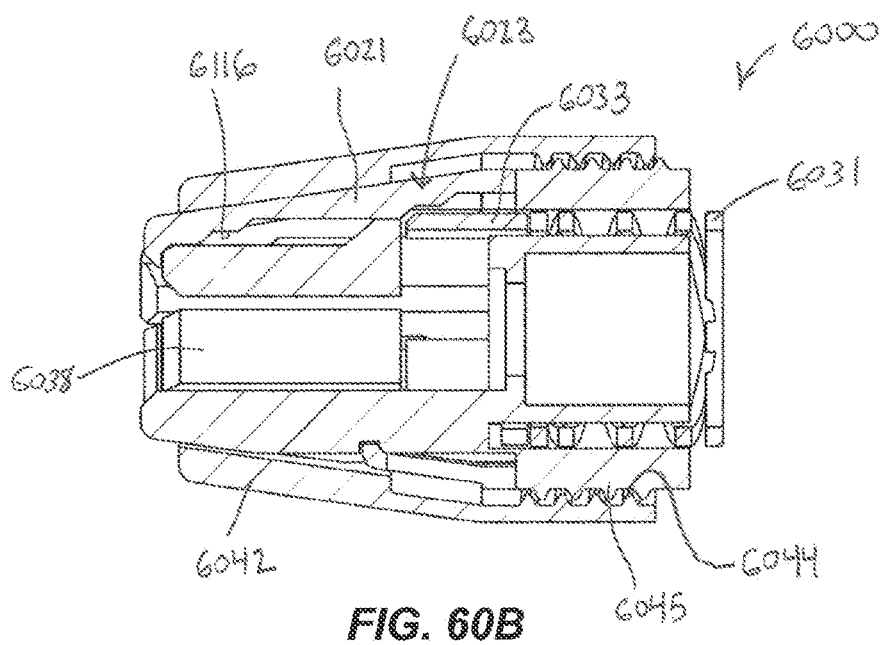
FIG. 60B is a cross-sectional view of the chuck assembly of FIG. 60A.
Figure 61A:
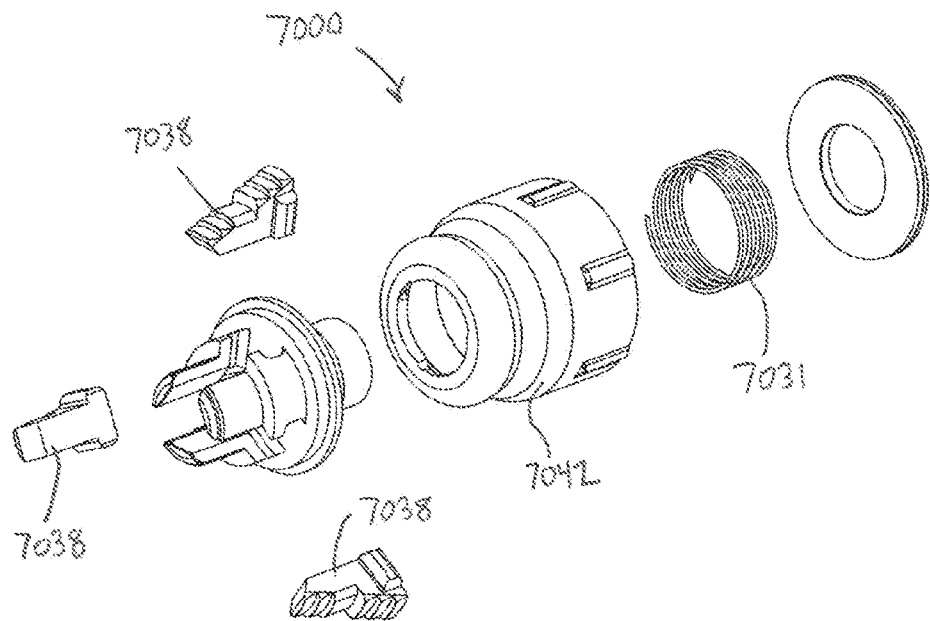
FIG. 61A is an exploded perspective view of a chuck assembly according to another embodiment of the invention.
Figure 61B:
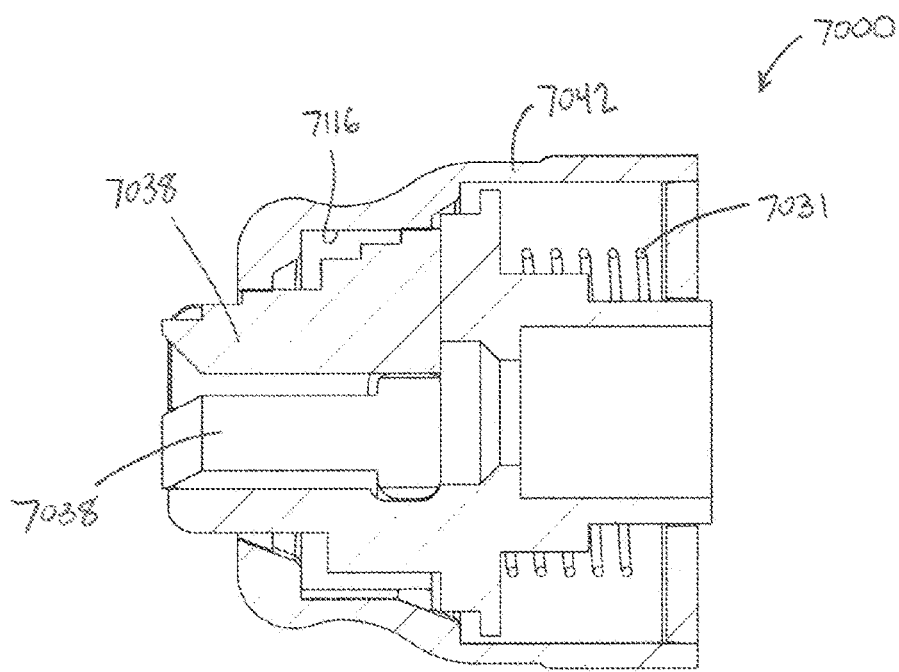
FIG. 61B is a cross-sectional view of the chuck assembly of FIG. 61A

FIGS. 60A-B illustrates a chuck assembly 6000 according to another embodiment. The chuck assembly 6000 is similar to the chuck assembly 300 described above with reference to FIGS. 9-13C. Accordingly, the following description focuses primarily on differences between the chuck assembly 6000 and the chuck assembly 300. In addition, features and elements of the chuck assembly 6000 corresponding with features and elements of the chuck assembly 300 are given like reference numbers plus 5700.

The steps 6116 are provided on circumferentially spaced fingers 6021 of a collet 6023. The collet 6023 is movable relative to the collar 6042 to adjust the position of the steps 6116 relative to the jaws 6038, and thereby adjust a maximum spacing of the jaws 6038 to accommodate differently-sized shanks 18 (FIG. 2). The jaws 6038 are biased forward (toward a "closed" position) by a spring 6031. A pronged element 6033 is provided between the spring 6031 and the jaws 6038 to facilitate force transfer from the spring 6031 to the jaws 6038. In some embodiments, the pronged element 6033 is axially fixed to the jaws 6038

During operation, the shank 18 of the tool bit 14 is inserted between the jaws 6038, which pushes the jaws 6038 outward to match the nominal size of the shank 18. Once the shank 18 is inserted, the user rotates the collar 6042. In the illustrated embodiment, the collar 6042 has an internally-threaded portion 6044 that engages with a corresponding threaded portion 6045 (e.g., on the chuck body or on a front end of a power tool). Thus, when the collar 6042 is rotated in a tightening direction, it is displaced axially rearward and clamps down on the collet 6023, causing the fingers 6021 to clamp down on the jaws 6038. Alternatively, the internally-threaded portion 6044 may be in threaded engagement with the collet 6023. In such embodiments, the collar 6042 may be rotated to draw the collet 6023 rearward and clamp down on the jaws 6038, while the collar 6042 remains axially fixed. In other embodiments, the collar 6042 may include an internal spiral wedge (not shown) that produces a clamping force on the jaws 6038 in response to rotation of the collar 6042.

FIGS. 61A-62B illustrate a chuck assembly 7000 according to another embodiment. The chuck assembly 7000 is similar to the chuck assembly 300 described above with reference to FIGS. 9-13C. Accordingly, the following description focuses primarily on differences between the chuck assembly 7000 and the chuck assembly 300. In addition, features and elements of the chuck assembly 7000 corresponding with features and elements of the chuck assembly 300 are given like reference numbers plus 6700.

Figure 62A:
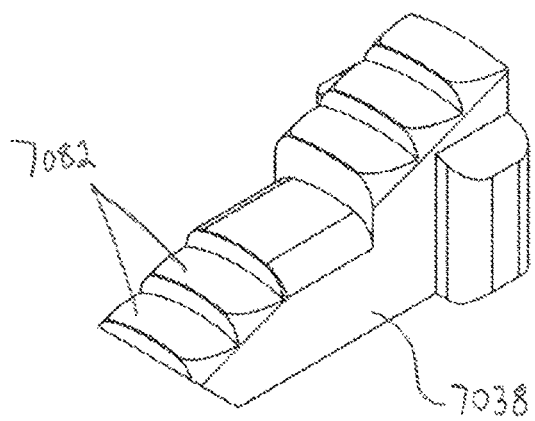
FIG. 62A is a perspective view of a jaw of the chuck assembly of FIG. 61A
Figure 62B:
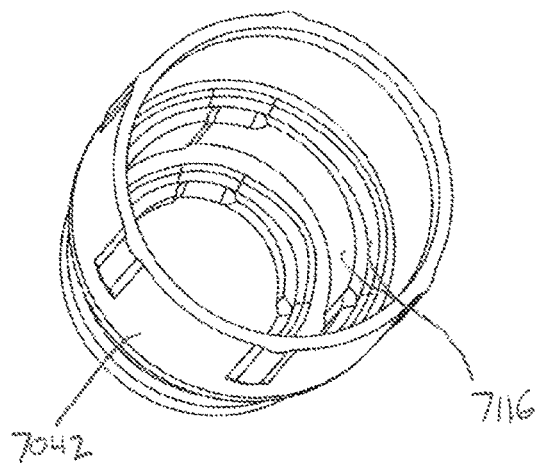
FIG. 62B is a rear perspective view of a collar of the chuck assembly of FIG. 61A

The collar 7042 and jaws 7038 feature curved steps 7082, 7116 that can provide a substantial mechanical advantage and clamping force as the collar 7042 is rotated. In particular, the curved steps 7116 within the collar 7042 are formed as a series of spiral wedges or cam surfaces (FIGS. 62A-B). The cam surfaces increase in radial thickness in the tightening direction. As such, when the collar 7042 is rotated in the tightening direction, the steps 7116 corresponding with a particular bit shank size engage the curved steps 7082 on the jaws 7038 and force the jaws 7038 radially inward. Alternatively, the steps 7082, 7116 may have a tapered shape, which may also provide an increased clamping force. The collar 7042 and jaws 7038 can be made to engage at as few as two areas or steps 7082, 7116. When the collar 7042 is rotated to an open position, it can be slid forward and rearward to match a corresponding nominal shank size. Preferably, the collar 7042 is biased rearward and toward a closed position so that the bit shank 18 helps to effectively align the steps 7116 on the collar 7042 with the corresponding steps 7082 on the jaws 7038. In the illustrated embodiment, a spring 7031 biases the collar 7042 rearward.

Figure 63:
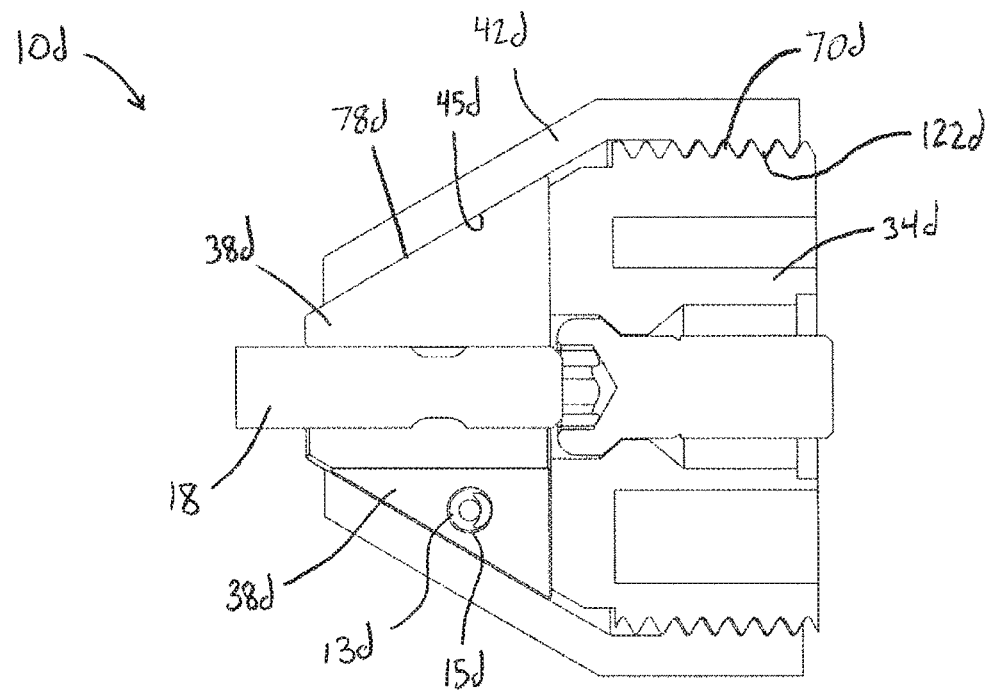
FIG. 63 is a cross-sectional view of a chuck assembly according to another embodiment of the invention.
Figure 64:
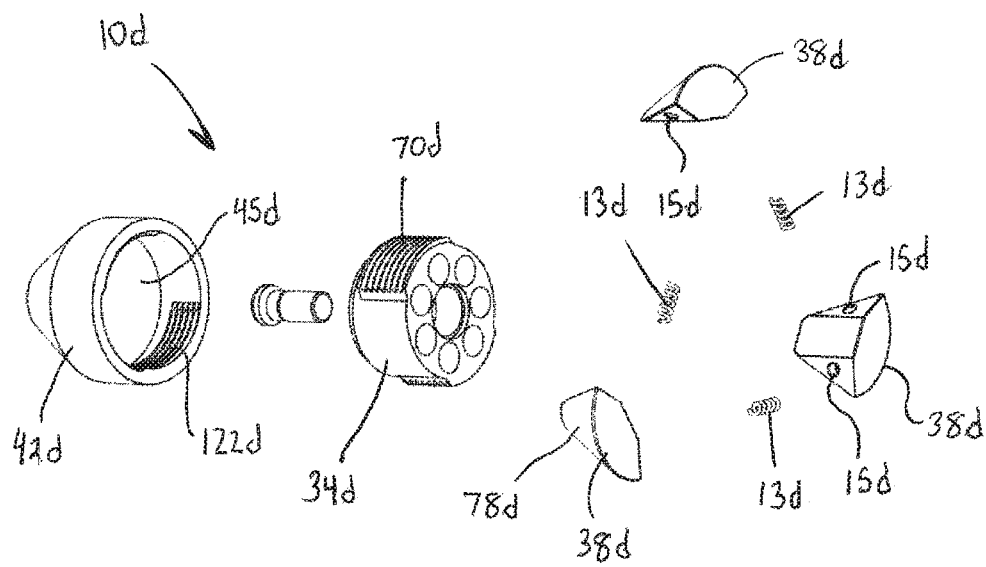
FIG. 64 is an exploded perspective view of the chuck assembly of FIG. 63.

FIGS. 63 and 64 illustrate a chuck assembly 10d according to another embodiment. The chuck assembly 10d is similar to the chuck assembly 10 described above with reference to FIGS. 1-8C. Accordingly, the following description focuses primarily on differences between the chuck assembly 10d and the chuck assembly 10. In addition, features and elements of the chuck assembly 10d corresponding with features and elements of the chuck assembly 10 are given like reference numbers followed by the letter 'd.'

The illustrated chuck assembly 10d includes a plurality of springs 13d extending generally in a circumferential direction between adjacent jaws 38d. The chuck assembly 10d includes three jaws 38d and thus three springs 13d; however, the chuck assembly 10d may include a greater number of jaws and a correspondingly greater number of springs 13d. The springs 13d are received in pockets 15d formed in the lateral faces of each jaw 38d. The springs 13d bias the jaws 38d radially outward, such that the oblique outer surface 78d of each jaw 38d is biased into engagement with a frusto-conical wedge surface 45d formed on the interior of the collar 42d. In other embodiments, the jaws 38d may be biased radially outward against the wedge surface 45d in any other suitable manner. The jaws 38d may be received within grooves (not shown) in the chuck body 34d to couple the jaws 38d for co-rotation with the chuck body 34d. Alternatively, the jaws 38d may be coupled for co-rotation with the chuck body 34d via friction between the jaws 38d and the chuck body 34d or a back stop on the chuck body 34d.

The collar 42d has internal thread segments 122d that are selectively engageable with corresponding thread segments 70d on the chuck body 34d. When the thread segments 70d, 122d are engaged, rotation of the collar 42d in the tightening direction moves the collar 42d rearward, engaging the wedge surface 45d against the oblique outer surfaces 78d of the jaws 38d. This applies a clamping force to a bit shank 18 received between the jaws 38d, thereby securing the bit shank 18.

Figure 65:
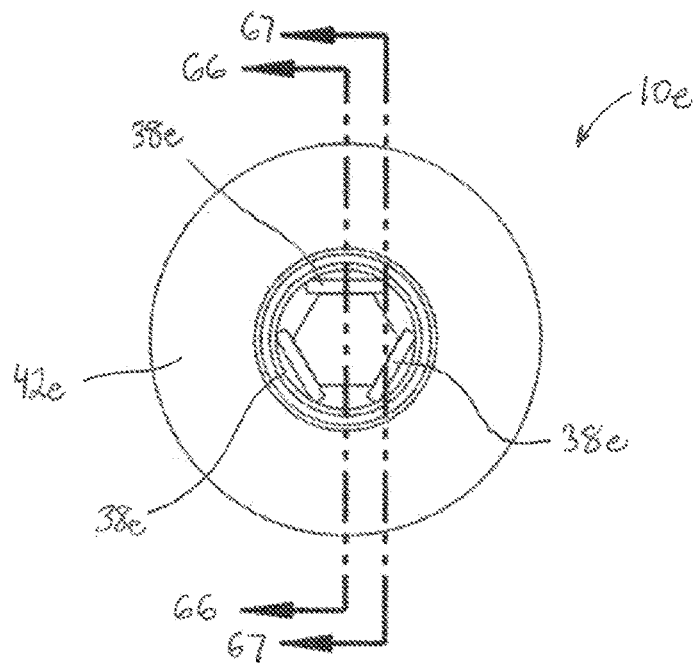
FIG. 65 is a front view of the chuck assembly according to another embodiment.
Figure 66:
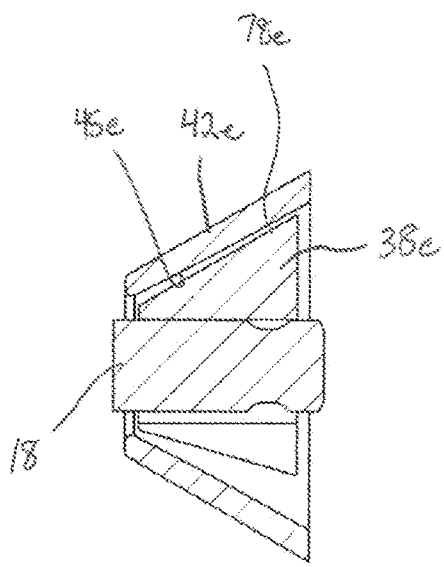
FIG. 66 is a cross-sectional view of the chuck assembly of FIG. 65, taken along line 66-66 in FIG. 65.
Figure 67:
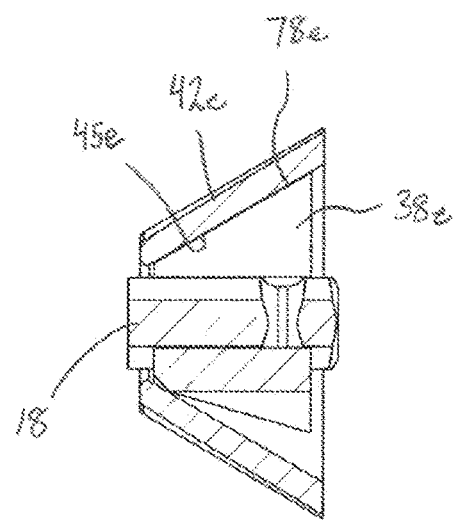
FIG. 67 is a cross-sectional view of the chuck assembly of FIG. 65, taken along line 67-67 in FIG. 65.

FIGS. 65-67 illustrate a chuck assembly 10e according to another embodiment. The chuck assembly 10e is similar to the chuck assembly 10d described above with reference to FIGS. 63-64. Accordingly, the following description focuses primarily on differences between the chuck assembly 10e and the chuck assembly 10d. In addition, features and elements of the chuck assembly 10e corresponding with features and elements of the chuck assembly 10d are given like reference numbers followed by the letter 'e.'

In the illustrated embodiment, the each of the jaws 38e is generally shaped as a right trapezoidal prism, with a flat oblique outer surface 78e. As such, the wedge surface 45e within the collar 42e is formed with a revolved profile that geometrically corresponds to the oblique outer surfaces 78e of the jaws 38e. The revolved profile of the wedge surface 45e may vary in the circumferential direction, so as to converge or diverge from the oblique outer surfaces 78e of the jaws 38e. For example, with reference to FIGS. 66 and 67, the wedge surface 45e engages the flat oblique outer surfaces 78e only at outer portions of each jaw 38e (with respect to a circumferential direction and as illustrated in FIG. 66). That is, the wedge surface 45e is slightly spaced from the outer surface 78e of each jaw along the longitudinal center of each jaw (FIG. 66). This profile of the wedge surface 45e may advantageously increase the stability of the jaws 38e and distribute clamping force evenly over the jaws 38e.

Figure 68:
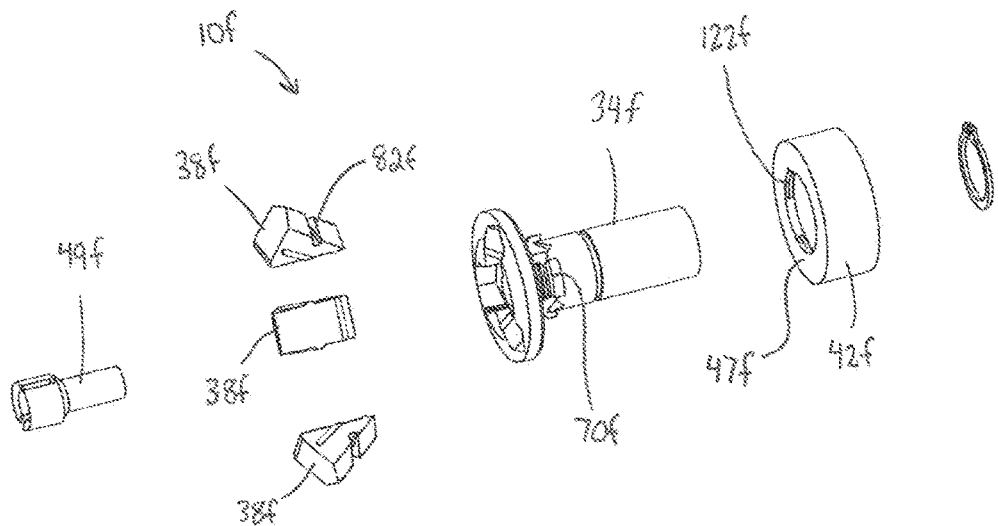
FIG. 68 is an exploded perspective view of a chuck assembly according to another embodiment of the invention.
Figure 69:
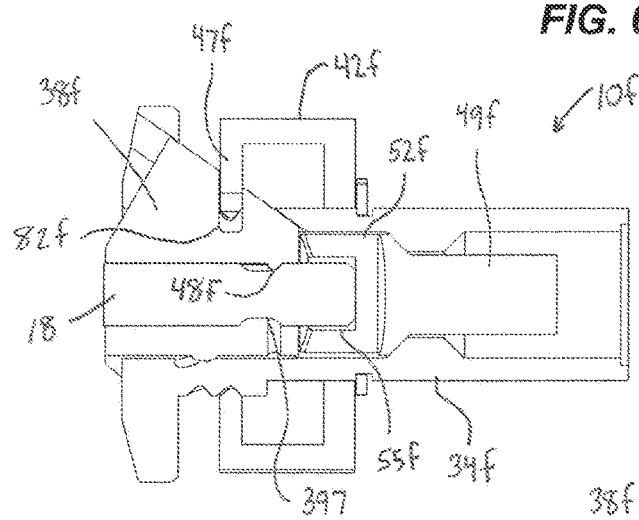
FIG. 69 is a cross-sectional view of the chuck assembly of FIG. 68, securing a shank of a first nominal size.
Figure 70:
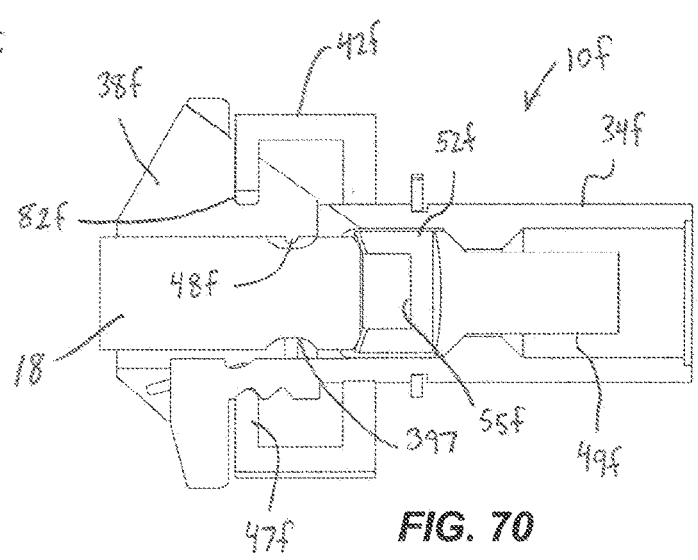
FIG. 70 is a cross-sectional view of the chuck assembly of FIG. 68, securing a shank of a second nominal size.

FIGS. 68-70 illustrate a chuck assembly 10f according to another embodiment. The chuck assembly 10f is similar to the chuck assembly 10 described above with reference to FIGS. 1-8C. Accordingly, the following description focuses primarily on differences between the chuck assembly 10f and the chuck assembly 10. In addition, features and elements of the chuck assembly 10f corresponding with features and elements of the chuck assembly 10 are given like reference numbers followed by the letter 'f.'

In the chuck assembly 10f, the orientation of the jaws 38f is reversed. The reversed orientation of the jaws 38f can reduce the overall length of the chuck assembly 10f compared to the chuck assembly 10, for example. The collar 42f includes a front annular wall 47f that is received in the U-shaped engagement portion 82f of each jaw 38f to couple the jaws 38f for axial movement with the collar 42f. The inner periphery of the front annular wall 47f also includes the collar thread segments 122f, which are selectively alignable and engageable with the corresponding thread segments 70f on the chuck body 34f.

In the illustrated embodiment, each of the jaws 38f includes an inwardly facing detent 48f that is receivable within the groove 397 of the tool bit shank 18 to axially retain the shank 18 when the shank 18 is received between the jaws 38f. The chuck body 34f is configured to be coupled to an output member of a rotary power tool via a chuck screw 49f. The illustrated chuck screw 49f includes a head 52f with an inner recess 55f. The rear end of a smaller shank 18 (e.g., the first, smaller size 22) is insertable into the inner recess 55f to define a back stop for the smaller shank 18 at a first insertion depth into the chuck assembly 10f (FIG. 69). When a larger shank 18, (e.g., the second or third nominal size 26, 30) is inserted into the chuck assembly 10f, the rear end of the larger shank 18 engages the head 52f at the outer periphery of the recess 55f, defining a back stop for the larger shank 18 at a second insertion depth that is less (i.e. further forward than) the first insertion depth.

Figure 71:
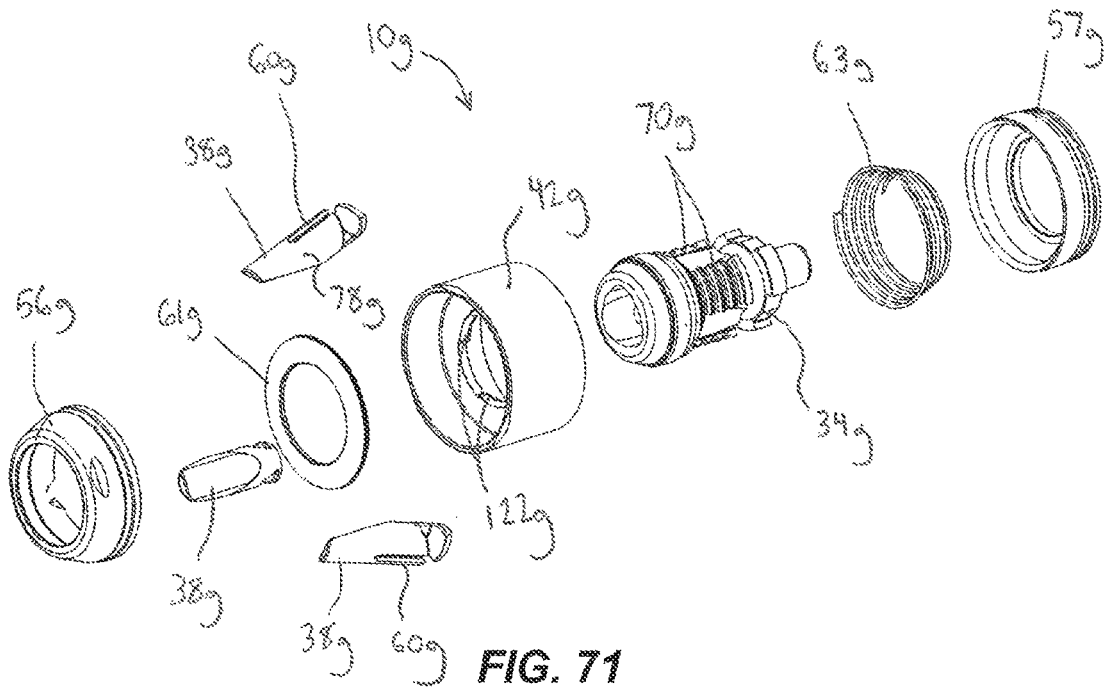
FIG. 71 is an exploded perspective view of a chuck assembly according to another embodiment of the invention.
Figure 72:
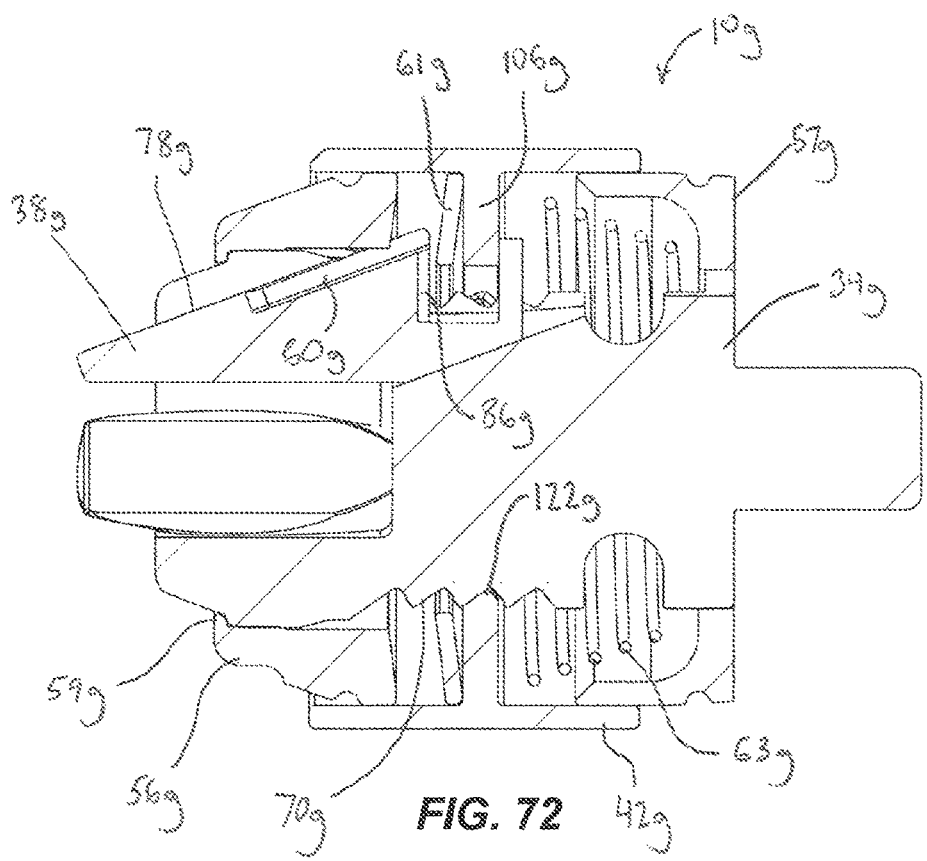
FIG. 72 is a cross-sectional view of the chuck assembly of FIG. 71.

FIGS. 71-72 illustrate a chuck assembly 10g according to another embodiment. The chuck assembly 10g is similar to the chuck assembly 10 described above with reference to FIGS. 1-8C. Accordingly, the following description focuses primarily on differences between the chuck assembly 10g and the chuck assembly 10. In addition, features and elements of the chuck assembly 10g corresponding with features and elements of the chuck assembly 10 are given like reference numbers followed by the letter 'g.'

In the illustrated embodiment, the thread segments 70g on the chuck body 34g and the thread segments 122g inside of the collar 42g have a buttress thread profile. The buttress thread profile has the effect of biasing axially loads forward, which may increase the strength of the selective threaded connection between the chuck body 34g and the collar 42g. In addition, the buttress thread profile allows the thread segments 70g and/or the thread segments 122g to be formed using a bullnose end mill, which can facilitate manufacturing the chuck assembly 10g.

The chuck assembly 10g further includes a front end cap 56g and a rear end cap 57g fixed to the front and rear sides of the collar 42g. In the illustrated embodiment, the end caps 56g, 57g are press fit to the collar 42g, but the end caps 56g, 57g can be fixed to the collar 42g in other ways (e.g., via fasteners, retaining rings, welding, or the like). The front end cap 56g includes an inner lip 59g (FIG. 72) that limits forward travel of the jaws 38g, advantageously eliminating the need for a separate snap ring. The rear end cap 57g retains the collar 42g to the chuck body 34g in the rearward direction. Each of the jaws 38g of the chuck assembly 10g includes a keyed slot 60g in the oblique outer surface 78g, extending in the longitudinal direction of each jaw 38g. The slots 60g received corresponding projections on the front end cap 56g, which helps maintain the circumferential spacing and alignment of the jaws 38g.

Referring to FIG. 72, in the illustrated embodiment, a disc spring 61g is positioned between the inner annular wall 106g of the collar 42g and the first engagement surface 86g of each jaw 38g. The disc spring 61g advantageously maintains even pressure on the backs of the jaws 38g and improves user feel when tightening the collar 42g. In other embodiments, the disc spring 61g may be replaced by a coil spring, wave spring, Belleville washer, or the like. The collar 42g is biased forward by a tapered spring 63g, which can minimize axial space requirements while maintaining a high spring rate.

In some embodiments of the chuck assembly 10g, the threads 70g and/or the threads 122g may be formed with a radially-outward spiral profile. In other words, the threads 70g and/or the threads 122g may increase in radial height along the tightening direction of the collar 42g. As such, the threads 70g, 122g may bottom out to limit rotation of the collar 42g in the tightening direction with the threads 70g, 122g are engaged. Rotation limiting may be achieved using other variably pitched, variably tapered, or other variably profiled threads.

Figure 73:
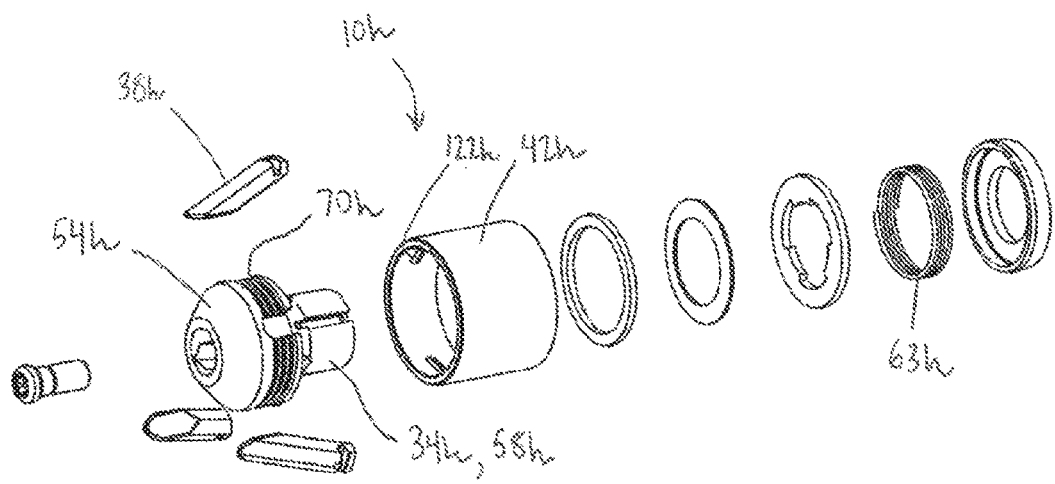
FIG. 73 is an exploded perspective view of a chuck assembly according to another embodiment of the invention.
Figure 74:
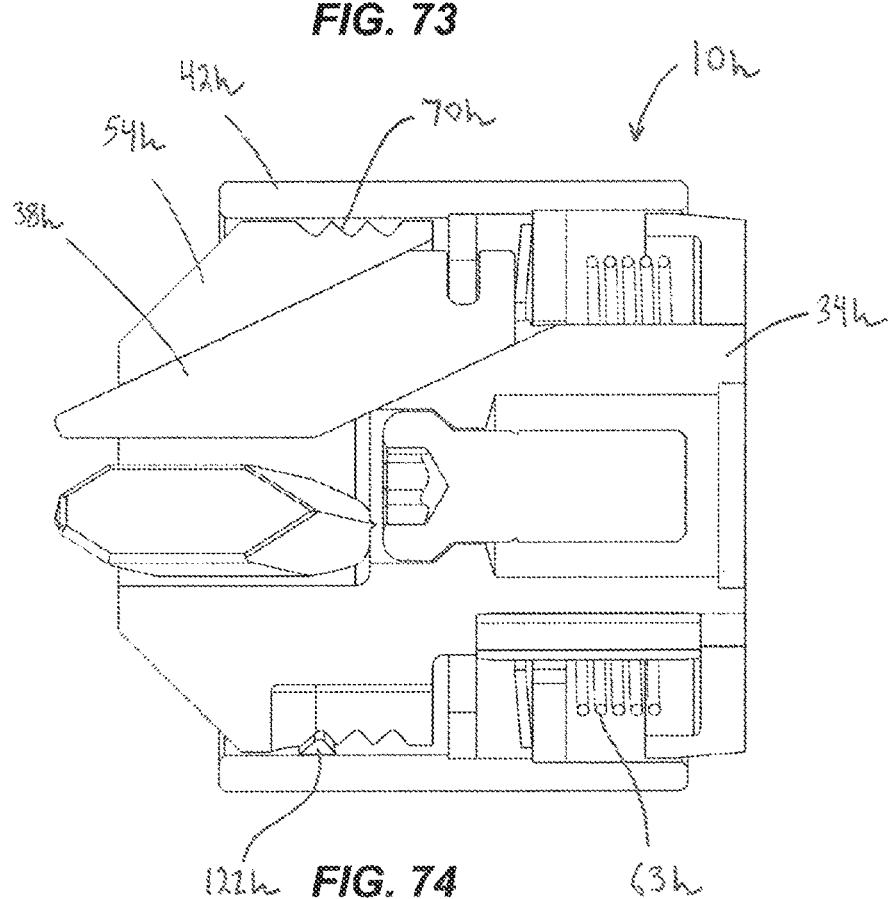
FIG. 74 is a cross-sectional view of the chuck assembly of FIG. 73.

FIGS. 73-74 illustrate a chuck assembly 10h according to another embodiment. The chuck assembly 10h is similar to the chuck assembly 10 described above with reference to FIGS. 1-8C. Accordingly, the following description focuses primarily on differences between the chuck assembly 10h and the chuck assembly 10. In addition, features and elements of the chuck assembly 10h corresponding with features and elements of the chuck assembly 10 are given like reference numbers followed by the letter 'h.'

The illustrated chuck assembly 10h has the thread segments 70h located on the head portion 54h of the chuck body 34h, rather than the shaft portion 58h. Positioning the thread segments 70h, 122h on a larger diameter portion of the chuck body 34h may reduce undesirable backdriving, and creates more space at the rear of the chuck body 34h to accommodate the spring 63h, stops, or feedback features, such as ratcheting features. The forward location of the thread segments 70h, 122h also places the collar 52h under tension when tightened, rather than compression. This may reduce the required thickness (and therefore mass) of the collar 52h, as compared to collars that are compressed when tightened.

Figure 75:
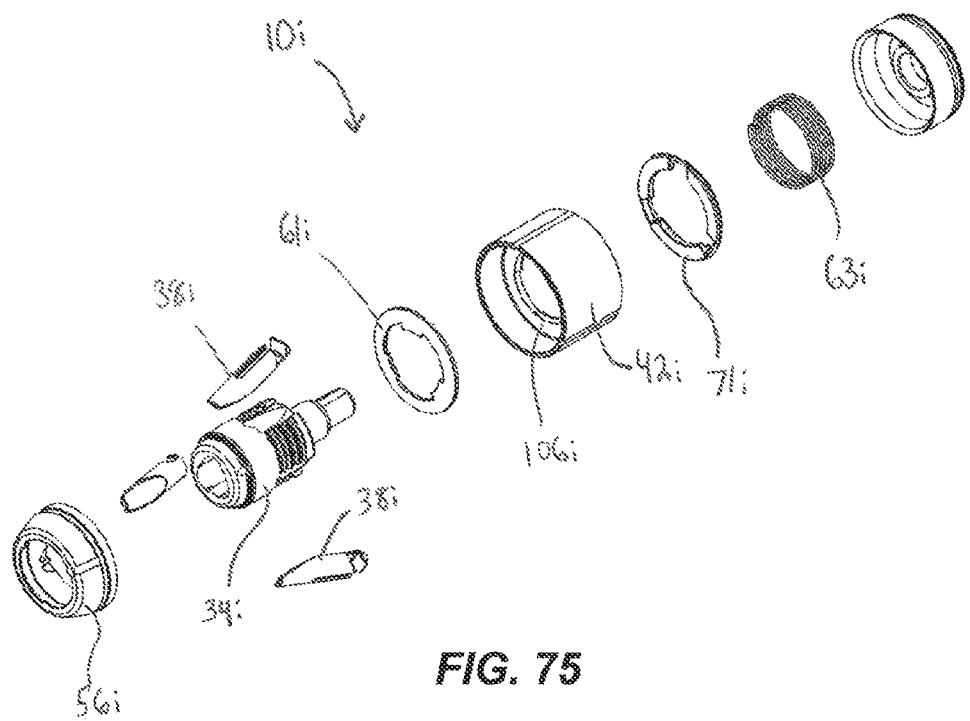
FIG. 75 is an exploded perspective view of a chuck assembly according to another embodiment of the invention.
Figure 76:
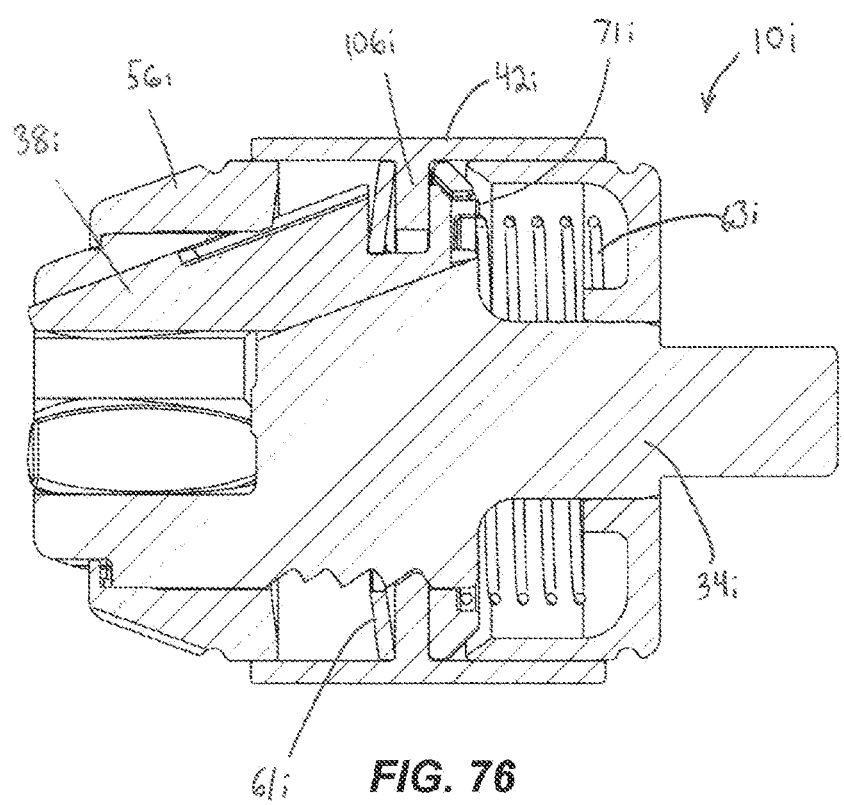
FIG. 76 is a cross-sectional view of the chuck assembly of FIG. 75.

FIGS. 75-76 illustrate a chuck assembly 10i according to another embodiment. The chuck assembly 10i is similar to the chuck assembly 10g described above with reference to FIGS. 71-72. Accordingly, the following description focuses primarily on differences between the chuck assembly 10i and the chuck assembly 10g. In addition, features and elements of the chuck assembly 10i corresponding with features and elements of the chuck assembly 10g are given like reference numbers followed by the letter 'i.'

The chuck assembly 10i includes a pusher ring 71i disposed between the spring 63i and the inner annular wall 106i of the collar 42i. The pusher ring 71i may be made of plastic in some embodiments. The pusher ring 71i transfers the biasing force of the spring 63i to the collar 42i while keeping the spring 63i from interfering with the jaws 38i.

The disc spring 61i in the illustrated embodiment is keyed to the chuck body 34i for co-rotation with the chuck body 34i. The front end cap 56i is also keyed to the front of the chuck body 34i. In some embodiments, a detent mechanism or ratcheting mechanism may be provided between the collar 42i and the chuck body 34i to provide a desired feel when tightening or loosening the collar 42i.

FIGS. 77-78B illustrate a chuck assembly 10j according to another embodiment. The chuck assembly 10j is similar to the chuck assembly 10 described above with reference to FIGS. 1-8C. Accordingly, the following description focuses primarily on differences between the chuck assembly 10j and the chuck assembly 10. In addition, features and elements of the chuck assembly 10j corresponding with features and elements of the chuck assembly 10 are given like reference numbers followed by the letter 'j.'

Each of the jaws 38j of the chuck assembly 10j has a plurality of oblique outer surfaces 78j such that the jaws 38j have a non-circular outer profile. In some embodiments, the outer surfaces 78j of the jaws 38j collectively define a hexagonal outer profile. The non-circular outer profile of the jaws 38j may render the jaws 38j easier to manufacture, align, and retain at a desired position.

The chuck assembly 10j further includes a wave spring 61j (FIG. 78B) disposed between the inner annular wall 106j of the collar 42j and the first engagement surface 86j of each jaw 38j. The illustrated wave spring 61j has a plurality of integral axially-extending detents 73j (e.g., dimples or ridges) on a front side of the wave spring 61j that are received within rearward-facing vertical slots 91j in each jaw 38j. As such, the wave spring 61j is coupled for co-rotation with the jaws 38j. In other embodiments, the wave spring 61j may be a disc spring keyed to the chuck body 34j, such as the disc spring 61i described above with reference to FIGS. 75-76.

A rear side of the illustrated wave spring 61j includes a plurality of axially extending detents 93j (FIG. 78B) that are engageable with corresponding indentations 95j (FIG. 78A) on the front side of the inner annular wall 106j of the collar 42j. The engagement between the detents 93j and the indentations 95j may provide tactile and/or audible feedback (e.g., a ratcheting sound and sensation) to the user upon rotating the collar 42j. In other embodiments, the detents 93j and indentations 95j may be reversed, such that the wave spring 61j includes the indentations 95j and the collar 42j includes the detents 93j. In other embodiments, the wave spring 61j and the collar 42j may include other types of inter-engaging features.

Referring to FIG. 77, the front end cap 56j of the chuck assembly 10j includes slots 99j that receive respective resilient elements 101j (e.g., leaf springs). The resilient elements 101j are engageable with inner ridges 76j formed within the collar 42j to provide additional tactile feedback (e.g., a ratcheting sound and sensation) to the user upon rotating the collar 42j. In other alternative embodiments, the front end cap 56j may be omitted and the resilient elements 101j may be directly coupled to the chuck body 34j and engageable with the inner ridges 76j in the collar 42j to provide tactile and/or audible feedback.

Referring to FIG. 77, the illustrated chuck assembly 10j includes a plurality of springs 75j spaced around the outer periphery of the chuck body 34j. In particular, each of the springs 75j is disposed in a slot or bore 77j extending longitudinally along the chuck body 34j. The springs 75j are engageable with the collar 42j to bias the collar 42j rearward in some embodiments, or forward in other embodiments. By including a plurality of springs 75j spaced about the outer periphery of the chuck body 34j, a central coil spring for biasing the collar 42j can be omitted, freeing up internal space within the chuck assembly 10j and allowing for a more compact overall assembly. Although three springs 75j are illustrated, the chuck assembly 10j may include more than three springs 75j.

Figure 79:
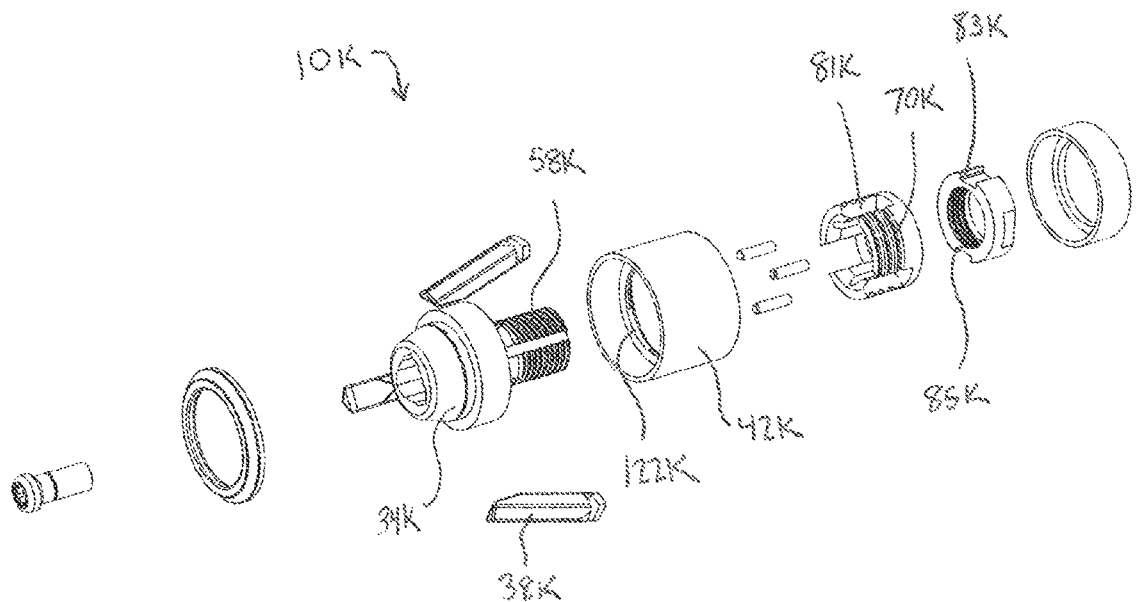
FIG. 79 is an exploded perspective view of a chuck assembly according to another embodiment of the invention.

FIG. 79 illustrates a chuck assembly 10k according to another embodiment. The chuck assembly 10k is similar to the chuck assembly 10 described above with reference to FIGS. 1-8C. Accordingly, the following description focuses primarily on differences between the chuck assembly 10k and the chuck assembly 10. In addition, features and elements of the chuck assembly 10k corresponding with features and elements of the chuck assembly 10 are given like reference numbers followed by the letter 'k.'

The chuck assembly 10k includes a thread carrier 81k keyed for co-rotation with the chuck body 34k (e.g., via a spline fit, a plurality of pins, or the like), but axially movable along the chuck body 34k during assembly. A thread positioning member 83k, with an internally threaded bore 85k, is threaded onto the shaft portion 58k of the chuck body 34k. The thread carrier 81k includes the thread segments 70k that are engageable with the corresponding thread segments 122k on the collar 42k. By providing the thread segments 70k on the thread carrier 81k, which is axially movable relative to the chuck body 34k during assembly, manufacturing tolerances and associated costs of manufacturing the chuck body 34k can be reduced. During assembly, the thread positioning member 83k is rotatable to advance forward or backward along the shaft portion 58k to set a final position of the thread carrier 81k. In some embodiments, the thread positioning member 83k and/or the thread carrier 81k can be locked in place after assembly and adjustment (e.g., via a thread-locking adhesive, thread interference, or any other suitable means).

Figure 80:
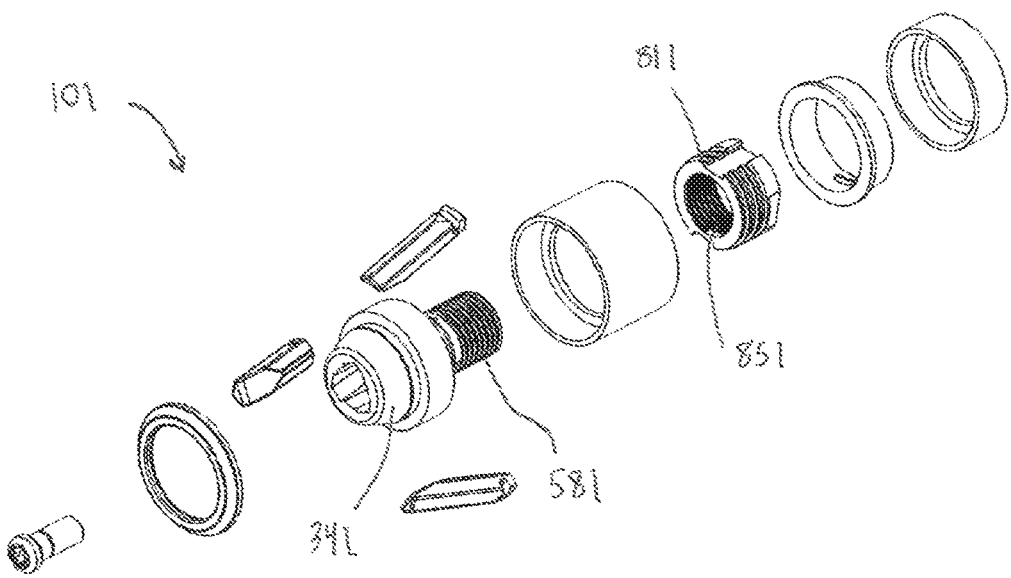
FIG. 80 is an exploded perspective view of a chuck assembly according to another embodiment of the invention.

FIG. 80 illustrates a chuck assembly 10l according to another embodiment. The chuck assembly 10l is similar to the chuck assembly 10k described above with reference to FIG. 79. Accordingly, the following description focuses primarily on differences between the chuck assembly 10l and the chuck assembly 10k In addition, features and elements of the chuck assembly 10l corresponding with features and elements of the chuck assembly 10k are given like reference numbers followed by the letter 'l.'

The internally threaded bore 85l is provided in the thread carrier 81l, such that the thread positioning member 83k described above can be omitted. That is, the thread carrier 81l is threaded on to the shaft portion 58l of the chuck body 34l, and can be adjusted along the chuck body 34l and secured in a final axial position during assembly.

Figure 81:
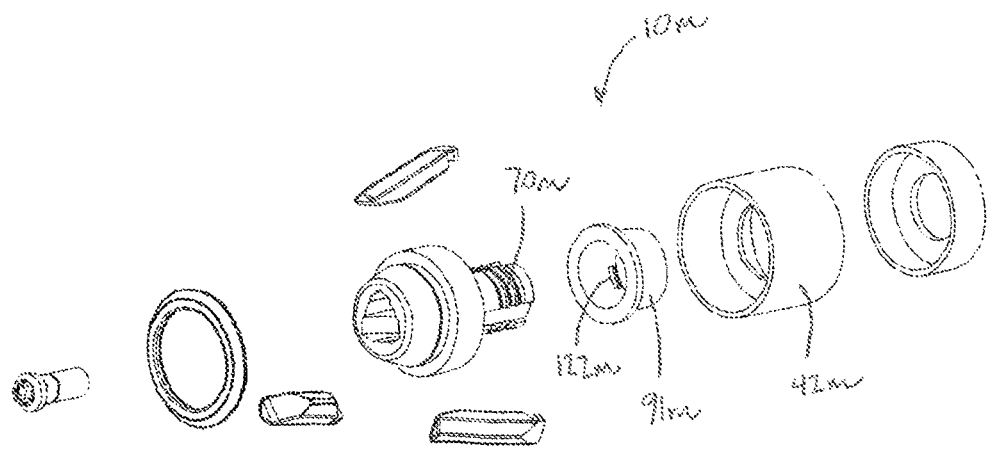
FIG. 81 is an exploded perspective view of a chuck assembly according to another embodiment of the invention.

FIG. 81 illustrates a chuck assembly 10m according to another embodiment. The chuck assembly 10m is similar to the chuck assembly 10 described above with reference to FIGS. 1-8C. Accordingly, the following description focuses primarily on differences between the chuck assembly 10m and the chuck assembly 10. In addition, features and elements of the chuck assembly 10m corresponding with features and elements of the chuck assembly 10 are given like reference numbers followed by the letter 'm.'

The chuck assembly 10m includes sleeve insert 91m disposed within and movable with the collar 42m. The helical thread segments 122m are provided on the insert 91m, which may reduce tolerance requirements and associated costs of manufacturing the collar 42m.

Figure 82:
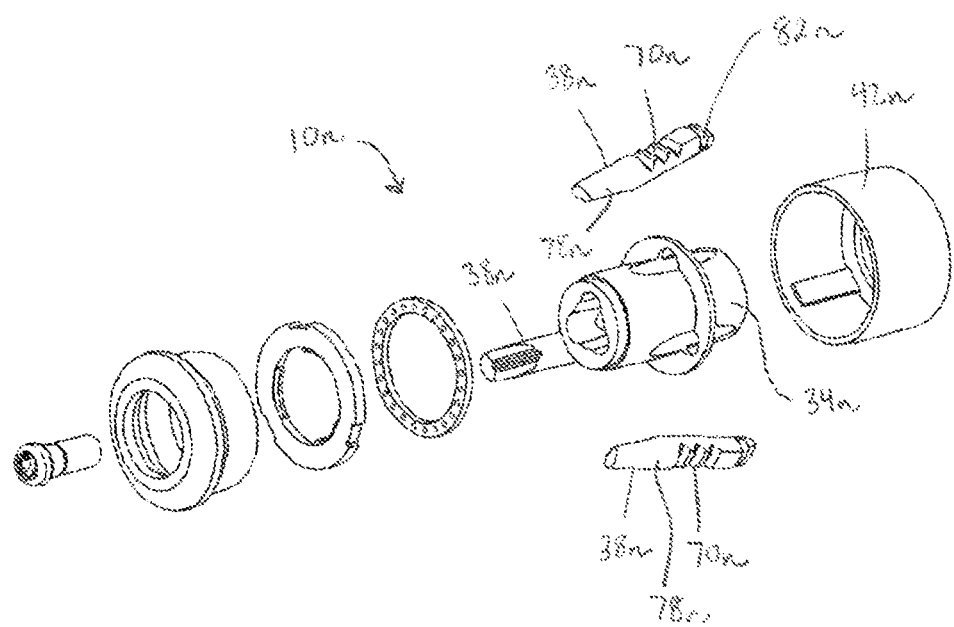
FIG. 82 is an exploded perspective view of a chuck assembly according to another embodiment of the invention.
Figure 83:
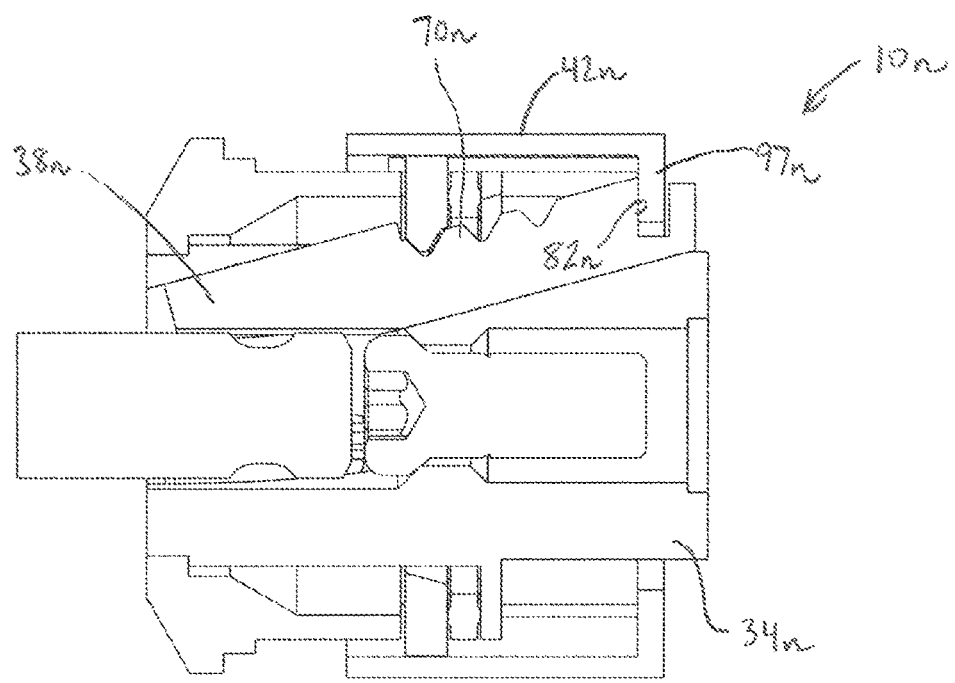
FIG. 83 is a cross-sectional view of the chuck assembly of FIG. 82.

FIGS. 82-83 illustrate a chuck assembly 10n according to another embodiment. The chuck assembly 10n is similar to the chuck assembly 10 described above with reference to FIGS. 1-8C. Accordingly, the following description focuses primarily on differences between the chuck assembly 10n and the chuck assembly 10. In addition, features and elements of the chuck assembly 10n corresponding with features and elements of the chuck assembly 10 are given like reference numbers followed by the letter 'n.'

The thread segments 70n are provided on the oblique outer surfaces 78n of the jaws 38n (rather than on the chuck body 34n). The thread segments 70n may be machined into the jaws 38n, or may be integrally formed with the jaws 38n (e.g., in a molding process, a powdered metal compacting and sintering process, or the like). In the illustrated embodiment, the U-shaped engagement portion 82n of the jaws 38n that receives a rear wall 97n of the collar 42n is disposed behind the thread segments 70n. In alternative embodiments, the U-shaped engagement portion 82n may be disposed in front of the thread segments 70n (to receive, for example, a front wall of the collar 42n).

Figure 84:
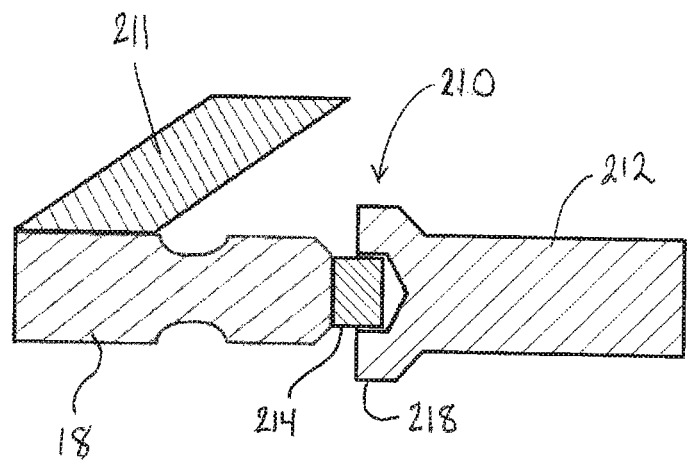
FIG. 84 illustrates a back stop for a chuck assembly according to an embodiment of the invention.

FIG. 84 illustrates a back stop 210 for use with a chuck assembly that includes a plurality of jaws 211 and a chuck screw 212 that couples a body of the chuck assembly (not shown) to an output of a rotary power tool. For example, the back stop 210 may be incorporated into any of the chuck assemblies described herein. In conventional chuck assemblies, if the bit shank 18 bottoms out on the chuck screw 212, it can cause the jaws 211 to jam, making it very difficult to remove the bit shank 18 from the chuck assembly. This problem may be exacerbated on rotary power tools configured to apply axial impacts to the bit shank 18 (e.g., hammer drills and rotary hammers). The illustrated back stop 210 includes an elastomeric plug 214 coupled to a head 218 of the chuck screw 212. The elastomeric plug 214 is engageable with a rear end of a bit shank 18 inserted between the jaws 211 to prevent the rear end of the bit shank 18 from bottoming out on the chuck screw 212. In other embodiments, the chuck screw 212 may be configured as a security screw with a projection extending beyond the head 218 in place of the elastomeric plug 214. In yet other embodiments in which the chuck assembly does not include a chuck screw 212, the elastomeric plug 214 may simply be fixed to a back wall of the chuck assembly.

Figure 85:
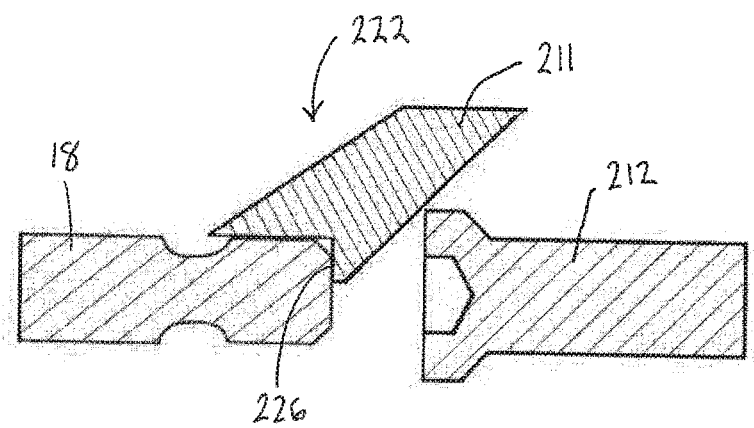
FIG. 85 illustrates a back stop for a chuck assembly according to another embodiment of the invention.

FIG. 85 illustrates a back stop 222 according to another embodiment. The illustrated back stop 222 includes a ledge 226 formed on at least one of the jaws 211. The ledge 226 is engageable with a rear end of a bit shank 18 inserted between the jaws 211 to prevent the rear end of the bit shank 18 from bottoming out on the chuck screw 212 (or the back of the chuck assembly).

Figure 86:
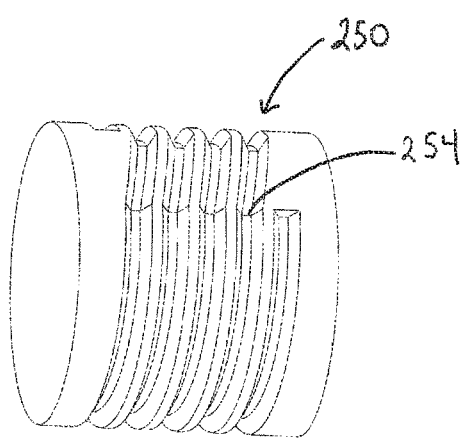
FIG. 86 illustrates a varying helical thread that may be incorporated into any of the chuck assemblies described and illustrated herein.

FIG. 86 illustrates a varying helical thread 250 that may be incorporated into a chuck assembly, such as any of the chuck assemblies described and illustrated herein. The helical thread 250 includes a transition point 254 at which the thread pitch changes from a first pitch to a second pitch different than the first pitch. The varying helical thread 250 may be used to provide a greater mechanical advantage within particular rotational regions (e.g., of a sleeve relative to a chuck body). The varying helical thread 250 may also define rotational stop positions.

Various features of the invention are set forth in the following claims.

What is claimed is:

1. A chuck assembly for a rotary power tool, the chuck assembly comprising:
   a chuck body rotatable about a central axis, the chuck body including a plurality of slots, each of the slots oriented at an oblique angle relative to the central axis;
   a plurality of jaws, each of the jaws movable along a respective one of the slots; and
   a collar coupled to the plurality of jaws,
   wherein the collar is selectively engageable with the chuck body such that, when engaged, the plurality of jaws is movable along the plurality of slots in response to rotation of the collar,
   wherein the collar is movable relative to the chuck body along the central axis, without rotating the collar, when the collar is disengaged from the chuck body, and
   wherein the collar includes an external surface configured to be grasped to rotate the collar.

2. The chuck assembly of claim 1, wherein the jaws are movable along the slots in response to movement of the collar along the central axis.

3. A chuck assembly for a rotary power tool, the chuck assembly comprising:
- a chuck body rotatable about a central axis, the chuck body including a plurality of slots, each of the slots oriented at an oblique angle relative to the central axis;
- a plurality of jaws, each of the jaws movable along a respective one of the slots; and
- a collar coupled to the plurality of jaws,
- wherein the collar is selectively engageable with the chuck body such that, when engaged, the plurality of jaws is movable along the plurality of slots in response to rotation of the collar,
- wherein the chuck body includes a first plurality of thread segments, and wherein the collar includes a second plurality of thread segments, and
- wherein the collar includes an external surface configured to be grasped to rotate the collar.

4. The chuck assembly of claim 3, wherein the collar is rotatable relative to the chuck body to selectively engage at least one of the first plurality of thread segments with at least one of the second plurality of thread segments.

5. A chuck assembly for a rotary power tool, the chuck assembly comprising:
- a chuck body rotatable about a central axis, the chuck body including a plurality of slots, each of the slots oriented at an oblique angle relative to the central axis;
- a plurality of jaws, each of the jaws movable along a respective one of the slots;
- a collar coupled to the plurality of jaws, wherein the collar is selectively engageable with the chuck body such that, when engaged, the plurality of jaws is movable along the plurality of slots in response to rotation of the collar; and
- a ring coupled to the collar for axial movement with the collar relative to the chuck body,
- wherein the collar includes an external surface configured to be grasped to rotate the collar.

6. The chuck assembly of claim 5, wherein the ring is coupled to the chuck body for co-rotation with the chuck body, and wherein the collar is rotatable relative to the ring.

7. The chuck assembly of claim 6, wherein one of the ring or the collar includes an axially-extending detent, wherein the other of the ring or the collar includes an arcuate groove in which the detent is received.

8. The chuck assembly of claim 7, wherein the groove includes texture that provides tactile or audible feedback when the collar is rotated relative to the ring.

9. A chuck assembly for coupling a bit shank to a rotary power tool, the chuck assembly comprising:
- a chuck body rotatable about a central axis, the chuck body including a plurality of slots;
- a plurality of jaws, each of the jaws movable along a respective one of the slots to secure a bit shank between the jaws;
- a collar at least partially surrounding the chuck body and the jaws;
- a first plurality of threads formed on the chuck body or the plurality of jaws; and
- a second plurality of threads formed on the collar,
- wherein the collar is rotatable about the central axis to a first orientation to engage the second plurality of threads with the first plurality of threads and to a second orientation to disengage the second plurality of threads from the first plurality of threads, and
- wherein the collar is axially movable along the chuck body without rotating the collar when the collar is in the second orientation.

10. The chuck assembly of claim 9, wherein the jaws are coupled for movement with the collar along the central axis.

11. The chuck assembly of claim 10, wherein the jaws are movable along the slots in response to movement of the collar along the central axis.

12. The chuck assembly of claim 9, further comprising a chuck screw configured to couple the chuck body to the rotary power tool, the chuck screw including a head; and a back stop configured to prevent a back end of the bit shank from contacting the head of the chuck screw.

13. The chuck assembly of claim 12, wherein the back stop includes an elastomeric plug.

* * * * *